(12) United States Patent
Roese et al.

(10) Patent No.: US 7,606,938 B2
(45) Date of Patent: Oct. 20, 2009

(54) VERIFIED DEVICE LOCATIONS IN A DATA NETWORK

(75) Inventors: John J. Roese, Newmarket, NH (US);
Richard W. Graham, Derry, NH (US);
David Frattura, New York, NY (US);
David Harrington, Portsmouth, NH (US)

(73) Assignee: Enterasys Networks, Inc., Andover, MA (US)

( * ) Notice: Subject to any disclaimer, the term of this patent is extended or adjusted under 35 U.S.C. 154(b) by 243 days.

(21) Appl. No.: 10/377,181

(22) Filed: Feb. 28, 2003

(65) Prior Publication Data

US 2003/0217137 A1 Nov. 20, 2003

Related U.S. Application Data

(60) Provisional application No. 60/361,419, filed on Mar. 1, 2002, provisional application No. 60/361,421, filed on Mar. 1, 2002, provisional application No. 60/361,420, filed on Mar. 1, 2002, provisional application No. 60/361,380, filed on Mar. 1, 2002, provisional application No. 60/387,331, filed on Jun. 10, 2002, provisional application No. 60/387,330, filed on Jun. 10, 2002.

(51) Int. Cl.
*G06F 15/173* (2006.01)
*H04W 24/00* (2009.01)
*G01C 21/00* (2006.01)

(52) U.S. Cl. ............... 709/242; 709/243; 455/456.5; 455/456.1; 455/456.6; 701/214

(58) Field of Classification Search ... 455/456.1–456.6; 709/220, 223, 225, 229, 238–244; 701/213–216, 701/300–302
See application file for complete search history.

(56) References Cited

U.S. PATENT DOCUMENTS 4,627,052 A 12/1986 Hoare et al.
4,734,907 A 3/1988 Turner (Continued)

FOREIGN PATENT DOCUMENTS

EP 1 154 624 11/2001

(Continued)

OTHER PUBLICATIONS

Amir and Balakrishnan, "An Evaluation of the Metricom Ricochet Wireless Network", U.C. Berkeley, May 1996.

(Continued)

*Primary Examiner*—Salad Abdullahi
*Assistant Examiner*—Gregory G Todd
(74) *Attorney, Agent, or Firm*—Holland & Knight LLP; Brian J. Colandreo, Esq.

(57) ABSTRACT

One or more trusted network devices within a data network infrastructure determine a physical location of a client device requesting access to the data network infrastructure. A trusted physical location is generated and associated with the client device. The approach can include determining whether a candidate network device is a trusted network device based on a likelihood that the candidate network device can be modified to provide false physical location data. The approach also can include determining a response for an access request by the client and controlling network resources provided to the client based on the trusted physical location.

19 Claims, 9 Drawing Sheets

U.S. PATENT DOCUMENTS

| | | |
|---|---|---|
| 4,823,338 A | 4/1989 | Chan et al. |
| 4,939,726 A * | 7/1990 | Flammer et al. ............ 370/400 |
| 5,076,688 A | 12/1991 | Bowen et al. |
| 5,090,025 A | 2/1992 | Marshall et al. |
| 5,095,480 A | 3/1992 | Fenner |
| 5,132,926 A | 7/1992 | MacEachern et al. |
| 5,136,580 A | 8/1992 | Videlock et al. |
| 5,173,933 A | 12/1992 | Garner et al. |
| 5,243,652 A | 9/1993 | Teare et al. |
| 5,289,460 A | 2/1994 | Drake, Jr. et al. |
| 5,331,637 A | 7/1994 | Francis et al. |
| 5,355,371 A | 10/1994 | Auerbach et al. |
| 5,355,375 A | 10/1994 | Christensen |
| 5,361,256 A | 11/1994 | Doeringer et al. |
| 5,367,667 A | 11/1994 | Wahlquist |
| 5,394,402 A | 2/1995 | Ross |
| 5,396,493 A | 3/1995 | Sugiyama |
| 5,400,326 A | 3/1995 | Smith |
| 5,428,615 A | 6/1995 | Backes et al. |
| 5,434,855 A | 7/1995 | Perlman et al. |
| 5,442,633 A | 8/1995 | Perkins et al. |
| 5,444,702 A | 8/1995 | Burnett et al. |
| 5,448,565 A | 9/1995 | Chang et al. |
| 5,475,781 A | 12/1995 | Chang et al. |
| 5,481,540 A | 1/1996 | Huang |
| 5,485,455 A | 1/1996 | Dobbins et al. |
| 5,491,694 A | 2/1996 | Oliver et al. |
| 5,500,860 A | 3/1996 | Perlman et al. |
| 5,506,838 A | 4/1996 | Flanagan |
| 5,511,168 A | 4/1996 | Perlman et al. |
| 5,517,494 A | 5/1996 | Green |
| 5,517,620 A | 5/1996 | Hashimoto et al. |
| 5,519,760 A | 5/1996 | Borkowski et al. |
| 5,521,910 A | 5/1996 | Matthews |
| 5,530,703 A | 6/1996 | Liu et al. |
| 5,550,816 A | 8/1996 | Hardwick et al. |
| 5,553,083 A | 9/1996 | Miller |
| 5,583,861 A | 12/1996 | Holden |
| 5,606,602 A | 2/1997 | Coyle et al. |
| 5,608,726 A | 3/1997 | Virgile |
| 5,613,069 A | 3/1997 | Walker |
| 5,621,793 A | 4/1997 | Bednarek et al. |
| 5,634,011 A | 5/1997 | Auerbach et al. |
| 5,640,452 A | 6/1997 | Murphy |
| 5,659,617 A | 8/1997 | Fischer |
| 5,675,582 A | 10/1997 | Hummel et al. |
| 5,684,800 A | 11/1997 | Dobbins et al. |
| 5,727,057 A | 3/1998 | Emery et al. |
| 5,734,865 A | 3/1998 | Yu |
| 5,740,171 A | 4/1998 | Mazzola et al. |
| 5,742,604 A | 4/1998 | Edsall et al. |
| 5,745,685 A | 4/1998 | Kirchner et al. |
| 5,752,003 A | 5/1998 | Hart |
| 5,754,657 A | 5/1998 | Schipper et al. |
| 5,757,916 A | 5/1998 | MacDoran et al. |
| 5,781,726 A | 7/1998 | Pereira |
| 5,781,737 A | 7/1998 | Schmidt |
| 5,790,074 A | 8/1998 | Rangedahl et al. |
| 5,812,819 A | 9/1998 | Rodwin |
| 5,825,772 A | 10/1998 | Dobbins et al. |
| 5,862,338 A | 1/1999 | Walker et al. |
| 5,874,964 A | 2/1999 | Gille |
| 5,881,236 A | 3/1999 | Dickey |
| 5,892,451 A | 4/1999 | May et al. |
| 5,892,910 A | 4/1999 | Safadi |
| 5,892,912 A | 4/1999 | Suzuki et al. |
| 5,898,686 A | 4/1999 | Virgile |
| 5,905,779 A | 5/1999 | Steinmetz |
| 5,920,699 A | 7/1999 | Bare |
| 5,922,073 A | 7/1999 | Shimada |
| 5,963,556 A | 10/1999 | Varghese et al. |
| 5,983,364 A | 11/1999 | Botcosh |
| 5,999,126 A | 12/1999 | Ito |
| 6,005,864 A | 12/1999 | Krause |
| 6,006,259 A | 12/1999 | Adelman et al. |
| 6,012,088 A | 1/2000 | Li et al. |
| 6,018,771 A | 1/2000 | Hayden |
| 6,035,105 A | 3/2000 | McCloghrie et al. |
| 6,041,166 A | 3/2000 | Hart et al. |
| 6,044,400 A | 3/2000 | Golan et al. |
| 6,061,797 A | 5/2000 | Jade et al. |
| 6,070,079 A | 5/2000 | Kuwahara |
| 6,076,114 A | 6/2000 | Wesley |
| 6,078,957 A | 6/2000 | Adelman et al. |
| 6,085,243 A | 7/2000 | Fletcher et al. |
| 6,094,434 A | 7/2000 | Kotzur et al. |
| 6,105,027 A | 8/2000 | Schneider et al. |
| 6,105,064 A | 8/2000 | Davis et al. |
| 6,108,365 A | 8/2000 | Rubin et al. |
| 6,115,754 A | 9/2000 | Landgren |
| 6,122,664 A | 9/2000 | Boukobza et al. |
| 6,130,890 A | 10/2000 | Leinwand et al. |
| 6,131,120 A | 10/2000 | Reid |
| 6,151,324 A | 11/2000 | Belser et al. |
| 6,151,631 A | 11/2000 | Ansell et al. |
| 6,157,647 A | 12/2000 | Husak |
| 6,167,275 A | 12/2000 | Oros et al. |
| 6,167,513 A | 12/2000 | Inoue et al. |
| 6,192,045 B1 | 2/2001 | Williams |
| 6,192,403 B1 | 2/2001 | Jong et al. |
| 6,201,789 B1 | 3/2001 | Witkowski et al. |
| 6,205,126 B1 | 3/2001 | Moon |
| 6,212,391 B1 | 4/2001 | Saleh et al. |
| 6,216,159 B1 * | 4/2001 | Chintakrindi et al. ........ 709/220 |
| 6,222,840 B1 | 4/2001 | Walker et al. |
| 6,230,018 B1 | 5/2001 | Watters et al. |
| 6,233,242 B1 | 5/2001 | Mayer et al. |
| 6,236,365 B1 | 5/2001 | LeBlanc et al. |
| 6,256,338 B1 | 7/2001 | Jalloul et al. |
| 6,259,404 B1 | 7/2001 | Parl et al. |
| 6,273,622 B1 | 8/2001 | Ben-David |
| 6,286,044 B1 | 9/2001 | Aoyama et al. |
| 6,304,218 B1 | 10/2001 | Sugiura et al. |
| 6,308,273 B1 * | 10/2001 | Goertzel et al. ............. 713/201 |
| 6,317,500 B1 | 11/2001 | Murphy |
| 6,327,474 B1 | 12/2001 | Ruutu et al. |
| 6,327,535 B1 * | 12/2001 | Evans et al. .................. 701/300 |
| 6,343,317 B1 | 1/2002 | Glorikian |
| 6,363,422 B1 | 3/2002 | Hunter et al. |
| 6,370,629 B1 | 4/2002 | Hastings et al. |
| 6,388,618 B1 | 5/2002 | Stilp et al. |
| 6,421,009 B2 | 7/2002 | Suprunov |
| 6,442,394 B1 | 8/2002 | Valentine et al. |
| 6,442,616 B1 * | 8/2002 | Inoue et al. .................. 709/245 |
| 6,453,237 B1 | 9/2002 | Fuchs et al. |
| 6,456,853 B1 | 9/2002 | Arnold |
| 6,460,084 B1 | 10/2002 | Van Horne et al. |
| 6,466,786 B1 | 10/2002 | Wallenius |
| 6,480,495 B1 | 11/2002 | Mauger et al. |
| 6,523,064 B1 | 2/2003 | Akatsu et al. |
| 6,539,229 B1 | 3/2003 | Ali |
| 6,542,813 B1 * | 4/2003 | Kovacs ....................... 701/208 |
| 6,556,831 B1 | 4/2003 | Buppelmann |
| 6,580,914 B1 | 6/2003 | Smith |
| 6,583,713 B1 | 6/2003 | Bates |
| 6,640,184 B1 * | 10/2003 | Rabe .......................... 701/207 |
| 6,640,248 B1 | 10/2003 | Jorgensen |
| 6,665,715 B1 * | 12/2003 | Houri ......................... 709/223 |
| 6,701,864 B2 | 3/2004 | Watson et al. |
| 6,716,101 B1 | 4/2004 | Meadows et al. |
| 6,741,863 B1 | 5/2004 | Chiang et al. |
| 6,757,545 B2 | 6/2004 | Nowak et al. |
| 6,757,740 B1 * | 6/2004 | Parekh et al. ................ 709/245 |
| 6,771,639 B1 | 8/2004 | Holden |

| | | | |
|---|---|---|---|
| 6,778,818 B1 | 8/2004 | O'Neil | |
| 6,795,688 B1 * | 9/2004 | Plasson et al. | 455/41.2 |
| 6,799,049 B1 | 9/2004 | Zellner et al. | |
| 6,807,427 B1 | 10/2004 | Sakamoto et al. | |
| 6,813,501 B2 * | 11/2004 | Kinnunen et al. | 455/456.2 |
| 6,826,385 B2 | 11/2004 | Kujala | |
| 6,826,617 B1 | 11/2004 | Ansell et al. | |
| 6,834,195 B2 * | 12/2004 | Brandenberg et al. | 455/456.3 |
| 6,859,791 B1 | 2/2005 | Spagna et al. | |
| 6,889,051 B2 | 5/2005 | Ogino et al. | |
| 6,889,053 B1 | 5/2005 | Chang et al. | |
| 6,920,329 B2 | 7/2005 | Kennedy et al. | |
| 6,934,548 B1 | 8/2005 | Gould et al. | |
| 6,937,988 B1 | 8/2005 | Hemkumar et al. | |
| 6,938,096 B1 * | 8/2005 | Greschler et al. | 709/239 |
| 6,983,313 B1 | 1/2006 | Kokea-Aho | |
| 6,985,731 B1 | 1/2006 | Johnson et al. | |
| 7,010,583 B1 * | 3/2006 | Aizono et al. | 709/219 |
| 7,089,264 B1 | 8/2006 | Guido et al. | |
| 7,116,977 B1 * | 10/2006 | Moton et al. | 455/419 |
| 7,120,449 B1 | 10/2006 | Muhonen et al. | |
| 7,136,915 B2 | 11/2006 | Rieger, III | |
| 7,139,820 B1 * | 11/2006 | O'Toole et al. | 709/223 |
| 7,139,829 B2 | 11/2006 | O'Toole et al. | |
| 7,197,556 B1 | 3/2007 | Short et al. | |
| 7,200,673 B1 * | 4/2007 | Augart | 709/238 |
| 7,266,839 B2 | 9/2007 | Bowers et al. | |
| 2001/0022558 A1 | 9/2001 | Karr, Jr. et al. | |
| 2001/0039623 A1 | 11/2001 | Ishikawa | |
| 2002/0010866 A1 | 1/2002 | McCullough et al. | |
| 2002/0016831 A1 | 2/2002 | Peled et al. | |
| 2002/0023010 A1 * | 2/2002 | Rittmaster et al. | 705/26 |
| 2002/0034953 A1 | 3/2002 | Tricarico | |
| 2002/0046073 A1 | 4/2002 | Indseth et al. | |
| 2002/0051540 A1 | 5/2002 | Glick et al. | |
| 2002/0052180 A1 | 5/2002 | Ravishankar et al. | |
| 2002/0062379 A1 | 5/2002 | Widegren et al. | |
| 2002/0063656 A1 | 5/2002 | Gutowski | |
| 2002/0107029 A1 | 8/2002 | Caughran et al. | |
| 2002/0122055 A1 * | 9/2002 | Parupudi et al. | 345/737 |
| 2002/0138632 A1 * | 9/2002 | Bade et al. | 709/229 |
| 2002/0164996 A1 * | 11/2002 | Dorenbosch | 455/456 |
| 2002/0188841 A1 | 12/2002 | Willeby | |
| 2002/0188842 A1 | 12/2002 | Willeby | |
| 2003/0035544 A1 * | 2/2003 | Herle et al. | 380/270 |
| 2003/0041167 A1 | 2/2003 | French et al. | |
| 2003/0065571 A1 * | 4/2003 | Dutta | 705/26 |
| 2003/0095509 A1 | 5/2003 | Ramanan et al. | |
| 2003/0110293 A1 * | 6/2003 | Friedman et al. | 709/245 |
| 2003/0185233 A1 | 10/2003 | Ji et al. | |
| 2003/0208523 A1 | 11/2003 | Gopalan et al. | |
| 2004/0064334 A1 * | 4/2004 | Nye | 705/1 |
| 2005/0199792 A1 | 9/2005 | Argast et al. | |

FOREIGN PATENT DOCUMENTS

| | | |
|---|---|---|
| EP | 1154624 | 11/2001 |
| WO | 94/28683 | 12/1994 |
| WO | 97/05749 | 2/1997 |
| WO | 97/41654 | 11/1997 |
| WO | WO 97/41654 | 11/1997 |
| WO | 98/19482 | 5/1998 |
| WO | WO 98/19482 | 5/1998 |
| WO | 00/22862 | 4/2000 |
| WO | WO 00/22862 | 4/2000 |
| WO | 00/44149 | 7/2000 |
| WO | WO 00/44149 | 7/2000 |
| WO | 00/67450 | 11/2000 |
| WO | 00/69198 | 11/2000 |
| WO | WO 00/67450 | 11/2000 |
| WO | WO 00/69198 | 11/2000 |
| WO | 01/08425 | 2/2001 |
| WO | WO 01/08425 | 2/2001 |
| WO | 01/22656 | 3/2001 |
| WO | WO 01/22656 | 3/2001 |
| WO | 01/69956 | 9/2001 |
| WO | WO 01/69956 | 9/2001 |
| WO | 01/76093 | 10/2001 |
| WO | WO 01/76093 | 10/2001 |
| WO | 01/82259 | 11/2001 |
| WO | WO 01/82259 | 11/2001 |
| WO | 01/94967 | 12/2001 |
| WO | 01/95505 | 12/2001 |
| WO | WO 01/94967 | 12/2001 |
| WO | WO 01/95505 | 12/2001 |
| WO | 02/09456 | 1/2002 |
| WO | WO 02/09456 | 1/2002 |
| WO | 02/12914 | 2/2002 |
| WO | WO 02/12914 | 2/2002 |

OTHER PUBLICATIONS

Bahl and Padmanabhan, "RADAR: An In-Building RF-based User Location and Tracking System", Proc. IEEE Infocom 2000, Mar. 2000.

Bahl, Padmanabhan, and Balachandran, "A Software System for Locating Mobile Users: Design, Evaluation, and Lessons", Apr. 2000.

Bahl, Padmanabhan, and Balachandran, "Enhancements to the RADAR User Location and Tracking System", Microsoft Research Technical Report, MSR-TR-2000-12, Feb. 2000.

Kindberg and Barton, "The Cooltown User Experience", Hewlett Packard Laboratories, HPL-2001-22, Feb. 2, 2001.

Barton and Kindberg, "The Challenges and Opportunities of Integrating the Physical World and Networked Systems" Hewlett Packard Laboratories, HPL-2001-18, Jan. 24, 2001.

Blazevic et al., "Self-Organization in Mobile Ad-Hoc Networks: the Approach of Terminodes", IEEE Comm. Mag. 2001.

Bulusu, Heidermann, and Estrin, "GPS-less Low Cost Outdoor Localization for Very Small Devices", Univ. S. California, Apr. 2000.

Caffery and Stuber, "Overview of Radiolocation in CDMA Cellular Systems", IEEE Communications Magazine, Apr. 1998, pp. 38-45.

Caffery and Stuber, "Subscriber Location in CDMA Cellular Networks", IEEE Trans Veh. Tech. vol. 47, May 1997.

Chen and Lin, "Route Optimization and Location Updates for Mobile Hosts", 16th IEEE Int. Conf. On Dist. Comp. Sys., May 1996 [1st page is illegible].

Connor, Krishnamurthy and Want, "Making Everyday Life Easier Using Dense Sensor Networks" Springer, 2001.

"Cyberlocator: A New Dimension in Network Security", retrieved from www.cyberlocator.com, Jul. 2002.

Daviel, Internet Draft entitled "Geographic Extensions for HTTP transactions", Apr. 2001.

"DNS LOC: Geo-enabling the Domain Name System", retrieved from www. ckdhr.com/dns-loc/.

Drane, Macnaughtan, and Scott, "Positioning GSM Telephones", IEEE Communications Magazine, Apr. 1998.

Feldmann, et al., "NetScope: Traffic Engineering for IP Networks", IEEE Network Mag. 2000.

Joe Francica, "Location-based Services: Where Wireless Meets GIS", retrieved from www.geoplace.com, Jul. 2002.

Gabber and Wool, "On Location-Restricted Services", IEEE Network, Nov./Dec. 1999.

"Geographic Location/Privacy (geopriv)", retrieved from www.ietf.org, Jul. 2002.

Gessler and Jesse, "Advanced Location Modeling to Enable Sophisticated LBS Provisioning in 3G Networks", retrieved from www. teco.edu/locationws/9.pdf, Jul. 2002.

Hain, T., Internet Drafts entitled "An IPv6 Provider-Independent Global Unicast Address Format" and "Application and Use of the IPv6 Provider Independent Global Unicast Address Format," Oct. 2001.

Heidemann, J., "Using Geospatial Information in Sensor Networks", USC/Information Sciences Institute, Sep. 17, 2001.

Harris, B., "Amulet: Approximate Mobile User Location Tracking System", retrieved from www.winlab.rutgers.edu/~sachin/papers/papers.html, Jul. 2002.

Hightower and Borriello, "A Survey and Taxonomy of Location Systems for Ubiquitous Computing", University of Washington Technical Report, UW-CSE 01-08-03, Aug. 24, 2001.

Hightower, Borriello, and Want, "SpotON: An Indoor 3D Location Sensing Technology Based on RF Signal Strength", University of Wisconsin CSE Technical Report #2000-02-02, Feb. 18, 2000.

Karagiannis and Heijenk, "Mobile IP: A State of the Art Report," Ericsson Open Report, Jul. 13, 1999.

Korkea-aho and Tang, Internet Draft (May 2001) entitled "Spatial Location Payload", May 2001.

Li et al., "A Scalable Location Service for Geographic Ad Hoc Routing", Proceedings of the ACM MOBICOM 2000 conference.

Liao, Tseng and Sheu, "GRID: A Fully Location-Aware Routing Protocol for Mobile Ad Hoc Networks", Telecommunication Systems, 2001.

Mauve and Widmer, "A Survey on Position-Based Routing in Mobile Ad Hoc Networks", IEEE Network, Nov./Dec. 2001.

McGeough, J., "Location-Based Services and Topology", Jul. 26, 2001.

McGeough, J., "Wireless Location Positioning From Existing Signal Level Data", Dec. 12, 2001.

Messier, Fattouche and Petersen, "Locating an IS-95 Mobile Using Its Signal", Conf. Rec. The Tenth International Conference on Wireless Communications (Wireless 98), vol. II. (Calgary, AB, Canada), pp. 562-574.

"The Ricochet Wireless Network Overview", retrieved from http://www.ricochet.net/ricochet/, 1997.

Moore, Periakaruppan, and Donohoe, "Where in the World is netgeo.caida.org?", Proc. Internet Soc. Con. (INET), 2000.

"Newbury Networks Debuts First Location-Enabled Networks Solutions for 802.11B WLANS", retrieved from www.newburynetworks.com/newsroom/presslist.php?start=5, Sep. 2001.

Padmanabhan and Subramanian, "Determining the Geographic Location of Internet Hosts", In Proc. ACM SIGCOMM, Aug. 2001.

Padmanabhan and Subramanian, "An Investigation of Geographic Mapping Techniques for Internet Hosts", SIGCOMM'01, Aug. 27-31, 2001, San Diego, CA.

Pahlavan and Li, "Indoor Geolocation Science and Technology", IEEE Communications Magazine, Feb. 2002.

Polk and Tang, "Spatial Location Protocol Location Server Authentication", Internet Draft (Mar. 2000).

Priyantha, N., "Providing Precise Indoor Location Information to Mobile Devices", Master's thesis, Massachusetts Institute of Technology, Jan. 2001.

"Geolocation Service Allows Web Sites to Identify Users' Geographic Locations", Business Geographics, May 2001.

"Reliacast to Offer Enhanced Geographic Content Distribution Management Through Partnership with Quova", Mar. 6, 2001.

Davis et al., "A Means for Expressing Location Information in the Domain Name System", Jan. 1996.

Imielinski and Navas, "GPS-Based Addressing and Routing", Nov. 1996.

Corson and Macker, "Mobile Ad hoc Networking (MANET): Routing Protocol Performance Issues and Evaluation Considerations", Jan. 1999.

Rios, S., "Location Based Services: Interfacing to a Mobile Positioning Center", retrieved from www.wirelessdevnet.com/channels/lbs/features/lbsinterfacing.html, Jun. 2002.

Small, Smailagic and Siewiorek, "Determining User Location for Context Aware Computing Through the Use of a Wireless LAN Infrastructure", retrieved from http://www.cs.cmu.edu/☐aura/docdir/small100.pdf, 2003.

"Location Technologies for GSM, GPRS and WCDMA Networks", SnapTrack, White Paper, Nov. 2001.

Tang and Polk, "Spatial Location BOF (spatial) of IETF", retrieved from www.nrc.nokia.com/ietf-spatial/.

"SpotON: Ad-hoc Location Sensing", retrieved from retrieved from www.portolano.cs.washington.edu/projects/spoton, Jul. 2002.

Swedberg, G., "Ericsson's mobile location solution", Ericsson Review No. 4, 1999.

"Real Time Locating Systems and Wireless Local Area Networking: Combining Technologies for Optimum Asset Visibility and Supply Chain Management", Apr. 2001.

Tang, Ruutu, and Loughney, Internet Draft (Feb. 14, 2000) entitled "Problems and Requirements of Some IP Applications Based on Spatial Location Information".

Tang, Polk, Korkea-aho and Takahashi, Internet Draft (Nov. 2000) entitled "Spatial Location Payload Requirements With Protocol Recommendations".

"ISO/TC211: Geographic Information/Geomatics Location based services possible standards", retrieved from www.isotc211.org/scope/htm.

"Location Pattern Matching & The RadioCamera Network", U.S. Wireless. 2001.

"VisualRoute—Visual Traceroute Utility/Locate Internet Abusers", retrieved from www.visualware.com/visualroute/index/html, Jul. 2002.

Walther and Fischer, "LocaPhone—Location-Aware group Communication for Mobile Groups.", retrieved from www.isoc.org/isoc/conferences/inet/01/CD_proceedings/T70/walther.pdf, Jul. 2002.

Want et al., "The Active Badge Location System", ACM Trans. Info. Sys., vol. 10, Jan. 1992.

Ward, Jones and Hopper, "A New Location Technique for the Active Office", IEEE Personal Comm., vol. 4, Oct. 1997.

Werb & Lanzl, "Designing a Positioning System for Finding Things and People Indoors", IEEE Spectrum, Sep. 1998.

Williamson, R., "Introduction to Location Based Services for Mobile Wireless Users", Approach to Training Situation Awareness, retrieved from www.ccdesignnet.com/papers/location%20Based%20Services%202002.htm, Jul. 2002.

Zagami and Parl, "Providing a Universal Location Services Using a Wireless E911 Location Network", IEEE Communications Magazine, Apr. 1998.

Zipf, A., "User-Adaptive Maps for Location Based Services (LBS) for Tourism", Proc. of ENTER Comm. Tech. in Tourism, Innsbruck Austria. Springer Computer Science, 2002.

Niculescu and Nath, "Adhoc Positioning System (APS)", In IEEE GlobeCom, Nov. 2001.

Written Opinion from PCT/US03/06169, Aug. 13, 2004 (5 pages).

Alonge, Ken, "Revision to SDE," Email dated Nov. 13, 1995.

Amir and Balakrishnan, "An Evaluation of the Metricom Richochet Wireless Network," U.C. Berkeley, May 1996.

Ammar, Mostafa H., "Probabilistic Multicast: Generalizing the Multicast Paradigm to Improve Scalability," College of Computing, Georgia Institute of Technology, Atlanta, GA, pp. 1-9.

Anderson, Jens Kristian, "Virtual LANs Take Network To Next Level," Computer Technology Review, Sep. 1996, pp. 12-14.

Armstrong, S., et al., "Multicast Transport Protocol," Network Working Group—RFC 1301 Memo, February 1992, pp. 1-36.

Auerbach, Josh, et al., "Multicast Group Membership Management in High Speed Wide Area Networks,".

Autolitano, A., et al., "Application of Generalized Parallel Delta Networks to a Hybrid Broadband Switch," IEEE 1989, pp. 123-127.

Axner, David H., "Differing Approaches to Virtual LANs," Business Communications Review, V. 23, No. 12, Dec. 1993, pp. 42-45.

Backes, Floyd,"An Architectural Framework for VLAN Standardization in IEEE 802," IEEE Presentation, Milpitas, CA, Jan. 24, 1996.

Backes, Floyd, "Spanning Tree Bridges; Transparent Bridges for Interconnection of IEEE 802 LANs," IEEE Network, V.2, No. 1, Jan. 1988, pp 5-9.

Bagwell, Richard T., et al., "A Comparison of Native ATM-Multicast to IP-Multicast With Emphasis on Mapping Between the Two," IEEE, 1995, pp. 189-193.

Bahl and Padmanabhan, "RADAR: An In-Building RF-based User Location and Tracking System," Proc. IEE Infocom 2000, Mar. 2000.

Bahl, Padmanabhan, and Balachandran,"A Software System for Locating Mobile Users: Design, Evaluation, and Lessons," Apr. 2000.

Bahl, Padmanabhan, and Balachandran, "Enhancements to the RADAR User Location and Tracking System," Microsoft Research Technical Report, MSR-TR-2000-12, Feb. 2000.

Balboni, Gian Paolo, et al., "An ATM Switching Testbed," Jul.-Aug. 1991.

Ballardie, Tony, et al., "Multicast-Specific Security Threats and Counter Measures," IEEE 1995, pp. 2-16.
Ballardie, Tony, et al., "Core Based Trees (CBT)—An Architecture for Scalable Inter-Domain Multicast Routing," ACM SIGCOMM, 1993, pp. 85-95.
Bament, Sally, "Why You Should Consider INPs as a Viable Internetworking Solution," Telecommunications, V.27, No. 2, Feb. 1993, pp. 54-57.
Bartlett, John, "Embedded VLAN Tagging," IEEE 802.1 Meeting Presentation, LaJolla, CA, Mar. 12, 1996.
Bartlett, John, "Media or Network Based VLANs?," IEEE 802.1 VLAN Meeting Presentation, LaJolla, CA, Mar. 12, 1996.
Barton and Kindberg, "The Challenges and Opportunities of Integrating the Physical World and Networked Systems," Hewlett Packard Laboratories, HPL-2001-18, Jan. 24, 2001.
Bennett, Geoff, "Routing in the Virtual LAN," Telecommunications, V. 29, No. 7, Jul. 1995, pp. 33, 69-72.
Bernabei, Francisco, et al., "A Fully Distributed Routing Control Scheme in an ATM Switch," IEEE, 1990, pp. 766-770.
Bichard, Jean Philippe, "Decouper le Reseau en Segments Autonomes".
Birman, Ken, "A Response to Cheriton's and Skeen's Criticism of Casual and Totally Ordered Communication," Department of Computer Science, Cornell University, Oct. 21, 1993, pp. 11-21.
Birman, Kenneth P., and Joseph, Thomas A., "Reliable Communication in the Presence of Failures," ACM Transactions on Computer Systems, V.5, No. 1, Feb. 1987, pp. 47-76.
Birman, Kenneth, et al., "Design Alternatives for Process Group Membership and Multicast," NTIS, Department of Computer Science—Cornell University, Dec. 1991, pp. 1-31.
Blazevic et al., "Self-Organization in Mobile Ad-Hoc Networks: The Approach of Terminodes," IEEE Comm. Mag. 2001.
Boggs, David Reed, "Internet Broadcasting," Dissertation—Stanford University Graduate Studies, University Microfilms International, Jan. 1982, pp. 1-86.
Bolot, Jean-Chrysostome, et al. "Scalable Feedback Control for Multicast Video Distribution in the Internet," ACM SIGCOMM, 1994, pp. 58-67.
Braden, R., "TCP Extensions for High Performance: An Update," Jun. 21, 1993.
Braden, R., and Postel, J., "RFC 1009—Requirements for Internet Gateways," June 1987, pp. 1-55.
Braden, Robert, "Requirements for Internet Hosts—Communication Layers," Internet Engineering Task Force—RFC 1122, Oct. 1989, pp. 1-115.
Brakmo et al., "Performance Problems in BSD4.4 TCP", Dept. of Computer Science, University of Arizona, Tucson, AZ.
Brakmo et al., "TCP Vegas: End to End Congestion Avoidance on a Global Internet," Dept. of Computer Science, University of Arizona, Tucson, AZ.
Brakmo et al., "TCP Vegas: New Technologies for Congestion Detection and Avoidance," Dept. of Computer Science, University of Arizona, Tucson, AZ, 1996.
Braudes, R., and Zabele, S., "Requirements for Multicast Protocols," Network Working Group RFC 1458 Memo, May 1993, pp. 1-18.
Bulusu, Heidermann and Estrin, "GPS-less Low Cost Outdoor Localization for Very Small Devices," Univ. S. California, Apr. 2000.
Bunn, J.J., "Trip Report: DECworld," unpublished, May 18, 1992, pp. 1-11.
Caffery and Stuber, "Overview of Radiolocation in CDMA Cellular Systems," IEEE Communications Magazine, Apr. 1998, pp. 38-45.
Caffery and Stuber, "Subscriber Location in CDMA Cellular Networks," IEEE Trans Veh. Tech. vol. 47, May 1997.
Casner, Stephen, and Deering, Stephen, "First IETF Internet Audiocast," ACM SIGCOMM—Computer Communication Review, pp. 92-97.
Casner, Steve, "Frequently Asked Questions (FAQ) on the Multicast Backbone (MBONE)," Memo dated Dec. 22, 1994.
Catlin, Jeff, "VLAN," Email dated Nov. 22, 1995.
Challenges for Mesh Networks in UWB Applications, UWB Insider 2004 [retrieved Dec. 1, 2006] from the Internet: <URL: www.uwbinsider.com/technology/print/1_8_mesh_challenges.html>.
Chambers, Alan M. "IP multicast, Floyd Backes's Presentation, Denver," Email dated Nov. 1, 1995.
Chambers, Alan M. "Re: VLAN Ad Hoc Group," Email dated Jun. 14, 1995.
Chambers, Alan, "Mapping the Problem Space," Jul. 9, 1996.
Chan, Cheung-Win, and Yum, Tak-Shing, "An Algorithm for Detecting and Resolving Store-and-Forward Deadlocks in Packet-Switched Networks," IEEE Transactions on Communications, V.Com-35, No. 8, Aug. 1987, pp. 801-807.
Chen and Lin, "Route Optimization and Location Updates for Mobile Hosts," 16th IEEE Int. Conf. on Dist. Comp. Sys., May 1996.
Finn, Norman, "Multiple Spanning Trees in 802.1Q," IEEE 802.1 Presentation, Sep. 26, 1996, pp. 1-11.
Floyd et al., "Increasing TCP's Intitial Window," Jul. 1997.
Floyd, S., "Issues of TCP with SACK," Mar. 9, 1996.
Floyd, S., "TCP and Successive Fast Retransmits," Lawrence Berkeley Laboratory, Berkeley, CA May 1995.
Frantz, Paul, "Re: Re: Revision to SDE," Email dated Nov. 24, 1995.
Frantz, Paul, et al., "Proposed VLAN Service Definition," IEEE 802.1 Presentation, Denver, Oct. 13, 1995.
Gabber and Wool, "On Location-Restricted Services," IEEE Network, Nov./Dec. 1999.
Garcia-Molina, Hector, and Spauster, Annemarie, "Ordered and Reliable Multicast Communication," ACM Transactions on Computer Systems, V.9, No. 3, Aug. 1991, pp. 242-271.
Gessler and Jesse, "Advanced Location Modeling to Enable Sophisticated LBS Provisioning in 3G Networks," retrieved from www.teco.edu/locationws/9.pdf, Jul. 2002.
Gong, LI, and Shacham, Nachum, "Elements of Trusted Multicasting," IEEE, Apr. 1994, pp. 23-30.
Gopal, Inder, and Rom, Raphi, "Multicasting to Multiple Groups over Broadcast Channels," IEEE, 1988, pp. 79-81.
Greenfield, David, "A Realistic Approach to Virtual LANs," Data Communications, Feb. 1996, V.25, No.2, pp. 50, 52.
Hain, T., Internet Drafts entitled "An IPv6 Provider-Independent Global Unicast Address Format," and "Application and Use of the IPv6 Provider Independent Global Unicast Format," Oct. 2001.
Hanks, S., "Generic Routing Encapsulation (GRE)," Oct. 1994.
Harris & Jeffries, Inc., "A Proposal for Software Development—for an IP-Router Facility," Proposal # 910214.01, Feb. 19, 1991.
Harris, B., "Amulet: Approximate Mobile User Location Tracking System," Retrieved from www.winlab.rutgers.edu/~sachin/papers/papers.html, Jul. 2002.
Hart, John and Backes, Floyd, "IEEE 802 Virtual LANs (VLANs), Proposed Definition and Requirements," dated Jul. 10, 1995.
Hart, John, "Re: Re: Revision to SDE," Email dated Nov. 25, 1995.
Hausman, Richard and Ruby, Doug, "Application Requirements for Support of Duplicate Addresses in VLANs," Contribution to IEEE 802.1Q, Vancouver Plenary, Nov. 11, 1996.
Hausman, Richard, "Re: 802.1Q VLAN PAR Backwards Interoperability," Email dated Jun. 24, 1996.
Hawe, Bill, et al., "Transparent Interconnection of Local Area Networks with Bridges," Journal of Telecommunication Networks, V.3, No.2, pp. 139-152.
Heidemann, J., "Using Geospatial Information in Sensor Networks," USC/Information Sciences Institute, Sep. 17, 2001.
Heywood, Drew, et al., "Enterprise Series Connectivity: Local Area Networks," 1992, pp. 327-353.
Hightower and Borriello, "A Survey and Taxonomy of Location Systems for Ubiquitous Computing," University of Washington Technical Report, UW-CSE 01-08-03, Aug. 24, 2001.
Hightower, Borriello, and Want, "SpotON: An indoor 3D Location Sensing Technology Based on RF Signal Strength, " University of Wisconsin CSE Technical Report #2000-02-02, Feb. 18, 2000.
Horowitz, Steve, "Priority Bits & First on the Wire Question," Email dated Jun. 25, 1996.
Horowitz, Steve, "Priority Bits Discussion," Email dated Jun. 7, 1996.
Horowitz, Steve, "VLAN Issues List," Email dated Jun. 7, 1996.
Housley, Russ, "Use of SDE to within Vlan Standard," Email dated Jan. 23, 1996.
Huat, Ong Sion, and Hiong, Goh Seow,"A Generic Multicast-Key Determination Protocol," Defence Science Organization, Singapore.

Ideal Congestion Control, Sep. 1997.
Imielinski and Navas, "GPS-Based Addressing and Routing," Nov. 1996.
Interior Gateway Routing Protocol, Cisco Systems, Inc. (1999).
International Search Report and Written Opinion from PCT/US05/06503.
IP Sec, Cisco Systems, Inc. (1998).
Jacobson, V., "Design Changes to the Kernel Network Architecture for 4.4BSD," Lawrence Berkeley Laboratory, Berkeley, CA May 1992.
Jacobson, V., "Dynamic Congestion Avoidance/Control," email message, Feb. 1988.
Jacobson, V., "End2End," email message, Mar. 1994.
Jacobson, V., "Modified TCP Congestion Avoidance Algorith," email message, Apr. 1990.
Jacobson, V., "Re: Interpacket arrival variance and mean," email message, Jun. 15, 1987.
Jacobson, V., "Re: your congestion scheme," email message, Nov. 1987.
Jacobson, V., "Some Design Issues for High-Speed Networks," Lawrence Berkeley Laboratory, Berkely, CA Nov. 1993.
Jacobson, V., "TCP Extensions for High Performance," email message, Feb. 1997.
Jacobson, V., "TCP Extensions for Long-Delay Paths, " Oct. 1988.
Jeffree, Tony, "Brief Minutes of 802.1—Maui, Jul. 1995," IEEE 802.1 Maui, Jul. 1995.
Jeffree, Tony, "Input paper for July Meeting—Proposed changes to 802.1D Section 3," Email dated Jun. 22, 1995.
Jeffree, Tony, "Proposed Use of GARP for Distribution of VLAN Membership Information," Oct. 28, 1996.
Jeffree, Tony, "Re: Re: Revision to SDE," Email dated Nov. 24, 1995.
Jeffree, Tony, "Re: VLAN Questions/Suggestions," Email dated May 7, 1996.
Jia, Xiaohua, and So, Shirley Y., "A Multicast Mechanism with Ordering on Overlapping Groups," IEEE, 1993, pp. 242-249.
TCP Selective Acknolegement option (and related changes) for FreeBSD, Sep. 1997.
Thaler, Pat, "Re: Revision to SDE," Email dated Nov. 27, 1995.
Thompson, Geoff, "Re: Re: Re: Revision to SDE," Email dated Nov. 27, 1995.
TrueSystems.com Inc. "HIPPA & TRUESCCESS," 2001, p.1.
U.S. Appl. No. File Wrapper 07/773,161.
Vielmetti, Edward et al., "Messages for Dec. 1992," Google Groups: comp.dcom.isdn, Message board thread, Dec. 1992.
Virtual Router Redundancy Protocol, Network Working Group Request for Comments: 2338.
Waitzman, D., et al., "Distance Vector Multicast Routing Protocol," Network Working Group—RFC 1075, Nov. 1988, pp. 1-24.
Wakerly, John, "An Efficient Frame—Tagging Format for VLANs," IEEE 802.1 Meeting Presentation, Jan. 24-25, 1996.
Wakerly, John, "FDDI VLAN Frame Format—Two Alternate Interpretations," Email dated Jun. 14, 1996.
Wakerly, John, "Forwarding Methods for VLAN-Tagged Frames in a Bridged LAN," IEEE 802.1 Meeting Presentation, Jan. 24-25, 1996.
Wakerly, John, "Implementation Subgroup Notes," Email dated Oct. 19, 1995, IEEE 802.1 Interim Meeting.
Wakerly, John, "Re: Default VLAN & loops," Email dated May 7, 1996.
Wakerly, John, "Re: Properties of Methods A and B for FDD1 and 802.5 VLAN Frame Format," Email dated Jun. 20, 1996.
Wakerly, John, "Technical Contributions for January Interim Meeting," Email dated Nov. 29, 1995.
Wakerty, John and Cheriton, David R., "Virtual LAN Management Protocol (VLMP)" IEEE 802.1 Meeting, Oct. 11-13, 1995, Alantec.
Wakerty, John, "Some VLAN Styles," IEEE 802.1 Meeting, Oct. 11-13, 1995, Alantec.
Wall, David Wayne, "Mechanisms for Broadcast and Selective Broadcast," Dissertation—Stanford University Graduate Studies, University Microfilms International, Jun. 1980, pp. 1-87.
Walther and Fischer, "LocaPhone—Location-Aware group Communication for Mobile Groups," retrieved from www.isoc.org/isoc/conferences/inet/01/CD_proceedings/T70/walther.pdf, Jul. 2002.

Wang, Peter, et al. "Email Voting Ballots: P802/D21: Overview and Architecture (second edition)," IEEE, Oct. 20, 1995.
Want et al., "The Active Badge Location System," ACM Trans Info. Sys., vol. 10, Jan. 1992.
Ward, Jones and Hopper, "A new Location Technique for the Active Office," IEEE Personal Comm. vol. 4, Oct. 1997.
Warwick, Trevor, "Re: Flow control contribution," Email dated Mar. 14, 1995.
Waters, A.G., "Multicast Provision for High Speed Networks," Proceedings of the IFIP TC6/WG6.4 Fourth International Conference on High Speed Performance Networking, Liege, Belgium, Dec. 14-18, 1992, pp. 317-348.
Waters, Gillian A., et al., "The Use of Broadcast Techniques on the Universe Network," ACM, 1984, pp. 52-57.
Werb and Lanzl, "Designing a Positioning System for Finding Things and People Indoors," IEEE Spectrum, Sep. 1998.
Williamson, R., "Introduction to Location based Services for Mobile Wireless Users," Approach to Traning Situation Awareness, retrieved from www.ecdesignnet.com/papers/location%20Based%20Services%202002.htm, Jul. 2002.
Wright, Michele, "Re: VLAN Questions/Suggestions," Email dated May 6, 1996.
Wright, Michele, "Re[2]: VLAN Questions/Suggestions," Email dated May 7, 1996.
Written Opinion and Search Report from PCT US99/22919, Jan. 30, 2001 (10 pages).
Written Opinion from PCT/US03/06169, Aug. 13, 2005 (5 pages).
Yang, Henry and Rijsinghani, Anil, "Some VLAN Requirements & Considerations," IEEE 802.1 Maui, Jul. 11, 1995.
Zagami and Parl, "Providing a Universal Location Services Using a Wireless E911 Location Network," IEEE Communications Magazine, Apr. 1998.
Zipf, A., "User-Adaptive Maps for Location-Based Services (LBS) for Tourism," Proc. Of ENTER Comm. Tech in Tourism, Innsbruck Austria, Springer Computer Science, 2002.
Zwicker, H.R., "Netzwerke—Die Informationstransporter der Moderne," Elektrotechnik, Jun. 1993.
McKeown, Nick, et al., "The Bay Bridge: A High Speed Bridge/Router," Protocols for High-Speed Networks, III (C-9), 1992, pp. 203-218.
McKinley, Philip, and Liu, Jane W.S., "Multicast Routing in Bus-Based Computer Networks," IEEE, 1988, pp. 277-287.
McNealis, Martin, "Re: Revision to SDE," Email dated Nov. 17, 1995.
McNealis, Martin, "Virtual LAN Requirements," Cisco Systems, IEEE 802.1 Interim, Oct. 12, 1995.
Merhar, Milan, "Priority Bits Discussion," Email dated Jun. 7, 1996.
Merhar, Milan, "VLAN Questions/Suggestions," Email dated May 7, 1996.
Merhar, Milan, "VLANs and IP Multicast," Email dated May 9, 1996.
Messier, Fattouche and Peterson,"Locating an IS-95 Mobile Using its Signal," Conf. Rec. The Tenth International Conference on Wireless Communications (Wireless 98). vol. ll, (Calgary, AB, Canada), pp. 562-574.
Meyer, G., "The PPP Encryption Control Protocol (ECP)," Spider Systems, email message, Jun. 1996.
Miller, Ken, "Broadcast News: Multicasting the WAN," Data Communications, V.24, No.3, Mar. 1995, pp.25-26.
MMCNEALIS@CISCO.com, "1995—The year of the Virtual LAN," IEEE Conference Presentation, Maui, Jul. 1995.
Momirov, Milan, "VLANs and IP Multicast," Email dated May 9, 1996.
Moore, Periakaruppan, and Donohoe, "Where in the World is netgeo.caida.org?" Proc. Internet Soc. Con. (INET), 2000.
Moore, Steve, "Virtual LAN Explainer," Computerworld, Jun. 13, 1994, V.28, No. 24, p. 85.
Morency, John and Winkler, Kathrin, "VLANs: Can Layer 3 Save the Day?," Business Communications Review, pp. 47-50.
Moy, John, "MOSPF: Bringing Multicast to Commercial TCP/IP Nets," Network World, V.11, No. 25, Jun. 20, 1994, pp. 11,20.
Moy, John, "Multicast Routing Extensions for OSPF," Communications of the ACM, V.37, No. 8, Aug. 1994, pp. 61-66.

Network Working Group Request for Comments: 1072, "TCP Extensions for long-Delay Paths," Sep. 1997.

Ngoh, L.H., "Multicast Support for Group Communications," Computer Networks and ISDN Systems, 1991, pp. 165-178.

Ngoh, L.H., and Hopkins, T.P., "Transport Protocol Requirements for Distributed Multimedia Information Systems," The Computer Journal, V.32, No. 3, 1989, pp. 252-261.

Niculescu and Nath, "Adhoc Positioning System (APS)," In IEEE GlobeCom, Nov. 2001.

Ofek, Yoram, "Multicast and Semi-FIFO Protocols over Virtual Rings in the MetaNet," IBM T.J. Watson Research Center, Yorktown Heights, NY.

Olsen, Bob, "Up Close: Populating a Virtual LAN," Network World, Oct. 30, 1995, V.12, No. 44, p. 49.

Open Shortest Path First, Inernetworking Technology Overview (1999).

Padmanabhan and Subramanian, "An Investigation of Geographic Mapping Techniques for Internet Hosts," SIGCOMM '01, Aug. 27-31, 2001, San Diego, CA.

Padmanabhan and Subramanian, "Determining the Geographic Locations of Internet Hosts," In Proc. ACM SIGCOMM, Aug. 2001.

Pahlavan and Li, "Indoor Geolocation Science and Technology," IEEE Communications Magazine, Feb. 2002.

Partridge et al., "A Faster UDP," IEEE/ACM Trans. On Networking, Aug. 1993.

Pasquale, Joseph C., et al., "The Multimedia Multicast Channel," Department of Computer Science and Engineering, University of CA, San Diego.

Passmore, David and Freeman, John, "The Virtual LAN Technology Report", Decisys, Inc., May, 1996.

Pattavina, Achille, "Design and Performance Evaluation of a Packet Switch for Broadband Central Offices," INFOCOM Dept., University "La Sapienza", Rome, Italy, 1990, pp. 1252-1259.

Paul, Sanjoy, et al., "Multicast Transport Protocols for High Speed Networks, " IEEE Apr. 1994, pp. 4-14.

Perlman, Radia, "An Algorithm for Distributed Computation of a Spanning Tree in an Extended LAN," Proceedings—Ninth Data Communications Symposium, Whistler Mountain, British Columbia, Sep. 10-13, 1985.

Perry, Yonadev, "Re: Re: Re: Revision to SDE," Email dated Nov. 27, 1995.

Perry, Yonadev, "Re: Revision to SDE," Email dated Nov. 26, 1995.

Petrosky, Mary, "HUB Shopping Spree," Network World, May 29, 1995.

Polk and Tang, "Spactial Location Server Authentication," Internet Draft (Mar. 2000).

Postel, J. and Reynolds, J., "A Standard for the Transmission of IP Datagrams Over IEEE 802 Networks," Network Working Group—RFC 1042 Memo, Feb. 1988, pp. 1-15.

Priyantha, N., "Providing Precise Indoor Location Information to Mobile Devices," Master's thesis, Massachusetts Institute of Technology, Jan. 2001.

Rajagopalan, Bala, "Reliability and Scaling Issues in Multicast Communication," Computer Communication Review, SIGCOMM 1992 Conference Proceedings, Baltimore, MD, Aug. 17-20, pp. 188-198.

Rand, D., "The PPP Compression Control Protocol (CCP)," Novell, email message, Jun. 1996.

Rijsinghani, Anil, "minutes from day 3 of Interim 802.1 meeting," Email dated Oct. 19, 1995.

Rijsinghani, Anil, "Re: 802.1Q VLAN PAR Backwards Interoperability (802.5/FDDI Coding Issue)," Email dated Jun. 13, 1996.

Rijsinghani, Anil, "Re: VLAN Progress, Tagging, SDE etc.—Just Hold It Please," Email dated Nov. 24, 1995.

Rios, S., "Location Based Services: Interfacing to a Mobile Positioning Center," retrieved from www.wirelessdevnet.com/channels/lbs/features/lbsinterfacing.html, Jun. 2002.

Rivers, Jr., "Re: VLAN Questions/Suggestions," Email dated May 6, 1996.

Rizzo, L., "Issues in the implementation of selective acknoledgements for TCP," email message, Jan. 1996.

Rooney, Sean, et al., "Automatic VLAN Creation Based on On-line Measurement," Computer Communication Review, pp. 50-57.

Salwen, Howard et al., "Examination of the Applicability of Router and Bridging Techniques," IEEE Network, V.2, No. 1, Jan. 1988, pp. 77-80.

Saunders, Stephen, "Building Virtual LANs on a Real-World Budget," Data Communications, Sep. 21, 1995, pp. 39-40.

Jing, Hsu Wen, "Multicasting on Certain Self-Similar Networks," Division of Computer Technology—School of Applied Science—Nanyang Technological University, Singapore.

Joe, Francica, "Location-based Services: Where Wireless Meets GIS, " retrieved from www.geoplace.com, Jul. 2002.

Karagiannis and Heijeck, "Mobile IP: A State of the Art Report," Ericsson Open Report, Jul. 13, 1999.

Keen, Hal, "Comment on P802.1p/D0," Email dated Oct. 30, 1995.

Kindberg and Barton, "The Cooltown User Experience," Hewlett Packard Laboratories, HPL-2001-22, Feb. 2, 2001.

King, Steven S., "It's an Adventure," Network World, Apr. 10, 1995, pp. 49, 54-55.

King, Steven S., "Swtiched Virtual Networks—Internetworking Moves Beyond Bridges and Routers," Data Communications, Sep. 1994, pp. 66-80.

King, Steven S., "VLANS Raise Delicate Design Issues," Network World, Apr. 17, 1995, V.12, No. 16, pp. 42-43.

King, Steven, "The Many Faces of Virtual LANs," Network World, Mar. 27, 1995, V.12, No. 13, pp. 59-65.

Klamm, Keith, "Dancing Bears in Readable Text Format," Email dated Mar. 8, 1996.

Knight, Fred S., "Broadband Future Faces Snarls and Gnarls," Business Communications Review, V. 23, No. 12, Dec. 1993, p. 6.

Kompella, Vachaspathi, et al., "Multicast Routing for Multimedia Communication," IEEE/ACM Transactions on Networking, V.1, No. 3, Jun. 1993, pp. 286-292.

Kompella, Vachaspathi, et al., "Multicasting for Multimedia Applications," Department of Computer Science and Engineering—University of CA, San Diego.

Korkea-Aho and Tang, Internet Drraft (May 2001) entitled "Spactial Location Payload," May 2001.

Langille, Paul, "Partitioning of VLAN Tasks," Email dated Nov. 16, 1995.

Langille, Paul, "Re: Revision to SDE," Email dated Nov. 22, 1995.

Langille, Paul, "Re: . . . Re: Revision to SDE," Email dated Nov. 29, 1995.

Lawson, Stephen, "3Com Unveils a Single Solution for Virtual LANs," InfoWorld, May 13, 1996, V.18, No. 20, p. 59.

Lawson, Stephen, "Cabletron Buys Netlink to Fill Out Frame Relay," InfoWorld, Oct. 7, 1996, V.18, No.41, p. 51.

Lewis, Bob, "Do VLANs Solve Any Real Problems? Lots of People Seem to Think So," InfoWorld, Jun. 17, 1996, V.18, No. 25, p. 91.

Li et al., "A Scalable Location Service for Geographic Ad Hoc Routing," Proceedings of the ACM MOBICOM 2000 Conference.

Liao, Tseng, and Sheu, "Grid: A Fully Location-Aware Routing Protocol for Mobile As Hoc Networks," Telecommunications Systesm, 2001.

Lidinske, Bill, "802.1 Minutes and Document Plan," Mar. 8, 1995.

Lidinsky, Bill "Re: VLAN Ad Hoc Group," Email dated Jun. 12, 1995.

Lidinsky, Bill, "802.1Q Draft PAR," Email dated Dec. 19, 1995.

Lidinsky, Bill, "8021. Interim Mtg VLAN Agenda, " Email dated Oct. 1995.

Lidinsky, Bill "IEEE 802 Overall Agenda—Jul. 1996," Email dated Jun. 23, 1996.

Lidinsky, Bill, "Re: 802.?q," Email dated Jun. 21, 1996.

Lidinsky, Bill, "Re: VLAN use of SDE," Email dated Oct. 2, 1995.

Lidinsky, Bill "VLAN use of SDE," Email dated Oct. 1, 1995.

Lindmeyr, Johann, "VLAN Tagging and Classification," Email dated Nov. 30, 1995.

Lippis, Nick, "Virtual LANs: Real Drawbacks," Data Communications, Dec. 1994, pp. 23-24.

MacLeod, Brian, "1Gbps Ethernet" Email dated Oct. 9, 1995.

Marasli et al., "Partially Reliable Transport Service," Proceedings 2nd IEEE Symp. On Comp. and Comm. (Cat. No. 97TB100137), Proceedings Second IEEE Symposium on Computer and Communications, Alexandria, Egypt, Jul. 1-3, 1997, pp. 648-656, XP002131820.

Marasli et al., "Retransmission-Based Partially Reliable Transport Service: An Analytic Model, " Proceedings of Infocom, US, Los Alamitos, IEEE Comp. Soc. Press, vol. Conf. 15, 1996, pp. 621-629, XP000621327 (ISBN: 0-8186-7293-5).

Markowsky, George, and Moss, Franklin H., "An Evaluation of Local Path ID Swapping in Computer Networks," IEEE Transactions on Communications, V.Com-29, No. 3, Mar. 1981, pp. 329-336.

Martillo, Joachim, "Re: InterOp Debate," Email thread dated Nov. 6, 1991.

Martillo, Joachim, "Using Wide-Area Point-to-Point Links for Computer Networking," Email thread dated Sep. 1, 1991.

Martillo, Yakim, "Re: Ethernet Multicast," Archived Emails.

Mathis et al., "Forward Acknowledgement: Refining TCP Congestion Control," Pittsburgh Supercomputing Center.

Mathis et al., "TCP Rate-Halving with Bounding Parameters," Pittsburgh Supercomputing Center, Oct. 1996.

Mathis et al., "TCP Selective Acknowledgement options," email message, Oct. 1996.

Mauve and Widmer,"A survey on Position-Based Routing in Mobile Ad Hoc Networks," IEEE Network, Nov./Dec. 2001.

Mayer, Erwin, "An Evaluation Framework for Multicast Ordering Protocols," ACM, 1992, pp. 177-187.

McCarthy, Vance, "Fast Ethernet and VLANs," Datamation, Apr. 1, 1996, V.42, No. 7, p. 13.

McConnell, John, "VLANs Are Here to Stay," Network World, Jul. 1, 1996, p. 37.

McGeough, J., "Location-Based Services and Topology," Jul. 26, 2001.

McGeough, J., "Wireless Location Positioning From Existing Signal Level Data," Dec. 12, 2001.

McGibbon, Alex, "Virtual LANs Come of Age," Telecommunications, Jun. 1996, pp. 48-52.

Chen, Helen, et al., "Evaluation of DEC's Gigaswitch for Distributed Parallel Computing," Supersedes-SAND93-8013, Oct. 1993.

Chen, Xing, and Hayes, Jeremiah F., "Access Control in Multicast Packet Switching," IEEE/ACM Transactions on Networking, V.1, No. 6, Dec. 1993, pp. 638-649.

Cheriton, David R. "Virtual LAN Management Protocol (VLMP) Draft RFC," Stanford University and Granite Systems, Inc., Oct. 20, 1995.

Cheriton, David R., and Deering, Stephen E., "Host Groups: A Multicast Extension for Datagram Internetworks," Proceedings Ninth Data Computer Symposium, Sep. 10-13, 1985, pp. 172-179.

Cheriton, David R., and Williamson, Carey L.,"VMTP as the Transport Layer for High-Performance Distributed Systems," IEEE Communications Magazine, Jun. 1989, pp. 37-44.

Cheriton, David R., and Zwaenenpoel, Willy, "Distributed Process Groups in the V Kernel," ACM Transactions on Computer Systems, V.3, No.2, May 1985, pp. 77-107.

Cheriton, David R., et al., "Ethernet Group Membership Protocol (EGMP) Draft RFC," Stanford University and Granite Systems, Oct. 12, 1995.

Cisco 7100 Series VPN Router, Cisco Systems, Inc.

Cisco VPN Routers, Cisco Systems, Inc. (1992-20001).

Cisco VPN Solutions, Cisco Systems, Inc. (2001).

Cohen, Jodi, "Critics Take Issue With Fuzzy VLAN Standards Work," Network World, Oct. 30, 1995, V.12, No. 44, pp. 1, 84.

Cohen, Jodi, "Opposing Virtual LAN Views," Network World, Oct. 28, 1996, V.13, No. 44, p. 75.

Cohen, Jodi, "The Truth About Virtual LANs," Network World, Oct. 28, 1996, V.13, No. 44, pp. 1, 74.

Cohen, Jodi, "Too Small for VLANs," Network World, Nov. 4, 1996, V.13, No. 45, p. 31.

Conner, Krishnamurthy and Want, "Making Everyday Life Easier Using Dense Sensor Networks," Springer, 2001.

Connery, Glenn, "Re: VLAN Questions/Suggestions," Email dated May 6, 1996.

Corson and Macker, "Mobile As hoc Networking (MANET): Routing Protocal Performance Issues and Evaluation Considerations," Jan. 1999.

Crowcoft, John, "Talking of and to Gateways and Bridges," Email thread.

Cullerot, David, "Requirements for VLANs," 802.1 Interim Meeting, Oct. 1995, Cabletron Systems, Inc.

Cullerot, David, "Virtual LAN Topology," 802.1 Interim Meeting, Oct. 13, 1995, Cabletron Systems, Inc.

Cullerot, David, "VLAN Topology", 802.1 Interim Meeting, Oct. 13, 1995, Cabletron Systems, Inc.

Daviel, Internet Draft entitled, "Geographic Extensions for HTTP transactions," Apr. 2001.

Davis et al., "A Means for Expressing Location Information in the Domain Name System," Jan. 1996.

DeZhong, Wen, et al., "A Copy Network with Shared Buffers for Large-Scale Multicast ATM Switching," IEEE/ACM Transactions on Networking, V.1, No. 2, Apr. 1993, pp. 157-165.

Deering, S., "RFC 1112—Host Extensions for IP Multicasting," Aug. 1989.

Deering, S., and Hinden, R., "RFC 2460—Internet Protocol, Version 6 (IPv6) Specification," RFC Archive, Dec. 1998 pp. 1-40.

Deering, S.E., "Host Extensions for IP Multicasting," Network Working Group—RFC 988 Memo, Jul. 1986, pp. 1-20.

Deering, Stephen E., "Multicast Routing in Internetworks and Extended LANs," SIGCOMM 88 Symposium, Communications, Architectures & Protocols, Stanford, CA, Aug. 16-19, 1988, pp. 55-64.

Deering, Stephen E., and Cheriton, David R., "Multicast Routing in Datagam Internetworks and Extended LANs," ACM Transactions on Computer Systems, V.8, No. 2, May 1990, pp. 85-110.

Deering, Stephen Edward, "Multicast Routing in a Datagram Internetwork," UMI Dissertation Services, Dec. 1991, pp. 1-137.

Deering, Stephen, et al., "An Architecture for Wide-Area Multicast Routing," ACM, Apr. 1994, pp. 126-134.

Deering, Steve, et al., "Efficient Support for Sparse-Group Multicast Routing," Slildes from Presentation by Deborah Estrin.

Denning et al. "Location-Based Authentication: Grounding Cyberspace for Better Security," Elsevier Science Ltd., pp. 1-6.

Derby, et al., "Scoping Multicasts in WAN Interconnected Local Networks," IBM Technical Disclosure Bulletin, Jan. 1992.

Drane, Macnaughton, and Scott, "Positioning GSM Telephones," IEEE Communications Magazine, Apr. 1998.

Duffy, Jim, "Routers' Role Changes as Both Switches, VLANs Come into Play," Network World, Jun. 3, 1996, V.13, No. 23, p. 22.

Eriksson, Hans, "MBone: The Multicast Backbone," Communications of the ACM, V.37, No. 8, Aug. 1994, pp. 54-60.

Erramilli, A., and Singh, R.P., "A Reliable and Efficient Multicast Protocol for Broadband Broadcast Networks," ACM, 1988, pp. 343-353.

Estrin, Deborah, and Wei, Liming, "Multicast Routing in Dense and Sparse Modes: Simulation Study of Tradeoffs and Dynamics," IEEE, Jul. 1995, pp. 150-157.

Fall et al., "Comparison of Tahoe, Reno, and Sack TCP," Lawrence Berkeley National Laboratory, Berkeley, CA, Dec. 2, 1995.

Feldmann, et al., "NetScope: Traffic Engineering for IP Networks," IEEE Network Mag. 2000.

Feltman, Charles, "A Reality Check on Virtual LANs," Business Communications Review, V.26, No. 7, Jul. 1996, p. 27.

Finn, Norman W., "External and Internal Addresses in Explicit Tags," Email dated Jan. 25, 1996.

Finn, Norman W., "Implicit vs. Explicit VLAN Frame Tagging," Email dated Jan. 25, 1996.

Finn, Norman W., "Re: 802.1 Interim Meeting—VLANs—Objectives, Contributions, Agenda," Email dated May 17, 1996.

Finn, Norman W., "Re: VLAN Questions/Suggestions," Email dated May 8, 1996.

Finn, Norman W., "Re: VLANs and IP Multicast," Email dated May 9, 1996.

Finn, Norman W., "Slides for External and Internal Addresses in Explicit Tags," Email dated Jan. 25, 1996.

Finn, Norman W., "Slides for Implicit vs. Explicit VLAN Frame Tagging," Email dated Jan 25, 1996.

Finn, Norman W., "Two Models for VLAN Tagging," Email dated Mar. 8, 1996.

Saunders, Stephen, "Making Virtual LANs a Virtual Snap," Data Communications, Jan. 1995, pp. 72-74.

Saunders, Stephen, "Matrix-Based Switching Revs Up the LAN," Data Communications, Mar 21, 1994, pp. 35-36.
Saunders, Stephen, "Switch Puts Virtual LANs on Automatic Pilot," Data Communications, Sep. 1994, pp. 45-46.
Sayed, Ayman, "Re: Revision to SDE,"Email dated Nov. 22, 1995.
Seaman, Mark, "For 802.0—Proposed 802. 1 PAR," Email dated May 26, 1995.
Seaman, Mark, "Re: IEEE Plenary—VLANs—802.1 Meeting" Email dated Jul. 4, 1995.
Seaman, Mick, "[Mark Sankey/US/3Com: Gigabit Enet and VLAN]," Email dated Apr. 13, 1996.
Seaman, Mick, "802.1 Interim Meeting—VLANs—Objectives, Contributions, Agenda," Email dated May 3, 1996.
Seaman, Mick, "802.1 Interim on VLANs: Discussion of Requirements," Email dated Oct. 25, 1995.
Seaman, Mick, "802.1 VLAN Interim Meeting—Reminder and Initial Agenda," Email dated Jan. 22, 1996.
Seaman, Mick, "VLAN Progress, Tagging, SDE etc.—Just Hold it Please," Email dated Nov. 22, 1995.
Seamen, Mick, "Foil for Discussion, IEEE 802.1 Closing Plenary," IEEE 802.1 Meeting, Jul. 11, 1996.
Seamn, Mick, "802.1 Agenda, Denver Interim Meeting (VLANS, etc.)," Email dated Jul. 28, 1995.
Seifert, Rich, "Re: Type Field Values," Email dated May 29, 1996.
Seifert, William M., "Bridges and Routers," IEEE Network, V.2, No. 1, Jan. 1988, pp. 57-64.
Sellers, Philip, "Cabletron Gambling on Virtual LANS," Computing Canada, Apr. 25, 1996, V.22, No. 9, p. 27.
Shah, Himanshu, "Re: 802.1Q VLAN PAR Backwards Interoperability (802.5/FDDI Coding Issue)," Email dated Jun. 14, 1996.
Shah, Himanshu, "Re: Re: Revision to SDE," Email.
Sharma et al., "Scalable Timers for Soft State Protocols," Information Sciences Institute, University of Southern California.
Shimada, K. Karl, "VLAN Classes," IEEE 802.1 Interim Meeting Presentation, Denver CO, Oct. 11-13, 1995, Rising Star Research.
Shimada, K. Karl, "VLAN Definition," IEEE 802.1 Interim Meeting Presentation, Denver Co, Oct. 11-13, 1995, Rising Star Research.
Shimada, K. Karl, "VLAN Requirements," IEEE 802.1 Interim Meeting Presentation, Denver CO, Oct. 11-13, 1995, Rising Star Research.
Shimada, Karl K. "802.1 Interim meeting," Email dated Aug. 22, 1995.
Simpson, W., "The Point-to-Point Protocol (PPP)," Daydreamer, Jul. 1994.
Sincoskie, David W., and Cotton, Charles J., "Extended Bridge Algorithms for Large Networks," IEEE Network, V.2, No. 1, Jan. 1988, pp. 16-24.
Slager, "IEEE 802.1 Opening Plenary Minutes," IEEE 802.1 Meeting, University of Twente, Enschede, Netherlands, Jul. 8, 1996.
Slager, R.V., "Email Voting Ballot: P802,1j/D5: Managed Objects for MAC Bridges—Supplement to IEEE Std. 802.1d", IEEE, Aug. 2, 1995.
Slager, Rosemary V., "IEEE 802.1 (unofficial) VLAN Meeting Minutes," IEEE 802.1 Milpitas, CA, Jan. 24, 25, 1996.
Slager, Rosemary, "802.1 Interim Meeting Minutes," 802.1 Interim Meeting, Wakefield, MA, Jun. 1996.
Slager, Rosemary, "IEEE 802.1 Interim Meeting Minutes," IEEE 802.1 Meeting, Ottawa, Canada, Oct. 2, 1996 through Oct. 4, 1996.
Slager, Rosemary, "June96 Resolutions," Email dated Jun. 7, 1996.
Slager, Rosemary, "Proposed Minutes," Email dated Jun. 19, 1996.
Slofstra, Martin, "Cisco Unveils Multimedia 'Blueprint'," Computing Canada, V.21, No. 7, Mar. 29, 1995, p. 21.
Small, Smailagic and Siewiorek, "Determining User Location for Contect Aware Computing Through the Use of a Wireless LAN Infrastructure," retrieved from http://www.cs.cmu.edu/laura/docdir/small00.pdf,2003.
Stallings, William, "2.2 Communication Switching," Local Networks, 2nd Ed., 1987, pp. 32-33, 410-416, Macmillan Publishing Company, New York, NY.
Sterkel, Terrance E, "Re: VLAN Progress, Tagging, SDE etc.—Just Hold It Please," Email dated Nov. 23, 1995.

Stern, T.E., and Jian, Song, "Multicast—Multihop Networks: Connectivity and Performance," Summary, Department of Electrical Engineering and CTR, Columbia University, pp. 1-8.
Steve <WITZ@CHIPCOM.COM>, "Re: IP Multicast, Floyd Backes's Presentation, Denver," Email dated Nov. 1, 1995.
Steve <WITZ1961@AOL.COM>, "Default VLAN," Email dated May 7, 1996.
Steve <WITZ1961@AOL.COM>, "Loop Issues," Email dated May 9, 1996.
Steve <WITZ1961@AOL.COM>, "VLAN Questions/Suggestions," Email dated May 6, 1996.
Stevens, W., "TCP Slow Start, Congestion Avoidance, Fast Retransmit, and Fast Recovery Algoriths," NOAO, Jan. 1997.
Strigini, Lorenzo, et al., "Multicast Services on High-Speed Interconnected LANs," Proceedings of the IFIP International Workshop on High Speed Local Area Networks, Feb. 1987, pp. 173-176.
Swedberg, G., "Ericsson's mobile location solutions," Ericsson Review No. 4, 1999.
Tang and Polk, "Spatial location BOF (spatial) of IETF," retrieved from www.nrc.nokia.com/ietf-spatial/.
Tang, Polk, Korkea-Aho and Takahashi, Internet Draft (Nov. 2000) entitled "Spatial Location Payload Requirements with Protocol Recommendations".
Tang, Ruuru, and Loughney, Internet Draft (Feb. 14, 2000) entitled "Problems and Requirements of Some IP Applications Based on Spatial Location Information".
Tannenbaum, Todd, and Conover, Joel, "Managing Your Switched Networks," Network Computing, Jun. 15, 1996.
Tasker, Robin, "Re: Revision to SDE," Email dated Nov. 27, 1995.
"802.1 Plenary Meeting Agenda," IEEE 802.1 Meeting, LaJolla, CA, Mar. 11, 1996.
"802.1 Resolution on Progress of VLAN work," Jul. 1995, IEEE.
"802.1 Thursday Agenda," IEEE 802.1 Meeting, University of Twente, Enschede, Netherlands, Jul. 11, 1996.
"Attachments Passed by Working Group 802.1," IEEE 802.1, Nov. 1995.
"Cisco IOS VLAN Services," Cisco Systems.
"Clearpoint Demonstrates Frame Relay Support In Interop Frame Relay Solutions Showcase," Clearpoint, Press Release dated Sep. 23, 1991.
"Closing Plenary Minutes," IEEE 802.1 Meeting, LaJolla, CA, Mar. 14, 1996.
"Constellation Product Schedule," Apr. 22, 1992.
"Constellation Series" Clearpoint Research Corporation.
"Cyberlocator: A new Dimension in Network Security," retrieved from www.cyberlocator.com, Jul. 2002.
"DNS LOC: Geo-enabling the Domain System," retrieved from www.ckdhr.com/dns-loc/.
"End Station Tagging Presentation," Presentation Jun. 1996.
"Geographic Location/Privacy (geopriv)" retrieved from www.ietf.org, Jul. 2002.
"Geolocation Service Allows Web Sites to Identify Users' Geographic Locations," Business Geographics, May 2001.
"IEEE 802.1 1995 Document Register," IEEE, 1995.
"IEEE 802.1 Session Notes," IEEE 802.1 Meeting, Jul. 8, 1996 through Jul. 11, 1996.
"IEEE 802.1 Working Group, Minutes of the March 1995 Meeting," West Palm Beach Florida, Mar. 1995.
"IEEE Standards for Local and Metropolitan Area Networks: Media Access Control (MAC) Bridges," IEEE, Technical Committee on Computer Communications of the IEEE Computer Society, Mar. 8, 1991, pp. 1-176.
"IEEE Standards for Local and Metropolitan Area Networks: Overview and Architecture," IEEE, Technical Committee on Computer Communications of the IEEE Computer Society, Dec. 21, 1990, pp. 1-31.
"Instructions to the Editor for P802.1j, and Ballot Summary," Jul. 12, 1995, P802.1-95/008, IEEE.
"Instructions to the Editor for the revision of Overview and Architecture," July 12, 1995, P802.1-95/007, IEEE.
"Internet Protocol,"DARPA Internet Program Protocol Specification: RFC 791, Sep. 1981, pp. 1-45.

"IP Multicast Streamlines Delivery of Multicast Applications," The Packet: Cisco Systems Use Magazine, v.7, No. 1, 1995.

"IP Packet Structure".

"ISO/TC211: Geographic Information/Geomatics Location based services possible standards,"retrieved from www.isotc211.org/scope/htm.

"LAN Emulation over ATM Version 1.0," The ATM Forum Technical Committee, af-lane-0021.000, Jan. 1995, pp. 1-141.

"Location Pattern Matching & The RadioCamera Network," US Wireless 2001.

"Location Technologies for GSM, GPRS and WCDMA Networks," SnapTrack, White Paper, Nov. 2001.

"Multiprotocol Routing—From Constellation," Clearpoint Research Corporation, 1992.

"New Cisco IOS VLAN Services Make 'Virtual' a Reality," Cisco VLAN Roadmap, Dec, 9, 1996.

"Newbury Networks Debuts First Location—Enabled Networks Solutions for 802.11B WLANS," retrieved from www.newburynetworks.com/newsroom.presslist.php?start=5, Sep. 2001.

"Proposed comments on ISO/IEC 10038/PDAM 2," Jul. 12, 1995, P802.1-95/009, IEEE.

"Proposed Comments on ISO/IEC 15802-5/PDAM 1," Jul. 12, 1995, P802.1-95/010, IEEE.

"Quick VLAN Standardization," IEEE 802.1 Meeting, Ottowa, Oct. 2, 1996.

"Real Time Location Systems and Wireless Local Area Networking: Combining Technologies for Optimum Asset Visibility and Supply Chain Management," Apr. 2001.

"Reliacast to Offer Enhanced Geograpic Content Distribution Management Through Partnership with Quova," Mar. 6, 2001.

"SLITHERNET: A Proposal for Using Moderate-To-High-Speed Synchronous Serial Connections as a LAN-like Networking Medium", Jul. 1991.

"SpotON: Ad-hoc Location Sensing," retrieved from www.portolano.cs.washington.edu/projects/spoton, Jul. 2002.

"TCP-IP Distribution List for Nov. 1991," The Security Digest Archives, Nov. 1991.

"The Richochet Wireless Nework Overview," retrieved from http://www.ricochet.net/ricochet/, 1997.

"Virtual LAN Communications," Cisco VLAN Roadmap—White Paper, Dec. 9, 1996.

"Virtual LANs Find a Use for Selective Flooding," Network World, Apr. 10, 1995, v.12, No. 15, p. 54.

"Virtual LANs Get Real," Data Communications, Feb. 1995, pp. 87-96.

"Virtual LANs Near Reality," Data Communications, Jul. 1995, p. 16.

"VisualRoute—Visual Traceroute Utility/Locate Internet Abusers," retrieved from www.visualware.com/visualroute/index/html, Jul. 2002.

Aggarwal, Sudhir, and Raghav, Amritansh, "Dualcast: A Scheme for Reliable Multicasting," IEEE, Apr. 1994, pp. 15-22.

Aguilar, Lorenzo, "Datagram Routing for Internet Multicasting," ACM, 1994, pp. 58-63.

Ahmadi, Hamid, and Denzel, Wolfgang E., "A Survey of Modern High-Performance Switching Techniques," IEEE Journal on Selected Areas in Communications, V.7, No. 7, Sep. 1989, pp. 1091-1103.

Aiello, Rosario, et al., "Casual Ordering in Reliable Group Communications," ACM SIGCOMM, 1993, pp. 106-115.

Almquist, P., and Kastenholz, F., "Towards Requirements for IP Routers," Network Working Group RFC 1716 Memo, Nov. 1994, pp. 1-172.

* cited by examiner

401

VERIFIED DEVICE LOCATIONS IN A DATA NETWORK

CROSS-REFERENCE TO RELATED APPLICATIONS

This application claims priority under 35 USC §119(e) to the following U.S. Provisional Patent Application: Ser. No. 60/361,419, titled "A System for Network Definition Based on Device Location", filed on Mar. 1, 2002; Ser. No. 60/361,421, titled "A System to Regulate Access as a Function of Device Location", filed on Mar. 1, 2002; Ser. No. 60/361,420, titled "Systems and Methods to Define Location of a Network Device or a Networked Device", filed on Mar. 1, 2002; Ser. No. 60/361,380, titled "A System and Method to Provide Security in a Network Based on Device Location Information", filed on Mar. 1, 2002; Ser. No. 60/387,331, titled "Location Discovery and Configuration Provisioning Server", filed on Jun. 10, 2002; and Ser. No. 60/387,330, titled "System and Method for Switch Based Location Discovery and Configuration Provisioning of Network Attached Devices", filed on Jun. 10, 2002. The entire contents of each of these applications are hereby incorporated by reference.

This application is also related to International Application Serial Number US03/06169, titled "Location Aware Networking", being filed concurrently with this application. This International Application is also incorporated herein by reference. This application is also related to U.S. application Ser. Nos. 10/377,180; 10/377,299; 10/377,163; 10/377,177; 10/377,014; 10/377,012; all filed concurrently with this application on Feb. 28, 2003.

TECHNICAL FIELD

This description relates to determination and use of location information within a data network.

BACKGROUND

Computing systems are useful tools for the exchange of information among individuals. The information may include, but is not limited to, data, voice, graphics, and video. The exchange is established through interconnections linking the computing systems together in a way that permits the transfer of electronic signals that represent the information. The interconnections may be either cable or wireless. Cable connections include, for example, metal and optical fiber elements. Wireless connections include, for example infrared, acoustic, and radio wave transmissions.

Interconnected computing systems having some sort of commonality are represented as a network. For example, individuals associated with a college campus may each have a computing device. In addition, there may be shared printers and remotely located application servers sprinkled throughout the campus. There is commonality among the individuals in that they all are associated with the college in some way. The same can be said for individuals and their computing arrangements in other environments including, for example, healthcare facilities, manufacturing sites and Internet access users. A network permits communication or signal exchange among the various computing systems of the common group in some selectable way. The interconnection of those computing systems, as well as the devices that regulate and facilitate the exchange among the systems, represent a network. Further, networks may be interconnected together to establish internetworks.

The process by which the various computing systems of a network or internetwork communicate is generally regulated by agreed-upon signal exchange standards and protocols embodied in network interface cards or circuitry. Such standards and protocols were borne out of the need and desire to provide interoperability among the array of computing systems available from a plurality of suppliers. Two organizations that have been responsible for signal exchange standardization are the Institute of Electrical and Electronic Engineers (IEEE) and the Internet Engineering Task Force (IETF). In particular, the IEEE standards for internetwork operability have been established, or are in the process of being established, under the purview of the IEEE 802 committee on Local Area Networks (LANs) and Metropolitan Area Networks (MANs).

SUMMARY

In a general aspect, the invention features a system that associates physical locations with network-linked devices in a network to which such devices are connected. This system employs a variety of techniques for establishing device location. The system configuration can vary and can include any type of data network, including LANs, MANs, Wide Area Networks (WANs), Personal Area Networks (PANs), and Home Networks. The system provides location information for particular devices to the network devices and management, and may be used in any of a variety of ways to improve configuration accuracy, control, and security. The location information may also be used to control or secure a device itself.

Further features relate to mechanisms by which a network entry device and/or an intermediate device acquires location information. Those mechanisms include, generally, techniques for acquiring absolute and relative location information. Absolute location information may be obtained using known geographical identifiers in a coordinate system, such as latitude and longitude, dead reckoning, Global Satellite Positioning (GPS) systems affixed to or proximate to the device to be located, inertial locators, optical locators, and other techniques. Relative location may be obtained by vectoring from equipment having a known location, or by vectoring from a known location. Relative location also may be obtained from triangulation from known radio-based or optical-based locations, by phased array searches to define a range of locations, or by signal strength attenuation mapped to a range of locations. Other techniques may be employed to fix the position of a device of interest.

The device can determine its own position and relay that information to applications within the network at start-up, upon connection, or when queried, or the system can determine the location of the device and store that information and give it to the device if appropriate and useful. Both absolute and relative location information can also include a level of trust parameter to determine whether the location information is reliable and can be trusted by the system. Once that device location is fixed, by absolute or relative means, and associated with the device in an identifiable way, such as a file or program argument, the device location can be used in any number of ways to enhance the operation of, and services provided by, the system. For example, anywhere user credentials are required, the location of a device can be required. In other words, the location of a device becomes part of the required credentials.

In one aspect, there is a method including determining, by one or more trusted network devices within a data network infrastructure, a physical location of a client device requesting access to the data network infrastructure to generate a trusted physical location and associating the trusted physical location with the client device.

The method can include determining whether a candidate network device is a trusted network device based on a probability that the candidate network device can be modified to provide false physical location data. The method can also include the following features. The method can further include prohibiting access to the one or more trusted network devices by anyone except authorized personnel.

One or more trusted network devices can be associated with a level of trust not less than a predefined threshold. The predefined threshold can vary based on a type of request by the client device. The trusted physical location can be associated with a level of trust. The method can further include determining the level of trust of the trusted physical location based on the one or more network devices. The method can further include determining the level of trust based on a method of communication between the one or more network devices and the client device. The method can further include policing network activities of the client based on the trusted physical location.

The method also can further include determining a response for an access request by the client based on the trusted physical location. The method can further include controlling network resources provided to the client based on the trusted physical location. The method can further include transmitting the trusted physical location to an emergency response authority. The method can further include providing information to the client based on the trusted physical location. The method can further include providing information including points of interest within a predefined radius of the physical location.

In another aspect, there is a method that includes transmitting first location information from a trusted source within a data network infrastructure. The method also includes receiving second location information from a client device requesting access to the network, the second location information based on the first location information and determining a trusted location based on the first and second location information. In other examples, the method can include the following features. The method can further include policing network activities of the client based on the trusted physical location. The method can further include controlling network resources provided to the client based on the trusted physical location.

In another aspect, there is a method including determining a value for a physical location of a device. The method also includes determining a level of trust corresponding to the determined value and associating the level of trust with the value of the physical location. In other examples, the method can include the following features. The method can further include determining a level of trust based on a precision of a technique used for determining the value of the physical location. The method can further include determining a level of trust based on a granularity of a range of possible values used for determining the value of the physical location. The method can further include determining a level of trust based on a probability that determining a value can produce a false value for the physical location. The method can further include determining a level of trust based on a level of trust of a network device determining the value of the physical location.

In another aspect, there is a system comprising a trusted network device within a data network infrastructure, the network device including a location module configured to determine a trusted physical location of a client device requesting access to the network infrastructure and to associate the trusted physical location with the client device.

The details of one or more examples related to the invention are set forth in the accompanying drawings and the description below. Other features, objects, and advantages of the invention will be apparent from the description and drawings, and from the claims.

DESCRIPTION OF DRAWINGS

Like reference symbols in the various drawings indicate like elements.

Figure 1:
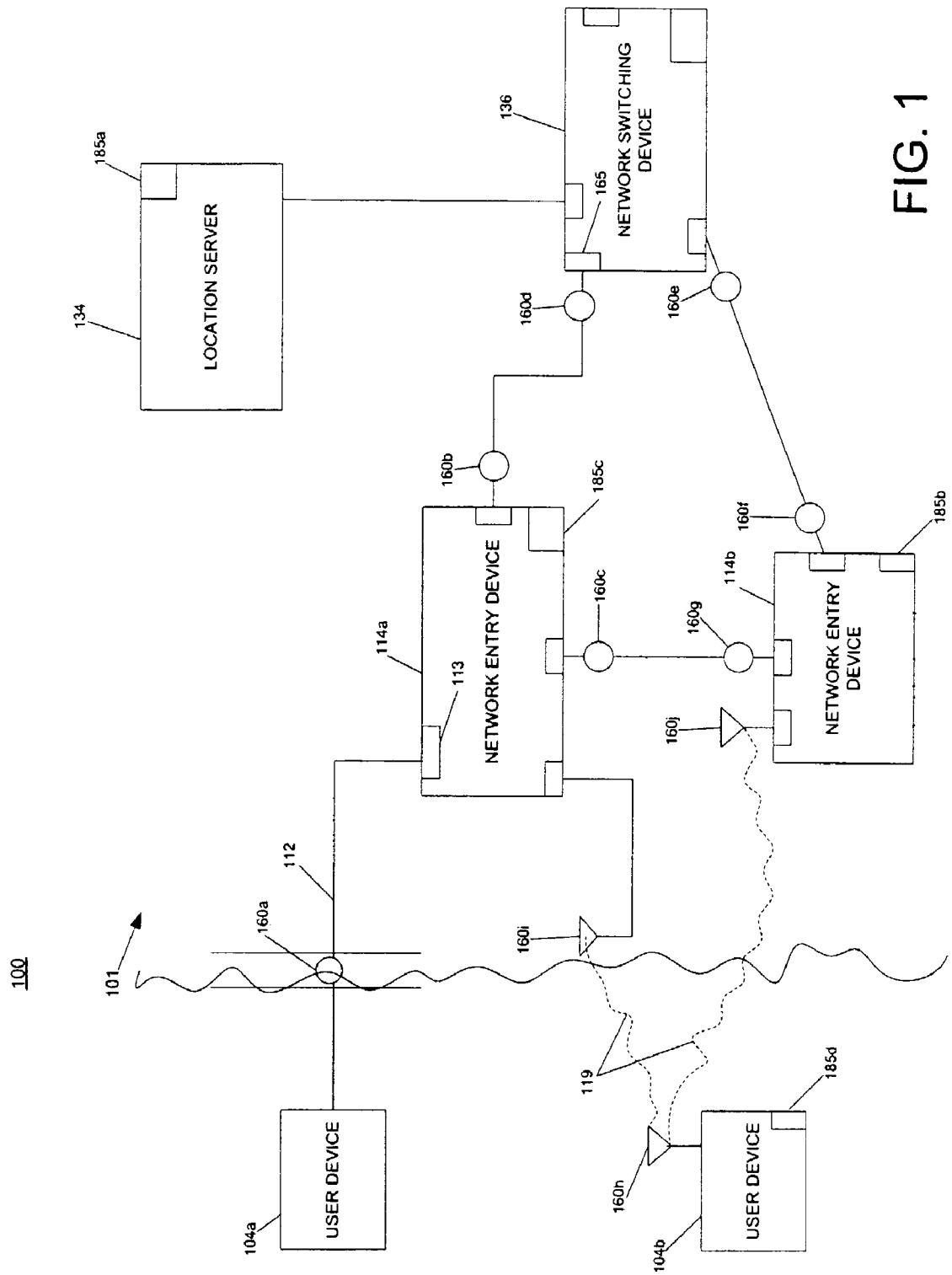
FIG. 1 is a block diagram of an example system with location information.

DETAILED DESCRIPTION 1.0 Overview (FIG. 1)

Referring to FIG. 1, a location-aware system 100 operates and provides network-based services to users according to locations of devices that use or are part of the network associated with system 100. System 100 includes an infrastructure 101 that includes multiple switching devices, some of which are connected to connection points (e.g., 160a-i) of infrastructure 101. System 100 employs both hardware and software (e.g., an application executing on server 134) to provide location-aware services described below. A location of a device can relate to the physical location of the device, which can be characterized in a variety of ways including as grid or map coordinates (e.g., latitude, longitude, and elevation), a geographic region, or in terms of building structures, such as coordinates on a particular floor in a building or a room number in a building. A device can be external to infrastructure 101 of system 100, such as user devices 104a and 104b. A device also can be internal to infrastructure 101, such as network entry devices 114a-b (sometimes referred to as switches or edge devices of the network), and a central switching device 136 (e.g. a router). The network entry devices 114 can include and/or be associated with wireless access points 160i-j. The wireless access points 160i-j can be individual devices external to the network entry device 114, such as 160j and/or internal to the entry device 114, such as 160i.

Some of the devices internal and external to infrastructure 101 include a location module 185. The location module 185 includes functionality, as described in more detail below, that makes a device location-aware. In one example, this functionality includes a location database to store location information, protocol to communicate location information to other devices, and rules to enforce location-based policies (e.g., to enable policing based on location information). This functionality can also include the algorithms and processes necessary to determine the location of a device using the techniques described herein. Location module 185 can be implemented in the hardware and/or software of system 100. For example, particular software applications executing on the devices can provide/enforce the location functions, the operating system of any of the devices can provide/enforce the location functions, and/or hardware modules, such as programmable arrays, can be used in the devices to provide/enforce the location functions.

To make use of a device's location, system 100 first determines the location of that device. System 100 uses different techniques to determine the location of a device depending on whether the device communicates with other devices using a cable-based transmission medium 112, or a wireless transmission medium 119. Cable-based transmission medium 112 refers to a constrained transmission medium such as an optical cable, an electrical wire, and the like. Such a cable transmission medium can provide single to many connections (shared) and/or a point-to-point (dedicated) connection between two devices. A cable-based medium 112 can be considered as part of infrastructure 101 of system 100. Typically the medium 112 is installed in such a way that it is not easy to modify the medium's physical location. For instance, cables are lead through walls and conduits in such a way that the connection points (e.g., the jacks) are in fixed locations. Wireless transmission medium 119 refers to a transmission medium in a free space, such as though free air. Wireless transmission medium 119 generally relates to any communication where the transmission medium is air, for example, radio-based communication. For instance, radio communication according to the IEEE 802.11 standard uses a wireless transmission medium 119. Other wireless communication using wireless transmission media relate to use of optical communication (e.g., infra red, lasers, and the like) and/or other communications through air such as acoustic and mechanical waves. Wireless media are characterized by a much greater range of possible locations in which communicating devices may be located. For example, in the case of an IEEE 802.11 based network, a mobile device may be able to communicate with a wireless access point hundreds or even thousands of feet away depending on the environment.

In the illustrated system 100 of FIG. 1, user device 104a connects to infrastructure 101 using cable 112 through connection point 160a (e.g., a jack in a wall). Similarly, network entry devices 114a-b and central switching device 136 connect to each other using a cable to connection points 160b-g. In a portion of a data network employing cables, a connection point (e.g., 160a-g) is the terminus of the cable where a device physically attaches. A connection port (e.g., 113) is the physical port through which a network client communicates.

As described above, the connection points associated with a cable are generally fixed in location. The locations of these connection points are determined, for example, when the cable is installed. Location information includes an association of a connection point with its corresponding location. System 100 stores the location information in location module 185. The location module 185 can store the location information using a location database. In an example of a centralized approach, system 100 stores the location information for all of the connection points of the network of system 100 in location module 185a in location server 134. In an example of a distributed approach, described in more detail in the alternatives section below, system 100 stores the location information for all of the connection points, or a portion of the connection points, in each of the location modules 185a-d. In one approach to determining the location of a device, system 100 determines the connection point (e.g., 160a-g) through which the device is connected to network infrastructure 101 and finds the stored location information in location module 185 corresponding to that particular connection point.

A device using wireless transmission medium 119 connects to infrastructure 101 through connection point 160h, for example communicating from the device's transceiver to the wireless access points 160i-j of network entry devices 114a-b, respectively. This wireless connection point 160h, similar to connection points 160a-g, are also generally fixed in location. The location of a user device 104 connected to a wireless connection point 160h, however, can be dynamic. The location of user device 104b changes as user device 104b moves. Stationary wireless connection points 160i-j may no longer be in communication with user device 104b as user device 104b moves away, thus no longer being connection points for 104b after a certain period of time.

In one approach to determining a location of a device using wireless transmission medium 119, system 100 determines the location of user device 104b relative to typically multiple network devices (e.g., 160i and 160j) that receive transmitted signals from user device 104b. System 100 uses signal characteristics, such as relative time delay or signal strength of the signal received at the different network devices in combination with the known location of the wireless access points 160i-j. System 100 optionally uses other known boundaries, for example walls within a building, to further limit the location of an area, relative to the wireless connection point (e.g., 160i or 160j), within which that user device 104 is operating. System 100 stores the location information corresponding to wireless user device 104b in association with one or more of the connection points 160h-i in location module 185 (e.g., 185a in an example of a centralized approach). The system 100 updates the corresponding location information as user device 104b moves.

Having determined the location of a device, system 100 employs that location information in a variety of ways. System 100 can provision and configure devices within infrastructure 101 or external to infrastructure 101 according to their locations as devices are added or moved. This enables a network device, in an automated fashion, to learn of its location and based on its location, configure itself, operate in a certain manner and enforce certain location-based rules. For example, network entry device 114a can be replaced with a new network entry device that, once connected, learns its location, and its configuration and rules of operation based on that location, in an automated fashion from location server 134.

System 100 is able to enforce certain restrictions, on an initial and continual basis, based on locations of devices. System 100 can restrict access to the network or data stored on the network based on the location of user device 104. For example, system 100 restricts access to accounting databases to only user devices 104 located within the accounting department offices (e.g., within certain coordinates of a certain floor of a certain building). Further, system 100 can also periodically and/or continually police these restrictions so that a user device 104 cannot authenticate based on being in one location, and then try to access restricted services at another unauthorized location based on that authentication. Location can also be another parameter, for instance in addition to a user identification or a device type, that is used for allocation of network resources, such as speed and quality of service (QoS).

System 100 also restricts flow of data through infrastructure 101 based on location restrictions of that data. For example, the system 100 can restrict data from the accounting databases to stay within the accounting department offices (e.g., an area defined by certain coordinates). In one approach to implement such restrictions, the data has a tag that contains the location restrictions (e.g., permitted and/or prohibited locations). For example, the application generating the data and/or the server generating a data packet to transport the data over the network can add this tag while generating the data and/or packet. Devices and applications within system 100 enforce those restrictions by not allowing the data to be routed to a device outside of the permitted location, by destroying the data if it is in a location outside of the permitted location, and/or denying access to (e.g., reading, opening) the data outside a permitted location.

System 100 is also able to provide other services and applications that employ the location information. For example, system 100 can use the location information in emergency situations, where a device may be an alarm or sensor. System 100 determines the location of the alarm device and transmits the location information to a party responding to the alarm. System 100 can also use location information to recover a stolen user device 104. As the stolen user device 104 accesses the network, system 100 determines the location of the stolen device and transmits the location information to a party seeking to locate the device. System 100 can track mobile user devices (e.g., 104*b*) and thus can also track anything associated with that user device (e.g., the user, a file, a physical object, and the like). System 100, through the use of location information, can provide these and other services and applications. The sections below provide more detailed examples of the devices and techniques described in the above overview.

Figure 2:
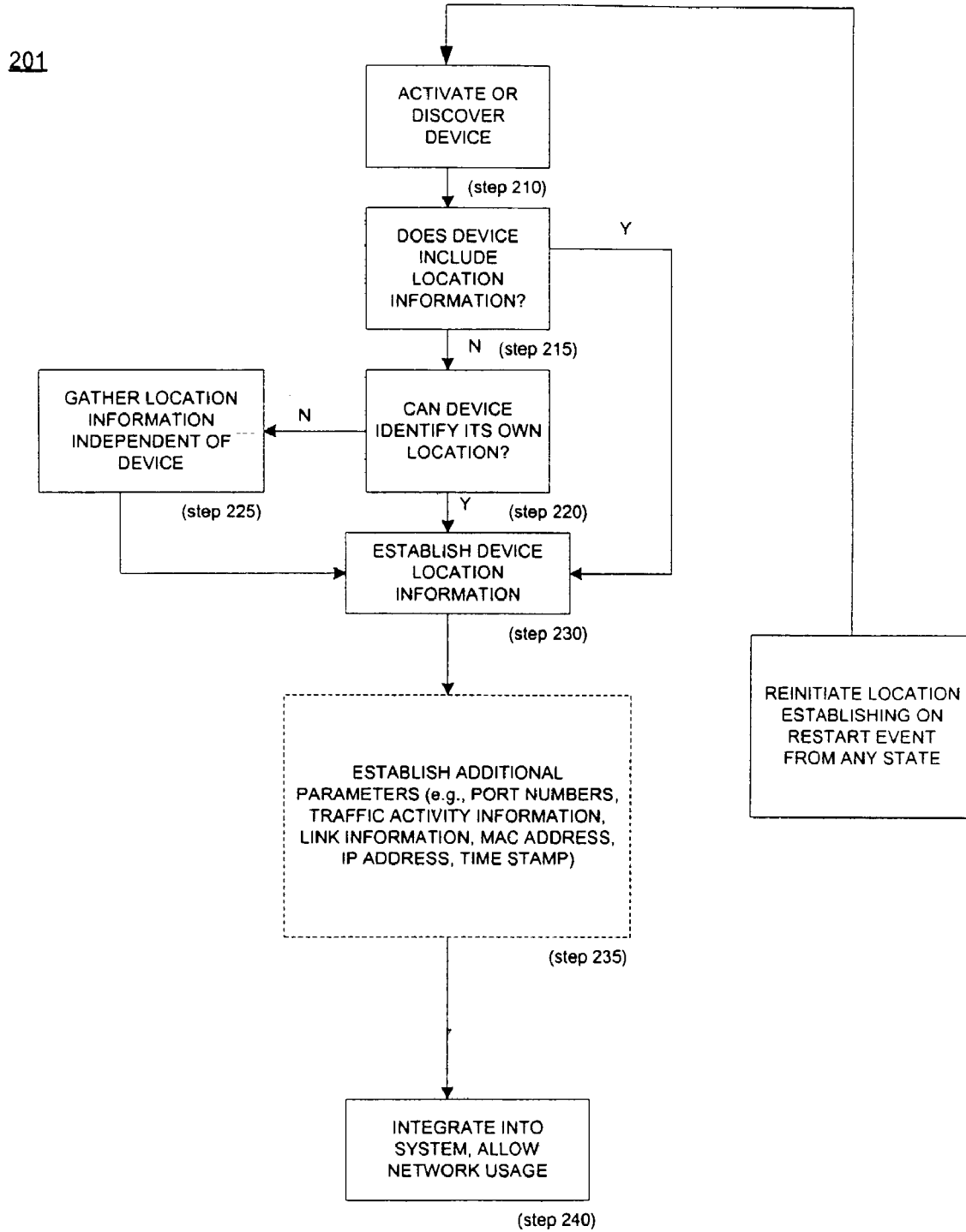
FIG. 2 is a block diagram of an illustrative process employing location information.
Figure 3:
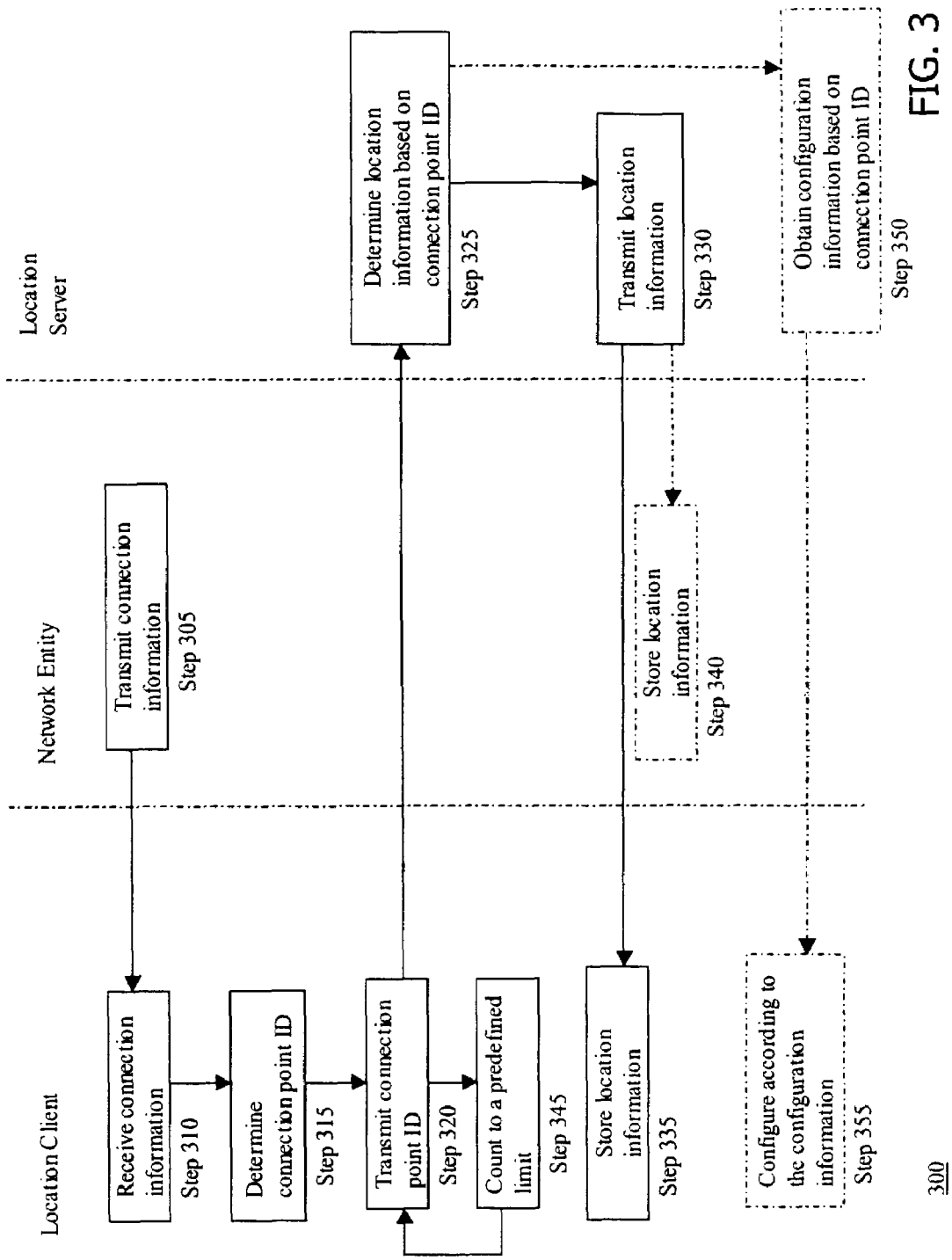
FIG. 3 is a block diagram of another illustrative process employing location information.

2.0 Locating Devices Overview (FIGS. 1, 2, and 3)

In determining the location of a device, system 100 employs one or more of a number of mechanisms/techniques so that location information can be verified and trusted by system 100. One general characteristic of these mechanisms is that devices or applications within infrastructure 101 do not necessarily trust devices outside infrastructure 101, even if those outside devices declare that they are at certain locations. That is, the determination of the location of a device is preferably based on information that is obtained directly by system 100 using network infrastructure 101, rather than supplied by a device itself. System 100 uses various approaches to obtain information to use when determining the location of a device communicating with the network, with some specific approaches being applicable to cable-based or wireless transmission media.

In general overview, for wireless devices (e.g., devices communicating via a wireless transmission medium), system 100 maintains information that is used to locate the devices based on the characteristics of wireless communication between typically multiple devices (e.g., 160*i* and 160*j*) in network infrastructure 101 and a wireless user device (e.g., 104*b*). Generally this approach is referred to as triangulation, with the understanding that this includes all varieties of remote location determination and approximation including those based on variations in time delay, signal strength, and directionality of signals based on the location of a wireless device, and including both analytical or model-based approaches as well as approaches that are based on prior measurement and recording of transmission and propagation characteristics at various locations.

For devices connected via cable, system 100 maintains information that characterizes the locations of the cable connection points, for example in a location database stored in location module 185. Such a database is populated and maintained in a variety of ways. For example, once network infrastructure 101 has been physically arranged, a survey of all the cable connection points can be undertaken to record the physical location corresponding to each cable connection point 160 and its corresponding connection port in network infrastructure 101. Then, as a device or the network infrastructure identifies a cable connection point 160 to which the device is connected, system 100 uses the location database to determine the location corresponding to the identified connection point. The connection points are identified using a unique connection point ID. The value of the connection point ID can be, for example, a number, a text string, or a combination of infrastructure pertinent information.

After determining the location of a device using one of these techniques, in one example system 100 maintains the location information centrally on the location server 134 in the location database in location module 185*a*. In the case of wireless devices, system 100 dynamically modifies the location of the device stored in the location database as the device moves. System 100 can track the user device itself, and/or the closest network entry device (e.g., 114) through which the wireless user device communicates. With the devices that communicate via a cable, system 100 updates the location database if and when a device is moved from one cable connection point (e.g., wall jack) to another. The devices communicate the location information to each other using a protocol using layer 2 (the data-link layer) or layer 3 (the network layer) of the Open Systems Interconnection (OSI) communication model. For example, the devices communicate with each other using IP version 4. Other layers and protocols can also be used. Additional and alternative mechanisms for locating devices are described further below in the alternatives section.

2.1 Techniques for Determining Location of Connection Points (FIG. 1)

Following below are examples of more detailed mechanisms/techniques to determine the location of the connection points, thus determining the location of the devices employing those connection points. The detailed descriptions of various mechanisms are divided into those mechanisms most applicable to wireless connections (i.e., connections using a wireless transmission medium) and those mechanisms most applicable to cable connections (i.e., connections using a cable-based transmission medium), although in general, mechanisms may be applicable to both types of connections. There can be examples when the mechanisms can be applicable to other types of connections (e.g., mechanisms for cable connections can be applicable for wireless connections).

2.1.1 Wireless Connections (FIG. 1)

Referring now to some detailed techniques for wireless connections, as described above, two example types of wireless communication chosen to illustrate these techniques are via radio frequencies or infrared frequencies. System 100 can employ different mechanisms for each of these types of communication. System 100 can employ a first group of mechanisms/techniques for identifying the location of a device (e.g., 104, 114) that communicates via radio frequencies. For example, system 100 triangulates the location of a device using one or more wireless access points, such as 160*i*-*j*, associated with network entry devices 114, such as 114*a* and 114*b*, respectively, as shown in FIG. 1. As another example, system 100 determines a device's location based on the proximity to an entry device. Following below is a listing of various techniques system 100 can employ to determine the location of a wireless device.

System 100 can employ a number of known triangulation techniques, including the use of signal strength, angle of arrival, and relative time delay approaches. System 100 can employ off-frequency searching, such as by frequency hopping for short periods of time to detect stations on frequencies alternate to that employed for data exchange. For example, wireless access point 120*a* can operate at a first frequency f1. Wireless access point 120*b* can operate at a second frequency f2. Periodically, and for a relatively short period of time, wireless access point 120*a* operates at the second frequency f2 to detect and determine signal characteristics of a device communicating with wireless access point 120*b*. Similarly, wireless access point 120*b* periodically and for a relatively short period of time operates at the first frequency f1 to detect and determine signal characteristics of a device communicating with wireless access point 120*a*.

System 100 can employ a number of known triangulation techniques, including the use of signal strength, angle of arrival, and relative time delay approaches. System 100 can employ off-frequency searching, such as by frequency hopping for short periods of time to detect stations on frequencies alternate to that employed for data exchange. For example, wireless access point 160*i* can operate at a first frequency f1. Wireless access point 160*j* can operate at a second frequency f2. Periodically, and for a relatively short period of time, wireless access point 120*a* operates at the second frequency f2 to detect and determine signal characteristics of a device communicating with wireless access point 160*j*. Similarly, wireless access point 160*j* periodically and for a relatively short period of time operates at the first frequency f1 to detect and determine signal characteristics of a device communicating with wireless access point 160*i*.

System 100 can perform calculations to approximate distance from a known access point (e.g., 160*i-j*) as a function of signal strength attenuation (e.g., the signal is at x strength so the device must be located in a range of y-z feet away). In addition to calculations, system 100 can also search stored associations of signal characteristics and their corresponding locations. This information can be stored in a signal characteristic database. A network administrator generates this signal characteristic database by measuring predefined signal characteristics at different locations and storing the measured characteristics for each of the locations. When subsequently determining a location of a user device, if system 100 detects a signal characteristic identically corresponding to a location, system 100 determines that the user device is at that corresponding location. If the signal characteristic is not identical, system 100 can use multiple entries within the database to extrapolate the user device location information based on the stored signal characteristic and location associations. This technique is sometimes referred to as RF training.

Using multiple frequencies and/or connection-points and/or antennas may improve the accuracy of location derivation techniques. For example, if the same access point is used at different frequencies, system 100 can use the error in location information among the different frequencies to infer location more accurately. In addition, the use of multiple access points (e.g., signals from user device 104*b* received at 160*i* compared with signals received at 160*j*) may improve relative location accuracy in a type of triangulation or averaging of signal strength indicators. System 100 can employ multiple antennas for that purpose. Multiple antennas (not shown) may also be used to assert a line of bearing. In that case, the relative separation of the antennas and the accuracy of the known spacing both may provide improved location accuracy. System 100 also can employ ultra wide band waves to determine relative location of one or more devices. As the accuracy of the location derivation increases by using these improved techniques, system 100 can assign a higher value for the level of trust parameter associated with that location.

System 100 also can use signal amplitude differential from the network entry devices 114*a* and 114*b* to determine relative location of user device 104*b* with respect to an antenna on network device 114*a* or 114*b*. System 100 can combine techniques, such as using signal amplitude differential combined with the phase differential techniques described above to determine location. The location techniques described are not limited to any specific type of antenna technology. System 100 can employ an antenna associated with a wireless access point, or an antenna associated with a stand-alone device, including, but not limited to, a personal digital assistant or a laptop computer, designed to relay information to a network-related device employed to calculate relative location from received data. One or more antennas can be deployed in one or more wireless access points. System 100 can also vary and limit the transmission strength of the wireless access points, so that system 100 can determine and control a radius of relative location based on the radius of operation due to the limited transmission strength. This relative location can be further limited from the radius of operation by other physical barriers such as walls and non-accessible locations within the radius of operation.

System 100 also can employ a second group of mechanisms for identifying the location of a wireless device (e.g., 104, 114) that communicates via optical technology, such as infrared light waves and lasers. More specifically, the use of an infrared transmitter and receiver can limit the actual distance user device 104*b* can be from a network entry device 114*a* or 114*b*, similar to the limited transmission strength above. Thus, system 100 determines a relative position of user device 104*b* using that maximum distance limit as a radial boundary from network entry device 114*a* or 114*b*. Further, a line-of-site requirement for infrared can limit the boundaries further, although reflective devices can be used to alter such limitations. As described above, system 100 can use physical barriers, such as walls, to limit the determined boundaries of the allowable locations of the infrared device.

System 100 uses the techniques above for radio and infrared communications to determine the location of a wireless device. As described in more detail below, system 100 may use the above techniques to determine the absolute location of wireless user device 104*b* itself, or use the above techniques to determine a relative location, determining whether wireless user device 104*b* is closer to wireless access point 160*i* or 160*j* and using other known parameters, such as transmitter strength and physical barriers. The location information gathered by system 100 (e.g., via access points 160*i* and 160*j*) using the above techniques may be considered trusted information if the network-controlled devices (e.g., access points 160*i* and 160*j*) collecting the information are trustworthy. The devices are considered trustworthy if, for example, they are part of infrastructure 101 and cannot be accessed, moved, and/or modified by anyone except authorized network administrators. Instead of receiving a location from a wireless device and relying on that received information as accurate, system 100 verifies the location of a device itself using one or more of the above techniques. Determining location information for an authenticated user by trustworthy devices (e.g., a device within infrastructure 101 that cannot be altered) enables system 100 to assign to the location information a higher value for the level of trust and enables greater security in the permitted access to system 100 as described in more detail below.

2.1.2 Cable Connections (FIG. 1)

Referring now to some detailed techniques/mechanisms to determine a location of a device using cable connections, system 100 can search locations of connection points previously stored in a location database and/or system 100 can use characteristics of signal propagation through a cable-based transmission medium. In one example, system 100 searches a location database to find the location of a connection point to which a device is connected. The database is located in location module 185 of location server 134. As described below, system 100 assigns a unique identifier to each connection point 160. When a device connects to system 100, system 100 determines the unique identifier of the cable connection point to which that device is connected. System 100 searches the location database to find the connection point with that unique identifier and uses the location that corresponds to that connection point. To use this technique, the location database is populated when the cable connection points are installed and/or when the connection points are first used.

The process to generate the database can be manual and/or automated. In an example of a manual process, a network administrator enters the unique identifier for each connection point and its corresponding location in the location database. For example, the network administrator uses a map (e.g., floor plan, office layout, and the like) to determine the location information of each of the installed connection points. The location information obtained from the map and entered into the location database can include coordinates of the connection point (e.g., lat 42°, long 48°), a string description of the connection point (e.g., room ten, first floor, building one) and the like.

In an example of an automated process, system 100 uses user device 104 with its own location determining system (e.g., GPS) to provide system 100 with location information as user device 104 is connected at each connection point 160. The system 100 can employ a trusted user device (e.g., a user device with no/low probability of providing false location information or always under control of a network administrator) or an untrusted user device (e.g., a device not under the control of the network administrator).

With an untrusted user device, system 100 can attempt to independently verify the location information received from the untrusted device. For example, if the untrusted device can use both cable-based and wireless transmission media (e.g., a laptop with a network card and a wireless transmitter or infrared port), system 100 can use one or more of the wireless techniques above to verify the location of the device while the device communicates using a cable connection point. System 100 can also use one or more of the signal characteristic techniques below to verify the location of the device while the device communicates using a cable connection point.

With a trusted user device with its own location determining system, as system 100 determines the connection point to which the trusted user device is connected and receives the location determined by that trusted user device, the system 100 adds an association of the connection point and its corresponding location to the location database. When the trusted user device connects to additional connection points, system 100 populates the location database further until all connection points have corresponding locations. In the association, system 100 can use a unique identifier to identify each of the connection points.

In another example of an automated process, system 100 employs a trusted user device 104 with its own location determining system that can work in the absence of GPS data. System 100 employs a user device with standards-based LAN connectivity capabilities. The user device is capable of determining an absolute 3-dimensional position via GPS and also has the capability, likely via an inertial navigation system, to determine its absolute position in the absence of GPS data. An inertial navigation system may be preferred because the GPS uses very low power transmissions from the satellites and reception indoors or even outdoors in heavily developed areas may be poor or non-existent. If system 100 provides a start or reference position to an inertial-based system; that system can maintain very accurate 3-dimensional location datum with no external information. In addition to the starting position, system 100 can provide a security feature to the user device to ensure that its location information is trustworthy. This can include, for example, keys and laser techniques. The user device calculates absolute position information, and has the capability to format that information for IP transport over a LAN via its LAN interface. An operator can go to a port providing access to the LAN, connect the trusted user device to that port, and command that the current location information derived by the user device be sent to the location database in the location server 134. Upon receipt of that information, system 100 updates the location information in its location database for that connection point.

In another example, as described in more detail in the alternatives section, a trusted third party can act as an agent to provide the location of connection point 160a. For example, if the connection point 160 is a telephone jack in a user's home, the corresponding telephone number can be used as a connection point ID. The telephone company can act as a trusted agent and provide a location (e.g., residential address) of that connection point. System 100 assigns a value for the level of trust parameter associated with that location information based on the trustworthiness of the source, as described below. The more system 100 trusts the third party agent, for example the phone company, the higher level of trust system 100 associates with the provided location information.

As an alternative or in addition to the predefined database, system 100 can use characteristics of signal propagation through a cable-based transmission medium to determine the location of a device. More specifically, system 100 can use a characteristic of a signal that varies with the length of the cable-based transmission medium (e.g., time delay, time-domain reflectometry (TDR) techniques, signal attenuations, round-trip delay and the like) to determine the length of cable through which the signal is traveling. For a connection point, system 100 measures the particular signal characteristic and based on that measurement, system 100 determines the length of the cable. As described above for wireless connections, system 100 employs a lookup table, database, and/or function that relates the characteristic measurement to a location for cable connections also. Data for the signal characteristics (e.g., round-trip training for cable-based media) can be performed at the same time connection points 160 are being mapped with a trusted GPS, as described above, so that location is not based solely on estimating delay.

For example, a signal characteristic database contains the association that a measured time delay of a signal corresponds to a specific length of cable from the network entry device 114a. System 100 determines a relative position of user device 104a using that determined cable length as a maximum distance from connection point 160a by accounting for (e.g., subtracting) the length of cable 112 included in the infrastructure. Further, as described above, system 100 can use physical barriers, such as cable runs and walls, to limit the determined boundaries of the allowable locations of the user device 104*a*. This technique is useful in determining whether user device 104*a* is connected to connection point 160*a* using a long length of cable, thus allowing user device 104*a* to be located a substantial distance away from the connection point 160*a* (e.g., in a different, and perhaps unauthorized, room). For example, system 100 determines, using signal characteristics as described above that there is 10 feet of cable between user device 104*a* and network entry device 114*a*. System 100 has information that the cable length from connection point 160*a* to 114*a* is 7 feet and is fixed (i.e., runs through a wall and cannot be modified). Using this combined information, system 100 determines that the length of cable from connection point 160*a* to user device 104*a* is 3 feet and so the user device 104*a* is confined to the room in which connection point 160*a* is located.

Figure 8:
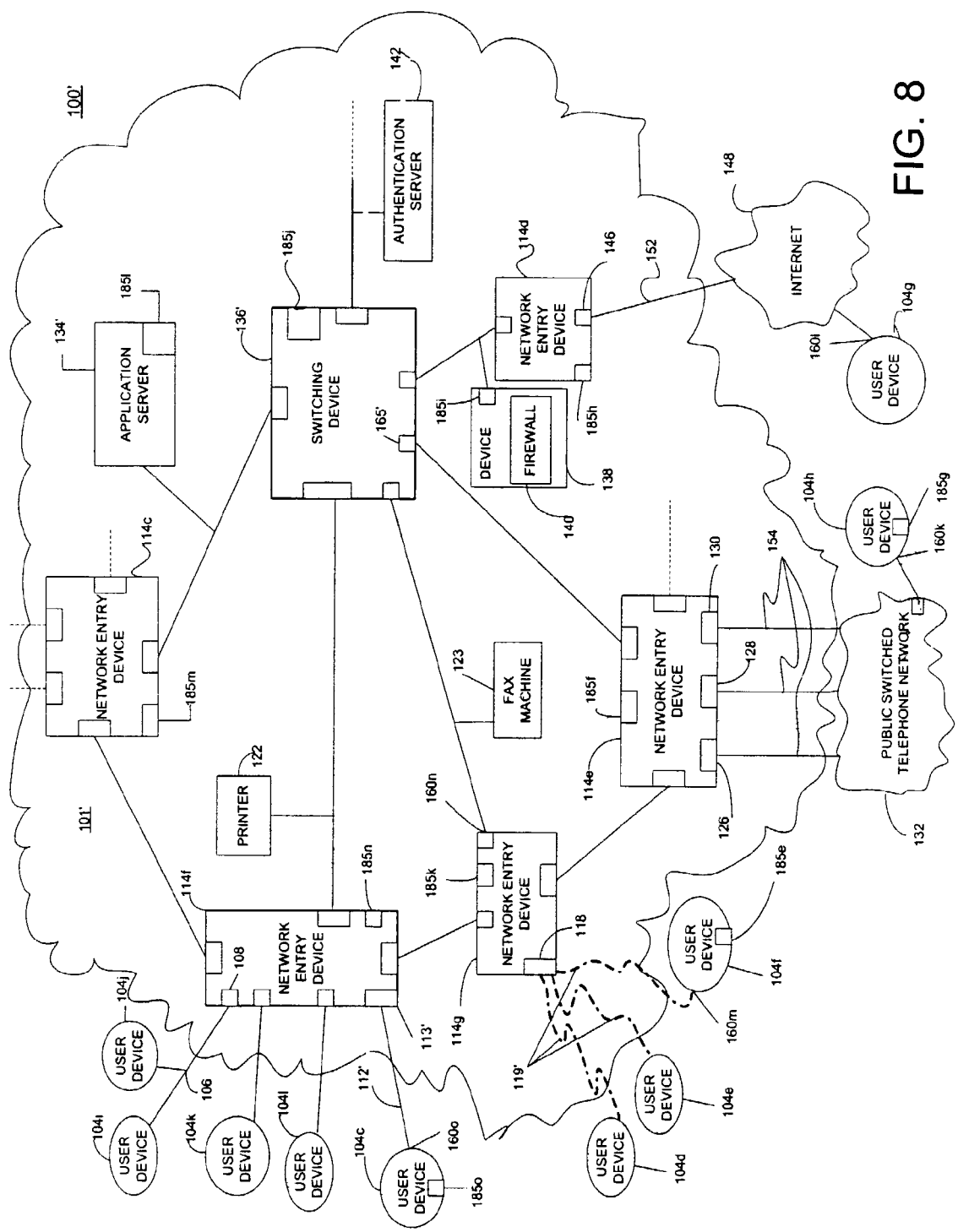
FIG. 8 is a block diagram of another example system with location information.

The use of signal characteristics also enables system 100 to determine which connection point a user device 104 is connected to for cables with multiple connection points (e.g., 104*i* and 104*j*, FIG. 8). For example, system 100 can use a calculated cable length to determine which of the connection points user device is within the range of the cable length. Once a connection point is identified, system 100 can obtain its location via the location database and then determine the location of the user device 104. It may be the case that system 100 identifies multiple connection points within the range of the cable length. It some instances, this may still be enough to authenticate the location, as described in more detail below. For example, the cable length may indicate that the user device is connected to one of the connection points in conference rooms 1-5 on the second floor. All of the conferences rooms, however, are in permitted locations for the requested network resources, so this granularity and precision is acceptable for authentication in this case.

2.2 Location Information Database (FIG. 1)

As described above for both wireless and cable-based transmission media, system 100 maintains and updates the location information associated with the connection points (e.g., 160*a-i*) of the system 100 in a location database. The information included in the location database can vary. For example, Table 1 is a table containing the type of information that can be included in the location database. As illustrated in Table 1, each row represents an association between a connection point and its corresponding location in one or more formats. The "Connection Point ID" column contains the unique identifier associated with a particular connection point. The connection point ID can be any ID that uniquely identifies a connection point. As described in more detail below and illustrated in Table 1, in one example the combination of a device Media Access Control (MAC) address (e.g., 00001d000001) and a port MAC address within the device (e.g., 00001d000101) determines the connection point ID. The locations contained in Table 1 are included in two format types for each connection point ID. The first type is an American National Standards Institute (ANSI) Location Identification Number (LIN) and the second type is a coordinate of latitude and longitude. (Some additional example formats system 100 can employ are described in the alternatives section below.)

The location information of Table 1 additionally includes the optional parameters "Level of Trust" and "Device ID". The level of trust, as explained in more detail below, is a parameter with a value in a predefined range, where the range represents the trustworthiness of the location reference. The level of trust generally corresponds with the trustworthiness of the source providing the location of the connection point. A higher level of trust value represents a higher level of confidence that the location reference is accurate, reliable and has neither been altered or generated falsely to gain normally unauthorized access. The device ID uniquely identifies the device that is connected to the connection point. The device ID information enables system 100 to store a map of the physical locations of all the network devices (e.g., 104, 114, 136). This is beneficial if there are devices associated with system 100 that are not configured to acquire and/or store their location information. System 100 can use this corresponding device information to enable location server 134 to transmit location information to a location-aware application since the device cannot transmit the location information itself. IN other words, system 100 can act as a third-party verifier for applications requiring verified location information. Table 1 can include other information in addition or as an alternative to the device ID. For example, Table 1 can include MAC address, address, phone number, protocol type, asset ID, owner and/or the like.

TABLE 1

| Connection Point ID | Location ID Type | Location Reference | Location ID Type | Location Ref. | Level of Trust | Device ID |
|---|---|---|---|---|---|---|
| 00001d000001: 00001d000101 | ANSI LIN | xxxxxxxxx1 | Lat-Long | $x1°$ by $y1°$ | 2,256 | Model: ABC S/N: 123 |
| 00001d000001: 00001d000102 | ANSI LIN | xxxxxxxxx2 | Lat-Long | $x2°$ by $y2°$ | 2,256 | GUID: A82C3 |
| 00001d000001: 00001d000103 | ANSI LIN | xxxxxxxxx3 | Lat-Long | $x3°$ by $y3°$ | 2,256 | |
| 00001d000001: 00001d000104 | ANSI LIN | xxxxxxxxx4 | Lat-Long | $x4°$ by $y4°$ | 2,256 | |
| 00001d000001: 00001d000105 | ANSI LIN | xxxxxxxxx5 | Lat-Long | $x5°$ by $y5°$ | 2,256 | |
| 00001d000001: 00001d000106 | ANSI LIN | xxxxxxxxx6 | Lat-Long | $x6°$ by $y6°$ | 2,256 | |
| 00001d000001: 00001d000107 | ANSI LIN | xxxxxxxxx7 | Lat-Long | $x7°$ by $y7°$ | 2,256 | |
| 00001d000001: 00001d000108 | ANSI LIN | xxxxxxxxx8 | Lat-Long | $x8°$ by $y8°$ | 2,256 | |
| 00001d000001: 00001d000109 | ANSI LIN | xxxxxxxxx9 | Lat-Long | $x9°$ by $y9°$ | 2,256 | |

TABLE 1-continued

| Connection Point ID | Location ID Type | Location Reference | Location ID Type | Location Ref. | Level of Trust | Device ID |
|---|---|---|---|---|---|---|
| 00001d000001: 00001d000110 | ANSI LIN | xxxxxxxxx10 | Lat-Long | x10° by y10° | 2,256 | |

2.3 Specific Examples of Locating Devices (FIGS. 1, 2, 3, and 8)

As described above, once the location database is established, system 100 can provide the location information to a device when that device connects to a connection point. This can include providing location information to devices outside of infrastructure 101 as well as devices within infrastructure 101. FIGS. 2 and 3 illustrate additional examples of system 100 locating devices. FIG. 2 broadly illustrates the steps system 100 performs, from discovering a device's connection to system 100 to allowing the device access to the network. FIG. 3 illustrates more specifically the steps system 100 performs to determine the location of the discovered device. In other words, FIG. 3 shows a portion of the steps of FIG. 2 in more detail.

FIG. 2 broadly illustrates an example of a sequence of steps system 100 performs, from discovering a device's connection to system 100 to allowing the device access to the network. Referring to the example location identification process 201 of FIG. 2, system 100 activates or otherwise discovers (step 210) a device destined for a network association, or a device already network associated. System 100 queries (step 215) the device for location information. That location information may be of absolute or relative type. If location information does not exist, system 100 queries (step 220) whether the device can identify its own location. If the location information does exist, or the device can provide a trustworthy location, system 100 establishes (step 230) the device location information. A location is trustworthy, for example, if the system 100 assigns a level of trust value for that location that is above a predefined threshold. The predefined threshold can vary depending on the network resources that the device requests. For example, sensitive information and applications require a much higher threshold than access to public information.

If the device cannot provide its own location information, or the location information is not associated with a level of trust acceptable to system 100 for the particular transaction requested, the location information is determined (step 225) independently of the device, by system 100 itself or a trusted third party agent. After determining (step 225) a trustworthy location, system 100 establishes (step 230) the device location information.

Whether system 100 can trust the location information from a device (e.g., associate a high enough level of trust value with the location) can depend on the source of that location information. For example, if the location information came from a secure device within infrastructure 101 not vulnerable to modification, system 100 can trust the location information and assign a the location information a high level of trust value. If the location information came from a GPS and/or has been verified by a third party certificate with security features allowing for a low level of probability of providing a false location, system 100 can trust the location information, but with a lower level of trust value than if the location information came from system 100 itself. The range of level of trust values is described in more detail in the restricting access section below.

In one example where system 100 determines (step 225) the location of a device, thus assigning a high level of trust value to that location, the device receives connection information from a network entry device (e.g., 114a, 114b). The connection information includes information that the network entry device has, such as a network entry device identifier and a port number of the network entry device to which the connection point is connected. The device transmits the received connection information, or a portion thereof, to system 100, or more specifically, to a portion of the network maintaining the location information database (e.g., location server 134). Using the received information (e.g., network entry device identifier and port number), location server 134 determines the connection point to which the device is connected. Referring to the unique identifier of that connection point, which in one example could be the combination of the network device identifier and port number, location server 134 retrieves the location associated with that connection point. Location server 134 transmits to the device the location information associated with the connection point.

Continuing with process 201, system 100 optionally confirms (step 235) a predefined list of additional parameters, either through a database search or a table update. System 100 may employ that predefined list of parameters to define network access as described below. The predefined list of parameters may include, but is not limited to, the device port number of the connection, traffic activity and link information, MAC address, IP address, a timestamp, and activity staleness. Upon satisfaction by system 100 that the appropriate predefined list of parameters and device location information has been gathered (step 235), system 100 permits (step 240) network access. As described below, the location information may be used as a supplement to existing network usage control means, such as NOS, RADIUS, IEEE 802.1X, IEEE 802.1Q, firewalls, and QoS mechanisms. Further, system 100 continually polices against these mechanisms to ensure that network usage does not go beyond the bounds set by parameters defined within these mechanisms, including location restrictions for devices and/or data.

In general, in alternative sequences of steps, system 100 establishes a device location and a level of trust of that established location based on a combination of multiple inputs, including location information included in the device itself (e.g., step 215), location information identified by the device (e.g., step 220), and location information gathered independently of the device (e.g., step 225), without necessarily following the sequence shown in FIG. 2.

In addition, FIG. 2 shows a single sequence of steps to determine a location of a device and to act on that determined location. In general, this process, and other processes involving determining or verifying device locations that are described below, may be repeated while the device is connected to the network for any of a number of reason of interest to the network admin that re-determining location is required, including in the event of a detected attack, when new information about the device's location becomes available, periodically, or based on an internal or external network events or other matters of network policy. This repetition of the process provides an ongoing policing function. For example, such a policing function can be used so that a device cannot be established at one physical location, and then moved to another physical location where its privileges may be different.

As introduced above, a wide variety of events may initiate the process of determining and validating the location of a device. These can include, but are not limited to: a timer expiring, a communication link being broken, a communication session terminating, a change in a user's credential, triggering of a firewall alarm, a new network device joining the network, prompting by a management station, particular movement of a device is detected, a shadow (users or devices of network) device is detected.

Referring to FIG. 3, example process 300 illustrates the steps system 100 performs to determine the location of the discovered device. For clarity and example only, some portions of example process 300 refer to a location server and a location client. A location server refers to a device of system 100 comprising functionality in location module 185 that enables that device to provide location information to another network device. This can include hardware and/or software applications for the storage of location information parameters, access to the storage devices containing values for parameters, algorithms and processes to determine the location of a device and other like functionality. Additionally, location module 185 of a location server may be further configured to provision operational configuration parameters based on the location of the network-attached device, as illustrated in the optional steps of FIG. 3. A location client refers to the device for which the location server is trying to determine location. The network entity of FIG. 3 represents an intermediary device that includes the access port through which the location client communicates.

Referring to FIG. 1, for an example where the location client is user device 104a, the network entity of FIG. 3 is the network entry device 114a, which has connection port 113 through which the user device 104a communicates. For an example where the location client is network entry device 114a, the network entity of FIG. 3 is the switching device 136, which has the connection port 165 through which device 114a communicates. As these two examples illustrate, network entry device 114a can act as both a location client and an intermediary device. In a distributed example described in the alternatives section below, network entry device 114a also can act as a location server, thus combining the network entity and the location server of FIG. 3 into a single device.

Referring to process 300, the network entity (e.g., 114a) transmits (step 305) connection information (e.g., in the form of data packets) to the location client (e.g., 104a) that allows for the detection of a unique connection point ID. This connection information can represent the port to which the connection point is physically connected. The connection information can be in a format compliant with many different protocols. The location client receives (step 310) the connection information and determines (step 315) a connection point ID. For example, the location client can extract the connection point ID from one of the example packet types.

For illustration, a specific example employs IEEE Spanning Tree Bridge Protocol Data Unit (BPDU). In an IEEE 802.1D Spanning Tree BPDU example, every switch port with spanning tree enabled will forward (step 305) a BPDU at regular intervals. A BPDU comprises the following information: (i) the primary MAC Address of the transmitting switch (bridge ID); (ii) the identifier of the transmitting port (the MAC address of the switch port sending the BPDU); (iii) the unique bridge ID of the switch that the transmitting switch believes to be the root switch; and (iv) the cost of the path to the root from the transmitting port. The location client receives (step 310) the IEEE spanning tree BPDU and decodes the unique bridge ID and transmitting port ID as its connection point ID. Using that decoded information, the location client determines (step 315) that the connection point ID={Bridge ID MAC Address}+{Transmitting Port ID MAC Address}. Alternatively, the location client forwards these received parameters to the location server and the location server generates the connection point ID by combining the applicable parameters, as described in FIG. 2.

It can be seen that this approach may be applied to other discovery protocols and techniques, with modification dependent upon specific protocol formatting. Also, system 100 can employ other unique identifiers. For example and referring to FIG. 8, for user device 104h, which is connected to system 100' through a telephone network 132, system 100' can employ a phone number to uniquely identify the connection point 160k (e.g., phone jack) to which the user device 104h is connected. Similarly, user device 104g can be a personal computer connected to Internet 148 via a cable modem that has been assigned a unique IP address. System 100' can employ this unique address, alone or in combination with an ISP identifier, to uniquely identify the connection point 160l (e.g., a jack or the end of a cable for a cable modem) associated with user device 104g.

In process 300, the location client transmits (step 320) the connection point ID to the location server. The location server determines (step 325) location information for the location client based on the connection point ID. The location information can be defined in a location database within the location server as described above or discovered from the network infrastructure 101' using the techniques described above.

After determining (step 325) the location information, the location server transmits (step 330) the location information to the location client. If configured to do so, the location client stores (step 335) the location information for future reference. In addition to the location, the received data may include a corresponding level of trust value associated with the origination of the location information. The location information, and any additional information, may also be protected with a security feature. For example, the information may be encrypted with a temporary key associated only with the particular connection point to which the location client is connected.

To determine (step 325) location information, the location server employs a location database comprising connection point ID information and geographic information. An advanced location server can also act as a device registry and can map unique identifiers of the devices (e.g., 104, 114) to their corresponding connection point and geographic information, as illustrated in Table 1 above. As illustrated in FIG. 3, the location server can optionally store (step 340) the location information in a storage module on the network entity In another example, the network entity storage module and the location database can be the same. Thus, more than just a topology, the location server stores and/or has access to information with the physical locations of the mapped devices.

Referring to process 300, the location client counts (step 320) a predefined amount of time to resend (step 320) its connection point ID information to the location server periodically to ensure the accuracy of the location information.

The location server sends (step 330) the location information to the location client after referencing (step 325) the connection point ID that was previously sent by the location client. This periodic verification is one example of system 100 periodically policing location information. Or in other words, periodically verifying that the location client has not changed locations.

Also shown in process 300 are the optional steps 350 and 355, representing examples where the location server is expanded to provision and/or store information other than the location references in the location database. In this example, the location server obtains (step 350) configuration and/or provisioning information based on the connection point ID and transmits this additional information to the location client. Using this additional information, the location client can configure (step 355) itself in accord with this additional data, which is based on location. Similarly, although not shown, the network entity can also configure itself.

After system 100 authenticates the location information and optionally configures devices based on their location, system 100 continually polices the network at the edges of infrastructure 101 to ensure that policies regarding location information are enforced. The steps 365, 370, 375, and 380 of process 300 illustrate an example of edge policing by system 100. For example, when the location client requests (step 365) additional resources, the network entity (e.g., in the case of edge policing, network entry device 114) verifies (step 370), using any of the techniques described herein, that the location client is still at the same location as when the client was authenticated. If not, the location client is forced to repeat the authentication process at the new location. In response to a request for data, the location server, or another server and/or application on the network, transmits (step 365) the requested data to the location client via the network entity. As described in more detail below, the network entity determines whether there are any location restrictions on the data. If so, the network entity enforces (step 380) those location restrictions by, for example, not forwarding the data to the location client if the location client is at a prohibited location. As illustrated, the network entity polices both incoming requests and outgoing data in accordance with location based policies.

3.0 Network Operation Using Device Location (FIGS. 4, 5, 6, and 7)

As illustrated in the optional steps of FIG. 3, once system 100 determines the location of a device, system 100 can employ that location information to provide some automated operations. In other words, a network that is location-aware enables the utilization of information stored on a location client and/or in the location database to enhance the operation of the location-aware network. Because system 100 is able to learn the connection point to which any device is connected using the techniques above, system 100 can provide automated management based on the locations associated with those connection points. The operations and services that the system 100 provides for automated management based on location information vary. Some techniques/mechanisms are described below in more detail.

3.1 Provisioning and Configuring

One type of automated mechanisms involves the provisioning and configuration of devices as they are added to system 100. When added, system 100 determines the location of the added device and then based on that location, system 100 determines, for example, what particular configuration file should be loaded into the device, what type of network priorities the device should be assigned, such as bandwidth, latency, QoS and other like network policies. This mechanism enables system 100 to enforce any of these policies based on the location of each device. The examples that follow illustrate how system 100 can expand data within the location database to include the provisioning and/or configuration data.

3.1.1 Provisioning/Configuring Examples Using an Expanded Location Database

In one specific example of provisioning, a location server assigns location information and network specific configurations to Voice over IP (VoIP) handsets. The information is provisioned on the phone and includes, for example, Virtual LANs (VLANs) ID, traffic prioritization at layer 2 or layer 3, and an E911 LIN. This simplifies the information on VoIP phones in branch offices, for example. The provisioned parameters are added to the location information in the location database of the location server. An expanded location database for VoIP phone environments can include the following information: VLAN membership of the voice entity, layer 2 priority mappings for voice payload/voice control/non voice traffic, layer 3 class of service markings for voice payload/voice control/non voice traffic, location client's network layer address, ANSI LIN numbering, geographic location information including latitude, longitude, altitude and accuracy factor, device microcode file to boot (e.g., bootp server pointer), and/or other like parameters. Table 2 is a table containing an example of the type of information that can be included in an expanded location database that includes additional provisioning parameters for a VoIP network. In addition to the connection point ID and the location reference, the location database represented by Table 2 also includes a voice VLAN ID and a voice priority parameter. As described above, the location database also can include device ID data about a location client. In the VoIP example, these optional device ID parameters can include the handset extension number, the handset model number, the handset version, the handset network address, and/or the like.

TABLE 2

| Entry | Connection Point ID | Location ID Type | Location Reference | Voice VLAN ID | Voice Priority | Device ID (optional) |
|---|---|---|---|---|---|---|
| 1 | 00001d000001: 00001d000101 | ANSI LIN | xxxxxxxxxx1 | 101 | 5 | extension: 7082 model: 123 |
| 2 | 00001d000001: 00001d000102 | ANSI LIN | xxxxxxxxxx2 | 101 | 5 | |
| 3 | 00001d000001: 00001d000103 | ANSI LIN | xxxxxxxxxx3 | 101 | 5 | |
| 4 | 00001d000001: 00001d000104 | ANSI LIN | xxxxxxxxxx4 | 101 | 5 | |
| 5 | 00001d000001: | ANSI | xxxxxxxxxx5 | 101 | 5 | |

TABLE 2-continued

| Entry | Connection Point ID | Location ID Type | Location Reference | Voice VLAN ID | Voice Priority | Device ID (optional) |
|---|---|---|---|---|---|---|
| | 00001d000105 | LIN | | | | |
| 6 | 00001d000001: 00001d000106 | ANSI LIN | xxxxxxxxxx6 | 101 | 5 | |
| 7 | 00001d000001: 00001d000107 | ANSI LIN | xxxxxxxxxx7 | 101 | 5 | |
| 8 | 00001d000001: 00001d000108 | ANSI LIN | xxxxxxxxxx8 | 101 | 5 | |
| 9 | 00001d000001: 00001d000109 | ANSI LIN | xxxxxxxxxx9 | 101 | 5 | |
| 10 | 00001d000001: 00001d000110 | ANSI LIN | xxxxxxxxx10 | 101 | 5 | |

In one specific example of configuring, a location server enables automated configuration of location clients, such as switches and routers. Often, network switches have to support complex configurations, and that complexity limits the ability of the switch to be moved around the network. If system 100 enables a network switch as a location client, it is possible to automate the configuration of the network switch. In this example, a network operator enters a wiring closet and simply plugs in a network switch that only contains its network layer address and the network layer address of the location server. After the network switch powers up, it detects (step 310 (FIG. 3)) its location, for example as described above, by analyzing an IEEE Spanning Tree BPDU to determine (step 315 (FIG. 3)) its connection point ID. Once the network switch determines (step 315 (FIG. 3)) its connection point ID, the network switch initiates (step 320) a conversation with location server 134. In this example, the location server references (step 350 (FIG. 3)) the connection point ID to a location database field which represents the base configuration file of any network switch that may connect to the network at that location. Table 3 is a table containing an example of the type of information that can be included in an expanded location database that includes additional configuration parameters to configure a network switch. In addition to the connection point ID and the location reference, the location database represented by Table 3 also includes a configuration file parameter identifying the configuration file to be used to configure a location client at that corresponding location.

TABLE 3

| | Connection Point ID | Location ID Type | Location Ref. | Configuration file |
|---|---|---|---|---|
| 1 | 00001d000001:00001d000101 | Lat-Long | x1° by y1° | closet1.cfg |
| 2 | 00001d000001:00001d000102 | Lat-Long | x2° by y2° | closet2.cfg |
| 3 | 00001d000001:00001d000103 | Lat-Long | x3° by y3° | closet3.cfg |
| 4 | 00001d000001:00001d000104 | Lat-Long | x4° by y4° | closet4.cfg |
| 5 | 00001d000001:00001d000105 | Lat-Long | x5° by y5° | closet1.cfg |
| 6 | 00001d000001:00001d000106 | Lat-Long | x6° by y6° | tftp:/1.1.1.1/closet15.cfg |
| 7 | 00001d000001:00001d000107 | Lat-Long | x7° by y7° | closet1.cfg |
| 8 | 00001d000001:00001d000108 | Lat-Long | x8° by y8° | http:/2.2.1.1/closet99.cfg |
| 9 | 00001d000001:00001d000109 | Lat-Long | x9° by y9° | closet1.cfg |
| 10 | 00001d000001:00001d000110 | Lat-Long | x10° by y10° | ftp://3.3.3.3/config10.cfg |

Figure 4:
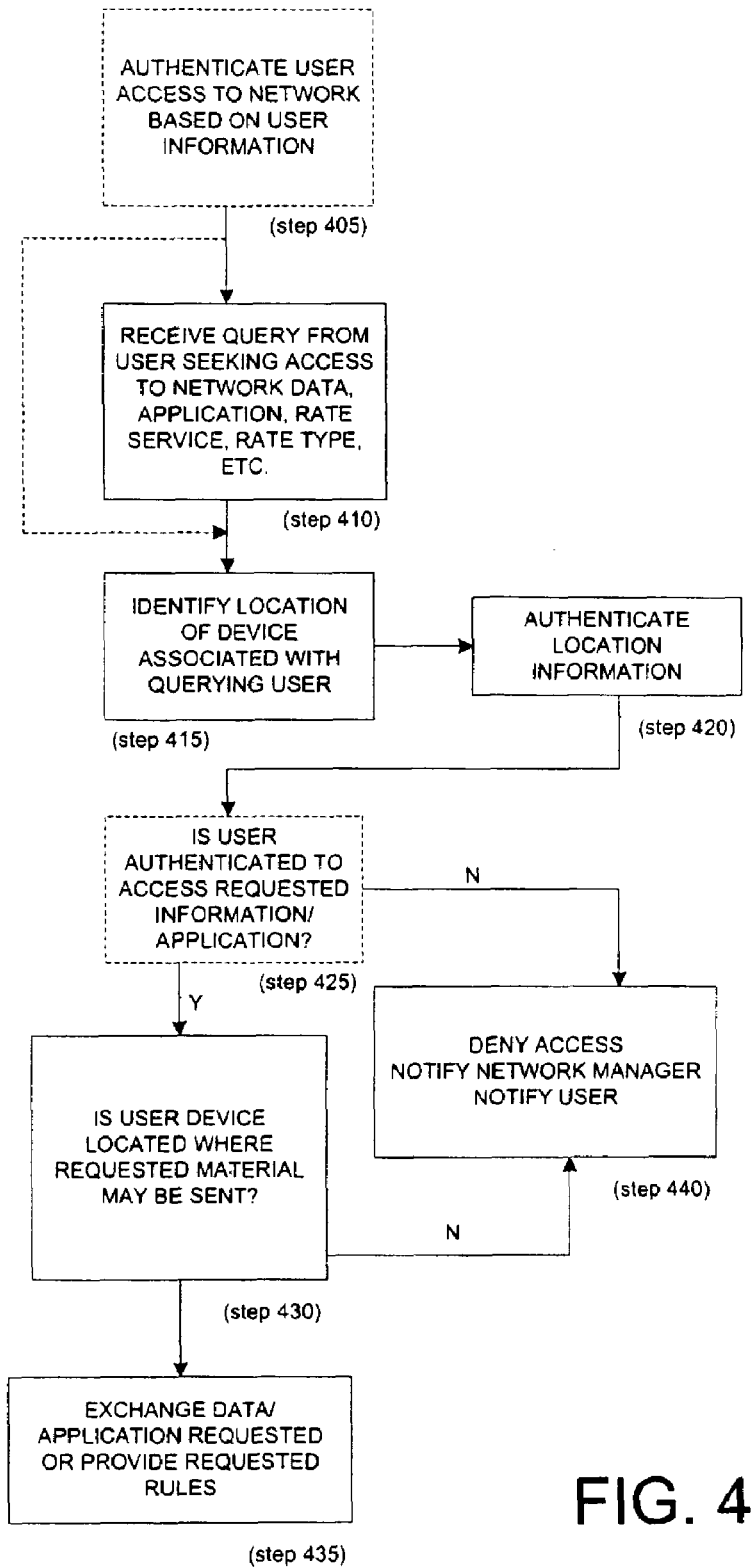
FIG. 4 is a block diagram of another illustrative process employing location information.
Figure 5:
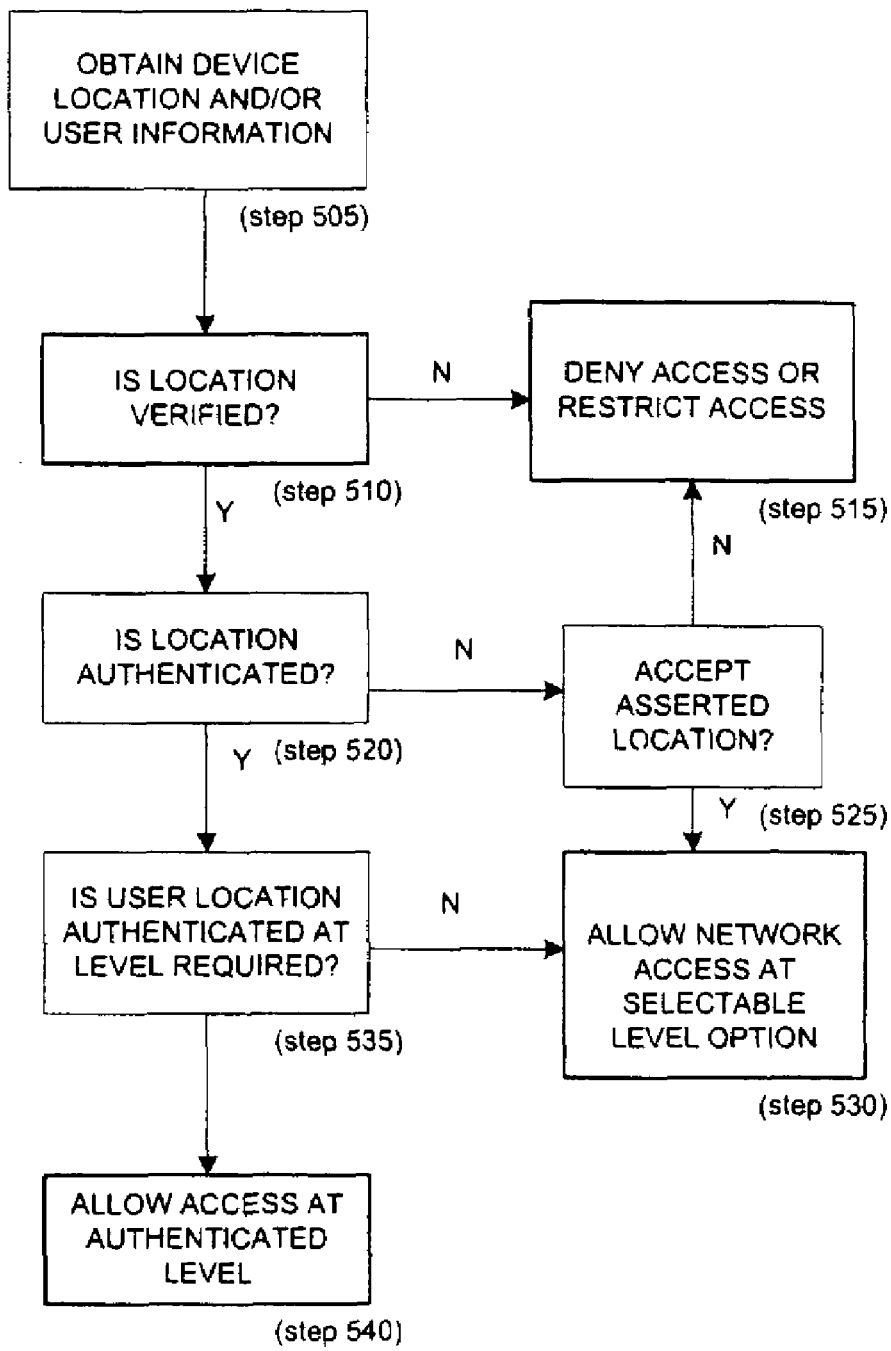
FIG. 5 is a block diagram of another illustrative process employing location information.
Figure 6:
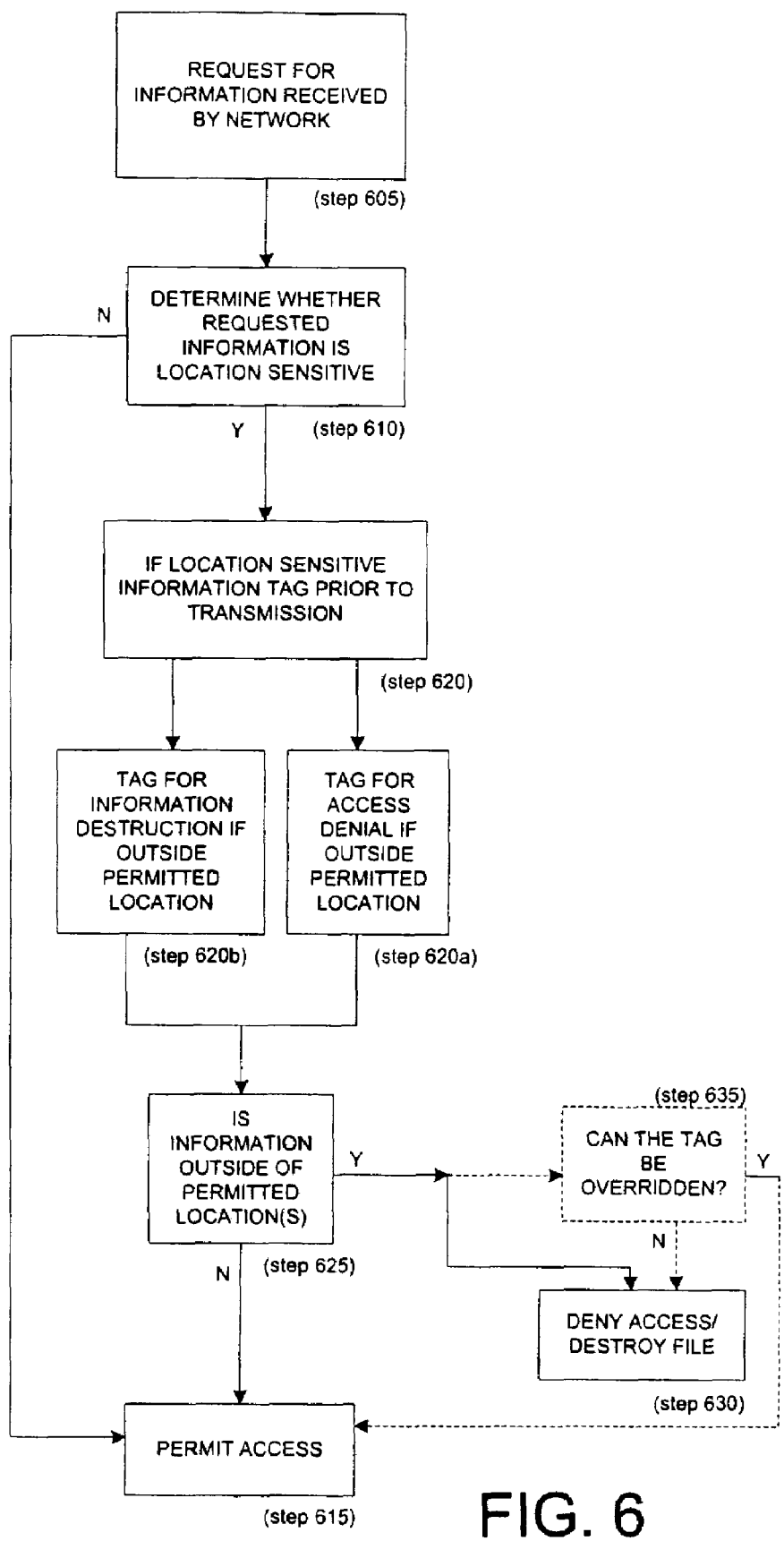
FIG. 6 is a block diagram of another illustrative process employing location information.

3.2 Restrictions Based on Location (FIGS. 4, 5, and 6)

In addition to provisioning and configuring, the operations of system 100 can be restricted based on location. These restrictions can involve restrictions on the access and use of system 100. These restrictions also can involve the transmission of data around and through system 100. For an overview example relating to network access, the location information within a network enables authentication based on location. Location information allows system 100 to authenticate a user not only based on the credentials provided by the user, but also based on the location of the device used by the user to access the network. Dependent upon the device location, system 100 can allow or restrict access to certain devices, information, applications, signal exchange priorities, and the like. Further, even if a device and/or its user supplies to system 100 a claimed device location, system 100 can employ the techniques described herein to confirm the location independently from the device. This ensures that the device location comes from a trusted source (e.g., assign an acceptable value for the level of trust parameter) and can be used reliably.

For an overview example relating to data restrictions, system 100 can add one or more parameters to data associated with a network (e.g., a proprietary database) for restricted access as a function of the location of the device seeking the information, or a combination of user and location information. For example, system 100 may be programmed to deny access to corporate business information upon request from a network entry device, or coming through an intermediate device that is located outside of a specified region. System 100 also can employ location information to effect a change in a file dependent upon the location of the device accessing that file. In particular, the file may include a lock-out indicator or a destruction indicator if an attempt is made to open it from outside a specified location. One example is sensitive corporate business information. If an attempt is made to access such information from what is otherwise an authenticated device, that information or file may nevertheless be destroyed if the authenticated device is not at a specified location or region. This feature can be seen as valuable in maintaining the security of files retained on or accessed by a device that is not in the possession of an authorized user. The examples that follow describe these overview examples in more detail.

3.2.1 Restricting Access to Network (FIGS. 4 and 5)

As described in the overview example, location information allows system 100 to authenticate and restrict a user based on the location of the device used by the user to access the network. The location information can be added as an authentication attribute to typical authentication systems. Entry into and usage of a network is typically regulated using authentication systems such as Network Operating Systems (NOSs), Remote Authentication Dial-In User Service (RADIUS), described in IETF Request For Comment (RFC) 2138, and IEEE 802.1X standard, which provides for port-based network access control based on a MAC identifier. In the case of NOS and RADIUS, an authentication server (e.g., 142 (FIG. 8)) provides the mechanism for establishing such authentication. In the case of IEEE 802.1X, the network entry devices 114 may be configured with such authentication capability, as described more fully in that standard. IEEE 802.1Q standard provides another means for controlling access and usage of a network. That standard is directed to the establishment and operation of VLANs. The IEEE 802.1Q standard defines the configuration of network devices to permit packet reception at a configured port entry module. Firewalls (e.g., 140 (FIG. 8)) also provide a technique for network usage regulation. Firewalls are primarily computer programs designed to analyze packets and, from that analysis, make a determination as to whether packet transmission into or out of the network is permitted. Being location-aware, system 100 is able to combine the association of a device's physical location with any of these network access regulations as an attribute to assess permitted network access. For example, a VLAN policy template distributed to network devices to configure VLANs can be accompanied by a physical location constraint.

In general overview of the authentication process, a user device 104 connects to the network infrastructure 101, via a connection point 160. System 100 authenticates the device. System 100 receives the location of the device 104 from the device 104 itself and/or from infrastructure 101. System 100 receives user credentials and authenticates the user. During this authentication, system 100 verifies the location of device 104 employing the techniques described herein. If the user is authenticated and the location is both verified and authenticated for the requested network resources, system 100 proceeds in allowing device 104 to access the requested resources. System 100 can log each of these events for administrative use.

To describe this concept in more detail, the following example involves the use of an authentication server (e.g., 142 (FIG. 8)). In this example, the authentication server, utilizing various protocols, such as RADIUS, TACACS+, Diameter, SecureID®, EAP/IEEE 802.1X and/or the like, includes the functionality of a location server. The authentication server/location server also includes a location database. The location database is expanded to support the ability to indicate whether the authentication server should consider location information when a user or network client tries to log in from a certain physical location.

For example, secure military and intelligence environments can require that certain physical locations be protected from unauthorized use of computing systems available in that secure location. Each computing system includes a location client that the computing system employs during the process of authenticating an individual user. The expanded location database may contain, for example, attributes such as "secure area" or "minimum security level" truth tables. When a user tries to authenticate, the authentication/location server employs the location of the user requesting authorization when validating credentials. The authentication/location server derives this information, for example, using a reference to a connection point ID as described above. If the user has a security clearance of a high enough level to authenticate from that location, the authentication process proceeds. If the user fails to meet the security level associated that particular location, then the network can halt the authentication process, sound alarms and/or report the location of the unauthorized user.

In more detail, FIG. 4 illustrates an example process 401 that system 100 employs to determine whether any restrictions to access the network, based on location, are applicable. Specifically, in example location identification process 401 represented by FIG. 4, a user seeking access to system 100 can be first authenticated (step 405) or otherwise filtered by system 100. System 100 achieves this portion of the authorization process by requiring the end user at a location client device to supply certain user information including but not limited to, a name and one or more passwords (e.g., necessary user credentials). If the user is permitted access to system 100 on that basis (e.g., user name and password), system 100 permits the user to query (step 410) system 100 for access to certain information, applications, and the like. Alternatively or in addition, system 100 receives (step 415) the device location before allowing the requested access. A trusted user device (e.g., 104), a network infrastructure device (e.g., a network entry device 114) and/or a location server can supply the user device location using the techniques as described herein.

With the received location information, system 100 authenticates (step 420) that the physical location of the client device is in a permitted and authorized location for access to the requested network resources. In one example, system 100 permits requested access from devices having pre-approved location identifying equipment, such as a trusted device that can identify the location of that client device. As described above, this can include a GPS receiver associated with the client device that system 100 has previously evaluated for trustworthiness (e.g., cannot provide false location). This also can include a trusted device within network infrastructure 101 such as an authenticated router or switch or a hardwired GPS receiver that can provide location information using the techniques described above. The creation of the trusted device also maybe a recursive function if the client device is located relative to the trusted device and the network or the network location resolution is built outwardly.

In general, system 100 performs an ongoing policing function, for example by repeating the process shown in FIG. 4 periodically or when new information becomes available or triggered by external events.

In another example, the system 100 employs a level of trust parameter to authenticate (step 420) the trustworthiness of the location information. The values for the level of trust parameter can vary, using a sufficiently large scale and range to allow for changes and growth. For example using a sixteen bit word, system 100 can use a scale from 256 to 3,840, where 256 corresponds to the lowest level of trust and 3,840 corresponds to the highest level of trust. This range, because it does not use all sixteen bits, provides room for growth in the range as system 100 develops over time. Any levels in between the lowest and highest levels of trust represent a mixed level of trustworthiness and system 100 determines whether it will employ the location information with a mixed level dependent on the type of access the user requests (e.g., results of the query (step 410)). A more sensitive application and/or information may require a trust level of 3,072 or greater, whereas a general application and/or information may require a trust level of 1,023 or greater. System 100 may allow a user to access public information regardless of the value of level of trust. In other words, the required level of trust value to authenticate the location can vary depending on the types of resources to which the client requests access.

In one example, system 100 determines the level of trust of the location information based on the originator of the location information. If the location information originates from an internal routing device within infrastructure 101, without public access and under control of a network administrator, and the connection point is a jack in the wall, with an attaching cable that cannot be altered without destroying the wall, the system 100 can assign the highest level of trust value of 3,840 (i.e., this example employs a scale of 256 to 3,840). In this case the probability that the location information will be incorrect or has been altered is very low or non-existent. If the location information originates from a wireless access point (e.g., 160*j*) within the system 100 that determines the location of the user device using a technique described above, there is some trust because a wireless access point 120 is within the infrastructure 101 of the network. There is some possibility of signal manipulation, however, so system 100 assigns the location information a level of trust a value of 2,256 because the probability of incorrect location information is relatively higher than the jack in the wall example above. If the location information originates from the user device itself using a system that is allegedly tamperproof, or comes with a third party certification, system 100 can trust this slightly, but again is not sure of what can be done to manipulate signals, so system 100 assigns this a level of trust value of 1,023. If the location information originates from the device with little or no safe-guards (e.g., using a built-in GPS with no tamper-proof technology), system 100 can assign the location information a level of trust of value of 456 (e.g., trusts all GPS signals slightly) or 256 (e.g., no mechanisms to prevent signal tampering, so assign lowest value).

With reference to FIG. 4, once system 100 has authenticated (step 405) the user and authenticated (step 420) the device location information, system 100 considers the access request. System 100 determines (step 425) whether the user has the proper credentials for the level of the requested service. To do this, system 100 compares the user credentials, the location information, and the conditions of access requested (e.g., a request for a certain database of information, a request for a certain application, and the like) with any stored location restrictions. If system 100 determines (step 425) the user is authenticated for the particular request, system 100 determines (step 430) whether the device used by the user is in a location approved or otherwise permitted to receive the requested information, application, and the like. If both threshold questions (step 425 and step 430) are answered in the affirmative, system 100 permits the user to access, via the client device at the known location, the material requested. If either threshold question (step 425 and step 430) is answered in the negative, system 100 denies (step 440) the user access and can notify the network manager. In addition or as an alternative to denying access, system 100 also can entertain, honeypot, and/or otherwise disable and delay the requesting client to provide time for an administrator to take additional action, such as notifying authorities. In another example, system 100 bases access to the requested material solely on device location, and the optional steps of authenticating (step 405 and step 425) based on user identification information are not a pre-condition for access. As described above, system 100 can continually police location authentication by looping steps 415, 420, 425, 430, and 435, as indicated by arrow 440.

FIG. 5 represents another example authentication process 500. In the illustrated process 500, system 100 obtains (step 505) the location information for an client device. In this case, system 100 employs only the location of the device in determining the appropriate level of service. In another example, system 100 can also employ the user credentials (e.g., user name and password), in addition to the location, to determine the appropriate level of service. System 100 determines (step 510) whether the obtained location is verified. If system 100 determines (step 510) that the location is not verified, system 100 denies (step 515) access or restricts (step 515) access according to predefined policies (e.g., deny any access or restrict access to only those devices, applications and data available to the general public regardless of location). If system 100 determines (step 510) that the location is verified, system 100 determines (step 520) whether the location is authenticated. If system 100 determines (step 520) that the location is not authenticated, system 100 determines (step 525) whether to accept the asserted location. If system 100 determines (step 525) to not accept the asserted location, system 100 denies/restricts (step 515) access according to predefined policies. If system 100 determines (step 525) to accept the asserted location, system 100 allows (step 530) access at selectable service levels, as described below, according to predefined policies.

If system 100 determines (step 520) that the location is authenticated, system 100 determines (step 535) whether the user location is authenticated at the level required. This can include, for example, having a minimum level of trust for the requested level of access. If system 100 determines (step 535) that the user location is not authenticated at the level required, system 100 allows (step 530) access at selectable service levels, as described below, according to predefined policies. If system 100 determines (step 535) that the user location is authenticated at the level required, system 100 allows (step 540) access at the authenticated level.

As described in conjunction with process 500, system 100 allows a user access to system 100 at selectable service levels, based on location information (e.g., step 530). Examples of selectable service levels include, but are not limited to: access denied; threshold access permitted regardless of device location; trusted user and device location is verified but not authenticated, some restricted services permitted; general location verified (e.g., in a public area, airport, country, city, telephone area code or exchange) and some limited access permitted; verified ISP and user verified; verified ISP and user not verified, some limited access permitted; previously authenticated location, re-authentication required based on time intervals; authenticated location and user, permit all predefined permissions; and re-authentication required. Some of these levels can be combined to include additional service levels. For example, re-authentication may be required at any time for any reason including, but not limited to, topology changes, timeouts, untrusted network devices, location database changes, disconnected cables or local or remote triggers from intrusion detection systems and firewall systems. System 100 can enforce such re-authentication policies, for example by using the edge policing described in FIG. 3. These service levels may correspond to the levels of trust described above (e.g., level of service dependent on a minimum value of the level of trust of the location information).

Use of the above techniques enables system 100 to restrict access to data, applications, specific networked devices, data and network service, QOS (Quality of Service) levels, network tools, functionality, rules, and the like, based on the user and/or the location of the device associated with the user seeking access. Further to the techniques above, system 100 can employ the location information to effect a modification of the access requirements. For example, when a device seeks network access from a location deemed not to be inherently secure (e.g., such as a public facility like an airport), system 100 can prompt a user to initiate an improved connection, such as a virtual private network (VPN), or can inform the user that supplemental restrictions apply while in the insecure area. More generally, this can be seen as an expansion of policy-based access in that the access rules for an individual user may be adapted as a function of the client device location and/or the level of trust associated with the location information.

Further to the techniques described above, system 100 also can provide restricted access to the network based on a particular port connected to the connection point to which the location client is connected. In one example, system 100 employs the techniques above to determine the location of the connection point associated with that particular port, rather than assume a location supplied by the location client is correct. For that particular port for which location has been established and can be trusted, system 100 encodes transmitted data such that the port associated with the trusted location and only that port will accept the encoded data for transmission. If the user disassociates from that particular port, whether intentionally or unintentionally, he/she must re-authenticate.

In this example, system 100 performs the authentication and any re-authentication using an encryption key process. Specifically, an end user that system 100 has authenticated by user and by location, is provided with an encryption key that is designed to work only on the port through which the key was supplied, and no other. That is, the key cannot be obtained and then used through a different port, which would be the case if the device used by the user were to move locations (e.g., change connection points). It is to be noted that the key may be tumbled, rotated, and the like. In one example, the network entry device has no knowledge of the specific key, but instead uses the port number/logical port number and one or more of a MAC address, an IP address, its own generated encryption key, and the like, to permit transmission. System 100 also can modify a data packet so that its receiver can only determine whether the transmission came from the right user (e.g., based on the use of the right key) and was modified by an authenticated device (e.g., the location/authentication server) for that particular access port (e.g., 113 (FIG. 1)) of the network entry device (e.g., 114a (FIG. 1)). In another example, there is a three way keying. The client device, the port from the network entry device and the server providing the data each have their own associated keys. In this way, the server can verify that the data coming from the client is indeed coming through the port with the assigned key, for example by verifying signatures on the data from both the client and the authenticated port. In summary, the key is only good for that port which has been specifically established to authenticate that user at the authenticated location. In that way, system 100 can prevent a user from obtaining access, using a false allowable location, by denial of port access when the end user's location has changed, even if the original encryption key for that allowable location has been acquired.

4.2.1 Restricting Location of Data (FIG. 6)

In addition to access control, system 100 can use location information to enforce restrictions regarding the transmission of data. As described in the overview example, location information allows system 100 to deny access to certain sensitive information upon request from a location client outside of a specified region, or to prohibit data from being transmitted through an intermediate device that is located outside of a specified region. FIG. 6 illustrates an example process 601 that system 100 employs to effect these data transmission restrictions. Specifically, in the example information tagging process 601 represented by FIG. 6, system 100 receives (step 605) a request from an end user for access to information (e.g., file, document, and/or the like, generally, data). This assumes that the end user has been adequately authenticated or otherwise permitted access to the network, as described above. System 100 then determines (step 610) whether the requested data is location sensitive. That is, whether the data should not be moved beyond certain defined boundaries (e.g., a present device, a room, a building, a campus, a city, a country and the like). If system 100 determines (step 610) that the data is not location sensitive, system 100 permits (step 615) access to that data that is not restricted by location.

If system 100 determines (step 610) that the data is location sensitive, system 100 tags (step 620) the data. For example, the application generating the data and/or the server generating a data packet to transport the data over the network can add this tag while generating the data and/or packet. In one example, the tag comprises a file header that identifies location restrictions. The file header also can include a key. In some examples, an end user can request to add a tag to sensitive data such that it cannot be transmitted outside of a defined location (e.g., home, corner office, the courtroom, a hospital, a healthcare facility and the like). The tag may be configured either to deny opening (step 620a) of the transmitted data at an unauthorized location, or to destroy (step 620b) the data when it is determined that the data is in an unauthorized location. The file header may itself be coded or encrypted. Additionally the data/file may be so encrypted such that the deletion of this special file header will either deny opening of the transmitted data, or force the destruction of the data, regardless of the location.

A device within system 100 and/or the data itself determines (step 625) whether the data is outside the permitted location(s). If the data is not outside the permitted location(s), the system 100 permits (step 615) access to the data. If the data is outside the permitted location(s), system 100 denies (step 630) access to and/or destroys (step 630) the data. If the data is going to be routed in the next hop to a location that is outside the permitted location(s), the system 100 prohibits the data from being transmitted to that device outside of the permitted location(s). For example, system 100 can employ edge policing, as described with FIG. 3, where devices of infrastructure 101 police and enforce access by controlling whether or not the data is forwarded to a location client requesting the data. The data itself, or an application trying to access the data, can also police and enforce these restrictions by including executables that obtain the location, with an acceptable level of trust, of the device in which it executes and prohibit access if such location is a prohibited location.

The system 100 can be optionally configured to provide additional security override controls to the end user to prevent destruction of the tagged data or denial of access to the tagged data if the user is located outside of the permitted area of access. In this case, system 100 polices access to the data and not necessarily where system 100 forwards the data. In this example, even if the data is outside the permitted location(s), the system 100 determines (step 635) whether the tag can be overridden. If the tag can be overridden, the system 100 permits (step 615) access to the data. In this case, the access (step 615) is limited access. For example, the user may be allowed to load the data into a user device for transport, but the user cannot read or edit the data until the user device is located in a permitted location.

Figure 7:
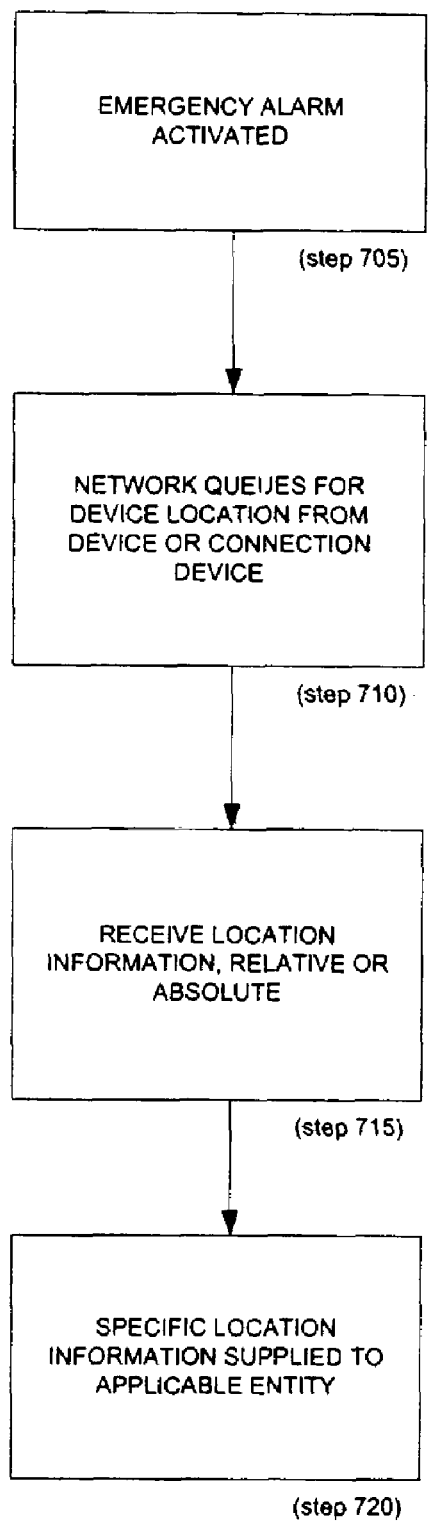
FIG. 7 is a block diagram of another illustrative process employing location information.

4.3 Providing Other Services (FIG. 7)

With a location-aware infrastructure, system 100 can employ trusted location information to provide other services in addition to those described above. For example, system 100 can use the location information in emergency situations, where a device may be an alarm or sensor. System 100 determines the location of the alarm device and transmits the location information to a party responding to the alarm. System 100 can also use location information to recover a stolen user device 104. As the stolen user device 104 accesses system 100, system 100 determines the location of the stolen device and transmits the location information to a party seeking to locate the device. System 100 can track mobile user devices (e.g., 104*b*) and thus can also track anything associated with that user device (e.g., the user, a file, a physical object, and the like). System 100, through the use of location information, can provide these and other services and applications. The examples that follow illustrate how system 100 can employ location information to provide these and other services and applications.

In one example, FIG. 7 illustrates a process 700 for establishing a security service in a network environment based on location information. In process 700, the client devices may be physical intrusion detection devices, smoke detectors, fire alarms, EMT devices, wireless panic buttons, and the like. These client devices are designed to signal an emergency event. Alternatively, the device may be any sort of network-connected device that is configured to transmit an alarm upon failure or imminent failure, or to transmit an alarm if a device connected to it fails. If the device includes a location module 185, location server 134 can provide and store that device's location information in that device itself.

In one example, an event triggers (step 705) a smoke detector on the 4th floor of the 5th building on the left side of the street. System 100, to which the triggered device is connected, either determines the device's location using the techniques described herein or queries (step 710) the triggered device's specific location information. System 100 directs the query to the device itself, or to location server 134. System 100 receives (step 715) the location information, either as an absolute or a relative location. As described above, the location information may or may not be trustworthy. System 100 can verify the location information to make it trustworthy or increase the level of trust required for the particular security service system 100 is providing. System 100 relays (step 720) that detailed location information to the appropriate authorities, potentially leading to greater response efficiencies. A location client having a network association can be made more effective by linking the device's location information with that device's operation.

Another example of a security service system 100 provides is to protect sensitive devices from theft. For example, if a laptop computer is stolen and the thief seeks to access system 100, system 100 evaluates the location information, whether obtained directly from that client or from the location server 134 when the end user accesses the network. In the event that network entry is sought, the location of the requesting client is acquired. Assuming system 100 can determine that that particular location client has been stolen, system 100 supplies the location information to a suitable authority. To provide authorities enough time to get to the identified location, system 100 also can entertain, honeypot, and/or otherwise disable and delay the requesting location client. The location-aware system 100 thus can be used as an effective means to exchange accurate location information in relation to a security violation and, potentially, to neutralize effects associated with that violation.

Yet further, the location-based system 100 and the techniques described herein may be employed to regulate and/or accurately monitor the movement of individuals, equipment, packages, and the like, as they travel near and through network infrastructure 101. An electronic device (e.g., user device) that communicates with system 100 is applied to a pass, a label, an asset tag, and the like. That device includes means to enable tracking of its location using techniques, for example, the radio-based techniques described above. For example, all visitors to a secure facility are supplied with a visitor pass. That visitor pass includes a transceiver that is capable of communication with wireless access points (e.g., 160*j* (FIG. 1)) of network infrastructure 101 positioned throughout the facility. These wireless access points can be configured such that as the tag/pass/visitor moves throughout the facility, network infrastructure 101 determines the visitor's location using the techniques described above. In addition, security guards can know whether any visitors remain in the facility at a planned closing time. This eliminates the need for the facility to maintain a separate tracking system with sensors. Instead of the separate tracking system, the same data network infrastructure 101 employed for network access also can be employed for tracking, by associating a location with each of the devices that communicate with network infrastructure 101.

These techniques enhance network security, enhance device security, likely improve emergency responsiveness, and may be employed to establish network-based organizational security. These and many other advantages are provided through the association of relevant network device and networked device location information with security, protection, and response efforts. System 100 can also provide other services based on location not described above. For example, system 100 can provide enhanced network topology discovery and mapping, with device map representations specific to their physical location. For example, system 100 can employ location information to prepare accurate maps that associate devices with their physical locations. System 100 also can provide device inventories by location, without the need of manually verifying each device individually. As described above, the location database can be expanded to include device ID information along with the corresponding location information.

Further, system 100 can employ location information to check that network rules are followed (e.g., if wiring designs are inaccurate and must be supplemented or changed). The location information can be of value to the LAN manager and, for example, to an Internet Service Provider (ISP) or a cable operator interested in knowing the locations of cable modems and phone line terminations.

System 100 also can provide information to a user that is relevant based on that user's current location. For example, a traveling end user may dial into the network, have the connecting device's location information acquired or supplied, and then be directed to hotels, restaurants, and the like, within a defined radius of the device's location and meeting any number of selectable criteria.

5.0 Some Additional Examples (FIG. 8)

Referring to FIG. 8, system 100' provides another example of a location-aware network and is described as an enterprise network that serves as a data communications network for a business organization or other type of enterprise. The enterprise operates the network according to various policies, which may include location-dependent aspects. For example, access-control policies may depend on the locations of devices accessing services on the network. In various configurations, system 100' may include or make use of one or more LANs, MANs, WANs, PANs and/or Ethernet to the first mile (e.g., IEEE 802.3ah). In other examples of such a network, the physical and logical arrangement of the devices can differ from that shown in FIGS. 1 and 8.

System 100' includes various types of devices. Some devices are network entry devices 114c-j, generally 114, which provide access to an infrastructure 101' of system 100' to user devices 104c-l, generally 104, or to external networks such as Internet 148 or telephone network 132. The portion of system 100' excluding user devices 104 and external networks is referred to as network infrastructure 101'. This infrastructure 101' includes devices for switching and routing data within the system 100', including one or more central switching devices 136' and computers that provide services in support of access to and routing of data in the system 100', including an authentication server 142, an application server 134', and other servers such as a domain name server (not shown). In addition, system 100' includes devices such as a printer 122 and a fax machine 123 which have some characteristics of both user devices and of network infrastructure devices.

Network entry devices 114 provide access to network infrastructure 101' over various types of transmission media, including cable-based or wireless. The cable-based transmission medium can include, for example, twisted pair wires used for a 100-Base-T Ethernet link. A cable-based transmission medium can also be a shared cable-based transmission medium that can connect more than two devices. For example, a coaxial cable used for 10-Base-2 Ethernet, telephone cables used for high-frequency (e.g., HomePNA) communication between multiple devices, and power lines used for data communication (e.g., HomePlug) between devices provide such shared cable-based transmission media.

Entry devices 114 together include a number of entry port modules (e.g., 113' and 118), each associated with a different medium (e.g., a cable and/or a portion of a radio spectrum). For instance, in system 100', entry port module 113' of network entry device 114f is connected to user device 104c by a dedicated cable-based transmission medium 112'. Entry port module 118 of network entry device 114g is connected to user devices 104d-f by a shared wireless transmission medium 119'. Entry port module 146 of network entry device 114d is connected to user device 104g by Internet 148 and shared transmission medium 152. Further, entry port modules 126, 128, and 130 of network entry device 114e may be connected to user device 104h by telephone network 132 and by shared transmission media 154. Entry port modules 126, 128, and 130 of network entry device 114e may also be connected to user device 104m using a cellular telephone (or PCS) tower 175, which is connected via a base station 178 to the telephone network 132 and the shared transmission media 154. Any of network entry devices 114 may be coupled by different port modules to both shared and dedicated transmission media as well as cable-based and wireless transmission media.

Network entry devices 114 and end user devices 104 can come in a wide array of configurations. For example, user devices 104 can include individual computers, printers, servers, cellular phones, laptops, handheld electronic devices, telephones, Internet Protocol (IP)-configured telephones, switch devices, and the like. Network entry devices 114 can include, for example, switches, routers, hubs, bridges, repeaters, wireless access points, data communications equipment, server computers, modems, multiplexers, Private Branch Exchanges (PBXs), virtually any devices used to interconnect data equipment or end devices, and the like. The discreet boundaries of infrastructure 101' are for illustration only. For example, system 100' may include a server outside of the illustrated boundary while remaining logically part of infrastructure 101'. In another example, there may be a portion of network infrastructure 101' connected to system 100' located in a remote network, such as Internet 148.

In any particular physical arrangement of system 100', each device (e.g., 104, 114) has a connection point (e.g., 160c, 160d, 160e, 160f, and 160g, generally 160). A connection point 160 is the place where an associated device connects to system 100', and thus corresponds to the location of that device. For example, for devices communicating via a cable (e.g., 104c, 104g, 104h, and 114g), their connection points (e.g., 160o, 160l and 160k, and 160n, respectively) represent the terminus of the cable (e.g., a wall jack) where the respective devices physically attach to make a connection to the network. For example, connection point 160o represents the terminus of cable 112'. For wireless device 104f, the transmission medium is air, so the respective connection point 160m represents the location of the receiver antenna receiving signals from the wireless device. For any physical arrangement of system 100', each connection point 160 is associated with a connection port in network infrastructure 101' that provides connectivity to the rest of system 100'. For example, user device 104c, which is attached to connection point 160o (at the end of medium 112'), is associated with connection port 113'. Note that should the physical arrangement of system 100' change, for example, if medium 112' were disconnected from port 113' and reconnected to a different port in the same device or in a different device, the association of a connection point and a connection port may change. As described above, maintaining an association of connection points and connection ports, particularly in generating connection point IDs, provides a way for determining locations of devices in the system 100'.

5.1 Distributed Location Database

In some of the techniques/mechanisms described above, system 100 employs a centralized location server 134 that contained location server functionality and the location database. As an alternative to the centralized system, the location-aware portion of system 100 can be implemented as a distributed system. In examples of a distributed system, the location server functionality and the location database are distributed among the devices of the network. In example distributed systems, location module 185 exists in any one, a portion, or all of the exemplar devices of a network, including for example the entry devices (e.g., 114), a server (e.g., 142), a firewall (e.g., 140), and the like. As illustrated in FIGS. 1 and 8, some devices comprise a location module (e.g., 185a-o, generally 185), whether in hardware, firmware, or software, that can be configured to include different functionality and pieces of information, including location information. As described below, for a distributed system example, devices both inside and outside network infrastructure 101 can optionally maintain location dependent information that affects their operation.

5.1.1 Distributed within the Network

FIGS. 1 and 8 illustrate location modules 185 in a portion of the devices for example only. As described above, the information representing the location of a particular network device, or one or more devices attached to a particular network device, may be preloaded into location module 185 as a database. The location database at each device can be the entire location database of system 100, or a portion of the location database. In particular, the portion of the database included in the location module 185 of the device can be a portion with those locations applicable to that particular device. For example, all of the connection points associated with the ports of a particular network entry device. Alternatively, location module 185 may include an updateable table that changes with additions or deletions to system 100 and/or movement of devices associated with system 100. Location module 185 can include location information and can be configured to measure, calculate, infer, search, and/or otherwise acquire information to provide one or more of the detailed mechanisms/techniques described herein. Location module 185 also can be configured to be an access control module that enables regulation (e.g., policing) of access to network-based data, applications, QoS, ToS, bandwidth, and the like, based on device location information.

For example as illustrated in FIG. 4, for the distributed system, location modules 185 are configured to include device location as a requirement to permit access to network-based information, applications, rate service, rate type, and the like. With such a distributed system, each network entry device (e.g., 114) becomes a quasi-authentication server. As illustrated in FIG. 6, location modules 185 are configured to include means for tagging location-sensitive information/data and acting on that tag accordingly. Each location module 185 also can enable identification of the location of a communicating device for the purpose of providing security, safety, or other services described above.

For the distributed example, location server functionality can be part of any network device, management station, or server/authentication server. The location server functionality may be co-located within a switch or network device (e.g., 114) through which a user device communicates. In a distributed system, devices can include functionality in their respective location modules 185 to be both a location client and a location server. In remote offices, a router that connects the remote office to the home office can comprise the location server functionality, as it may need to provide location information for E911 applications, for example. In other applications, such as an enterprise campus networks, the location server functionality may be part of an enhanced IP address management system such as a Dynamic Host Configuration Protocol (DHCP) server as well as a dedicated location provisioning system.

The following is a list of a few possible devices (but not limited to only those devices) that can contain the location server functionality: network switches, data switches, routers, firewalls, gateways, computing devices such as network file server or dedicated location servers, management stations, network connected voice over IP/voice over data systems such as hybrid PBXs and VoIP call managers, network layer address configuration/system configuration servers such as enhanced DHCP servers, enhanced Bootstrap Protocol (bootp) servers, IPv6 address auto-discovery enabled routers, and network based authentication servers providing services such as radius, extensible authentication protocol/IEEE 802.1X or others.

In one example, to provide the distributed location databases with location information, system 100 employs a Simple Network Management Protocol (SNMP). A network administrator provisions the location information of the terminus of a network cable in the SNMP ifDescr variable (e.g., the ifDescr is a read only attribute, but many systems allow a network operator to "name" a port, which then will be displayed in this field). The location server functionality of a device reads the terminus information via the SNMP.

As described above, the location client attempts to learn its geographic location and/or identifies itself to another device with a need to know the client's location. An advanced location client can also receive its operational configuration from a location aware network (e.g., from a location server configured to additionally provide configuration information). The location client communicates with any network element and discovers its connection point ID through one of many possible methods described herein. Once the location client knows its connection point ID, it can contact a location server to discover its actual location, or to register itself with the location server, which can act as a proxy for other communication entities seeking to discover the location of the location client. It is also possible for a location server to be a communication system that may modify the location client's communication traffic with the device's location information.

The following is a list of a few possible devices (but not limited to) that can contain a location client: network switches, routers, firewalls, gateways, computing devices such as a network file server or end user computing devices, personal digital assistants, smart appliances (toaster, refrigerator or coffee pot with network connectivity), network connected voice over IP/voice over data systems such as hybrid PBXs and VoIP call managers or voice over IP/data handsets.

5.1.2 Distributed outside of the Network

In addition to their being distributed among the devices of system 100, system 100 can employ location information from a trusted database that is external to the network and/or a trusted database maintained by a third-party. As described above, system 100 can assign a level of trust for all of the location information obtained from a database external to system 100. For example, in the telephone network example, where the unique connection point ID can be a telephone number, the location server functionality, either in location server 134 or any of the distributed functionality in the location modules 185, can reference a white-pages type database to retrieve an address for the telephone number. If the address is not a location format recognized by a location-aware application, the location server functionality can reference another third-party database to convert the address to latitude and longitude coordinates, for example. Further granularity may be obtained. For example, for a home business, an address may have two phone numbers associated with it, a business phone number and a residential phone number. The location of the connection point identified with the business phone number is in the room established as the home office. This may be located on one floor of the house, providing altitude coordinates also. The location of the connection point identified with the residential phone number is in the room containing the family personal computer. This may be located on another floor of the house. Similarly, the location server functionality can obtain an address, a room, and/or geographical coordinates where the connection point is a cable endpoint connected to a cable modem and the IP address is associated with an address of the subscriber. System 100 can use any available resources to update the location information of particular connection points, assigning the appropriate level of trust based on the trustworthiness of that third party source.

5.2 Use of a Location Advertising System in a Distributed Network

In one distributed example, system 100 employs a location advertising system to communicate information among the devices. A location advertising system comprises a networking device that provisions and/or advertises device location information and/or configurations to a location client device over the network, typically using a layer 2 or layer 3 protocol (e.g., a neighbor discovery protocol). The location advertising system also comprises devices to which location client devices may connect via the network. An example of a location advertising system device can include a location advertising switch, which is a device, such as a data switch operating as a layer 2 or layer 3 LAN switch. Another example of a location advertising system device can include a location advertising router, referred to sometimes as an automated configuration server, which comprises a network router. This device can also comprise a branch office router that can provide a configuration to a LAN switch and/or a wireless access point in a remote enterprise office. Other devices in the location advertising system can include a wireless LAN access point, a virtual private network system, a tunnel server, a remote client, a gateway and/or the like. A device acting as a location advertising system may distribute location information based on various coordinate systems or textual representations of a physical location. A device in the location advertising system, when it is a device that has location clients physically connected to it via physical cables, contains a database of connection points that correspond to a physical network access port and the corresponding geographic location information of the terminus of the network cable connected to that port, similarly as described above. Although presented in the context of a distributed system, the location advertising system can also be implemented in a centralized system using a centralized location server as described above.

When system 100 employs a LAN Switch in its location advertising system, system 100 not only provides location and configuration information to a location client device, but it also can automatically map network policies to the port where the location client device is connected. This policy may be provisioned on the location advertising switch as soon as the location client is detected or policy provisioning may be enabled only after the location client is properly configured and verified. This feature is referred to as self-enabled policy.

When a location advertising system comprises a wireless LAN access point, the network maps location and configuration information to a device specific identification, IEEE MAC address as an example, and the IEEE 802.11 association ID present during the operation of the wireless network. The network maps the location coordinates to the association ID. As wireless networks afford client devices total mobility, the system employs techniques, such as the techniques described above for example, to triangulate the coordinates of the location client at any instance. The location database can be dynamic in nature as the client's coordinates can potentially change very frequently.

5.2.1 Specific Examples Using a Location Advertising System

One example of automated network management employing the location advertising system is the configuration of Voice over IP handsets with a neighbor discovery protocol in a data network. Voice over IP handsets typically are designed to communicate with Ethernet switches and can require complex configurations. Networks with the location advertising system can integrate neighbor discovery protocols with Voice over IP handsets to provide configuration information to the handset, discover inventory information to be stored on the connection point switch, and automatically configure the ports' parameters on the connection point switch/access platform.

The automated voice handset configuration system in this example can provide the voice handset with several parameters. For example, the system can provide VLAN membership and classification rules for voice and/or fax payload and control traffic. The system can also provide VLAN membership and classification rules for non-voice payload and control traffic. The system can also provide the IEEE 802.1Q prioritization packet marking information of voice payload and control traffic. The system can also provide the IEEE 802.1Q prioritization packet marking of non-voice payload and control traffic. The system can also provide the IP type of service field markings for the voice payload traffic. The system can also provide the IP type of service field marking for fax payload traffic. The system can also provide the IP type of service field marking for voice/fax control traffic. The system can also provide the Internet address for the voice entity contained in the VoIP phone. The system can also provide the ANSI LIN (Location Identification Number). The system can also provide the geographic location of the handset with geodesic information or any other geographical coordinate system including elevation or relative location information.

For illustration of this specific example, let user device 104c (FIG. 8) represent a VoIP handset and network entity device 114f represents a LAN switch. The LAN switch 114f includes location advertising system functionality, for example, as part of location module 185n. The LAN switch 114f also includes an expanded database in location module 185 that includes inventory information, geographic information and configuration information. In operation, the Voice over IP handset 104c boots and starts sending out neighbor discover protocol packets. These packets trigger the LAN switch 114f to which the VoIP handset 104c connects to start sending neighbor discovery protocol packets. The LAN switch 114f responds back to the voice handset 104c with the following configuration information obtained from its expanded database: IEEE 802.1Q priority marking configuration, IEEE 802.1Q VLAN membership configuration rules, Internet protocol type of service/differentiated services marking rules, the IP address of the voice call managers/IP PBX/IP voice switch which the voice handset 104c needs for normal operation, and the ANSI LIN. The LAN Switch 114f enables policy management configurations on the port where the switch connects (e.g., self enabled policy). The voice handset 104c continues to utilize the neighbor discovery protocol to continue to advertise its device specific information. This device specific information can include, for example, model number, device type, IP address, device serial number, microcode version utilized by the handset, and the like. The LAN switch 114f decodes this device specific information from the neighbor discovery protocol packets sent by the voice handset 104c and records the advertised information to a local or remote network management database. The system 100' uses this information to support inventory management and device location applications.

Another specific example of automated network management employing the location advertising system involves the use of network LAN switches in a campus or enterprise network as a vehicle to configure wiring closet switches or wireless access points. In many enterprise networks, the IT organization spends a great deal of time and resources configuring access switches or wireless LAN access points that act as the primary network entry device for network users. These network entry devices normally are provisioned with simple configurations, but occasionally a minor misconfiguration can cause many problems in the operation of a data network. A network with the location advertising system frees network administrators from worrying about the validity of network devices as backbone network switches provision network access switches and routers with the appropriate configuration based on where they connect to the network.

For illustration of this specific example, let network entry device 114f (FIG. 8) represent a wiring closet or a user access switch acting as a configuration client. In this environment, the user switch 114f is configured to participate as a location client (e.g., includes location client functionality in location module 185n). The location client 114f is connected to network infrastructure 101' via connections to network entry device 114c, network entry device 114g, and central switching device 136'. Any of those other devices (i.e., network entry device 114c, network entry device 114g and central switching device 136') can act as a location advertising system switch and broadcast location, configuration, and other information to the network entry device 114f, in this example, the location client.

To determine its physical location, device 114f receives location information from each of its neighboring devices, 114c, 114g, and 136'. Device 114c determines that since neighboring device 114f is connected to connection point 160u, device 114c is located at location X1, Y1 and transmits the location information to device 114f. Similarly, device 114g determines that since neighboring device 114f is connected to connection point 160v, device 114c is located at location X2, Y2 and device 136' determines that since neighboring device 114f is connected to connection point 160w, device 114c is located at location X3, Y3. Device 114c receives the coordinates from each of its neighboring and compares them with each other to determine, with a statistical level of confidence what its actual physical location is. This level of confidence can be translated into a level of trust to associate with the calculated physical location based on the received data. For example, if all three neighboring devices provide the same coordinates, then system 100' can associate the highest value for the level of trust with that physical location.

To determine configuration, any combination of the other devices (i.e., network entry device 114c, network entry device 114g, and central switching device 136') advertises configuration parameters to location client 114f. The configuration parameters can include, for example, the following attributes: IP address of the user access switch, IP subnet mask of the user access switch, default IP route of the user access switch, SNMP trap destination IP address, SNMP read only community string, SNMP read-write community string, default VLAN ID on user ports, default IEEE priority mark for user access traffic, IEEE 802.1D spanning tree enabled or disabled, IEEE 802.1W rapid spanning tree enable or disable, enable IEEE 802.1X authentication on user ports, enable IEEE 802.1Q VLAN tagging on ports to data center/configuration provisioning switch, geographic coordinates of the terminus of the data cable connected to this port, and the like. Table 4 illustrates an example of some entries that can be included in an expanded location database in this location advertising system example. In this example, the first five columns from the left (i.e., entry port to geographic location, inclusive) represent information provisioned on the location client. The last two columns from the left (i.e., client switch IP address and serial number) represent information obtained/learned from the location client.

TABLE 4

| Entry Port | Default VLAN ID on User Ports | Default Priority | Enable Tagging on the Port where location data is Received | Geographic Location of Cable Terminus | Client Switch IP Address | Serial Number |
|---|---|---|---|---|---|---|
| 1 | 1024 | 0 | TRUE | Lat X1, Long Y1, Alt Z1 | 1.1.2.1 | xxxxxx1 |
| 2 | 1024 | 0 | TRUE | Lat X2, Long Y2, Alt Z2 | 1.1.2.2 | xxxxxx2 |
| 3 | 1025 | 0 | TRUE | Lat X3, Long Y3, Alt Z3 | 1.1.3.1 | xxxxxx3 |
| 4 | 1026 | 0 | TRUE | Lat X1, Long Y4, Alt Z4 | 1.1.4.1 | xxxxxx4 |

It is also possible for the location advertising system in the provisioning switch to provide a temporary Internet address and/or the unified resource locator (URL) to a network attached location database where the location client can retrieve a more advanced configuration file. For example, see entries 6, 8, and 10 of Table 3 above. The configuration file can be retrieved via standard mechanisms such as trivial file transfer protocol or Internet file transfer protocol.

Another specific example of automated network management employing the location advertising system is the provisioning of a basic switch configuration for local and wide area routers in a branch office. In this example, the network employs a branch office router and a regional office as part of its location advertising system. In one example of the operation described below, the user access switch is a branch office router and the data center switch is a regional office router. In another example of the operation described below, the user access switch is a network entry device in the branch office and the data center switch is a branch office router.

In operation, a user access LAN switch boots and starts sending out neighbor discover protocol packets. These packets will trigger the data center LAN switch/location advertising switch to which the location client connects to start sending neighbor discovery protocol packets. The data center switch/location advertising switch advertises the configuration associated with the port to which the location client/user access switch connects. This enables policy management configurations on the port to which the switch connects (e.g., self enabled policy). The user access switch continues to transmit neighbor discovery protocol packets to update the data center switch with inventory information, which can be accessed by a network management system.

5.3 Format of Location

The format of location information can vary in different versions of the system. The examples above illustrate some of the formats for location information. The following formats are included as additional examples. The location information may be established as grid or map coordinates on a defined map coordinate system. For example, the location information can be considered absolute (e.g., latitude x by longitude y, GPS location, Loran, Loran C, military grid), regional (e.g., Massachusetts, building 1, the third floor), relative (e.g., x feet from door y on floor z, office five on floor 3, on a 30-degree radial from point A), and/or aircraft systems, such as Very High Frequency (VHF) Omnidirectional Range (VOR) or Emergency Location System (ELS). It is to be noted that GPS locating would include satellite and ground-based stations. The location information may be three dimensional, including elevation above sea level or above some defined position. The location information can include a fourth dimension, accuracy indicator, as required by the federal communications commission for emergency E911 interoperability. The location information also can include a location identification number as required by the federal communications commission for emergency E911 interoperability. The location information can be typed as numerical, string and the like.

5.4 Communicating Location Information (FIGS. 1 and 8)

To transmit location and other information among devices, the devices can communicate with each other using a variety of protocols, which can be based on the specific network solution considered. The examples above illustrate some of the protocols used to exchange information. The following protocols are included as additional examples. The devices can employ the Internet Protocol (either version 4 or 6). A high layer protocol can be used based on how system 100 distributes the location information. For example, if system 100 stores the location information as tables or files, system 100 can employ a high layer protocol such as Light Weight Directory Access Protocol (LDAP) to access and transmit location information between devices. If system 100 stores the location information as databases, system 100 can employ a high layer protocol such as, Structured Query Language (SQL) or Open Database Connectivity (ODBC) to interact with devices over the Internet Protocol.

The devices also can use a Layer 2 protocol, or a protocol that does not rely on having an IP address to communicate. This enables the devices to define the network layer address, and enables two devices to communicate on networks not operating with the Internet Protocol. The devices can also employ Extensible Authentication Protocol (EAP) or IEEE 802.1X to communicate with each other. The devices can also communicate using proprietary protocols that ride over IP (or other Layer 3 protocols) or MAC layer protocols.

For illustration, an example in the specific examples of locating devices section above employs IEEE Bridge Spanning Tree Protocol. That example can be illustrated using other protocols also. For example, in another example, system 100 employs a proprietary network neighbor discovery protocol, Cabletron Discovery Protocol (CDP) by Enterasys Networks, Inc. of Rochester, N.H. In a CDP example, network devices utilize this protocol to provide neighbor discovery. A CDP discovery packet is sent (step 305 (FIG. 3)) at defined intervals out of all ports with such discovery enabled. The location client receives (step 310 (FIG. 3)) the discovery packets and decodes the device ID field. In a CDP discovery packet in particular, the device ID field is based on the primary switch MAC address with the SNMP ifIndex of the port from which the packet was sent. Using that decoded information, the location client determines (step 315 (FIG. 3)) that the connection point ID={Primary Switch MAC}+{CDP Sourcing Port's ifIndex}.

The system 100 can employ a combination of protocols to further automate the techniques above. One example employing a combination of protocols is an automated technique that populates the location database, whether centralized or distributed, with connection point IDs. Both the CDP and the IEEE Spanning Tree Protocol have IETF SNMP Management Information Bases (MIB) associated with them. The location server, when enabled with a SNMP client, can generate a list of connection point IDs in the network environment.

In environments where IEEE Spanning Tree Protocol is the mechanism used to discover a location client's connection point ID, the network can use the IETF dot1dBridge MIB. The network uses the dot1dBaseBridgeAddress MIB object to define the unique switch identification. The network can derive the MAC address of the physical port by polling the dot1dBasePortifIndex MIB object. This MIB object corresponds to the ifIndex pointer in the IETF SNMP MIB 2 Interface MIB. By looking up the ifPhysAddress MIB object by knowing the ifIndex, the network management device is able to populate the Connection ID list (e.g., IEEE 802.1D Connection ID=Switch Base MAC Address+Port MAC Address).

When utilizing CDP as the protocol to detect a Connection ID, the network can generate the connection list by polling certain SNMP variables. The network uses the dot1dBaseBridgeAddress MIB object to define the unique switch id. The network derives the MAC address of the physical port by polling the dot1dBasePortifIndex MIB object. This MIB object corresponds to the ifIndex pointer in the IETF SNMP MIB 2 Interface MIB (e.g., CDP Connection ID=Switch Base MAC+ifIndex).

In some examples, it is possible for network switches to store location information for each switch port using SNMP. A voice handset MIB allows the switch to store the ANSI LIN number for each port. This network can provision this information in the switch via SNMP sets or local command line configuration. This network can poll and/or map this information to the connection point ID information.

Figure 9:
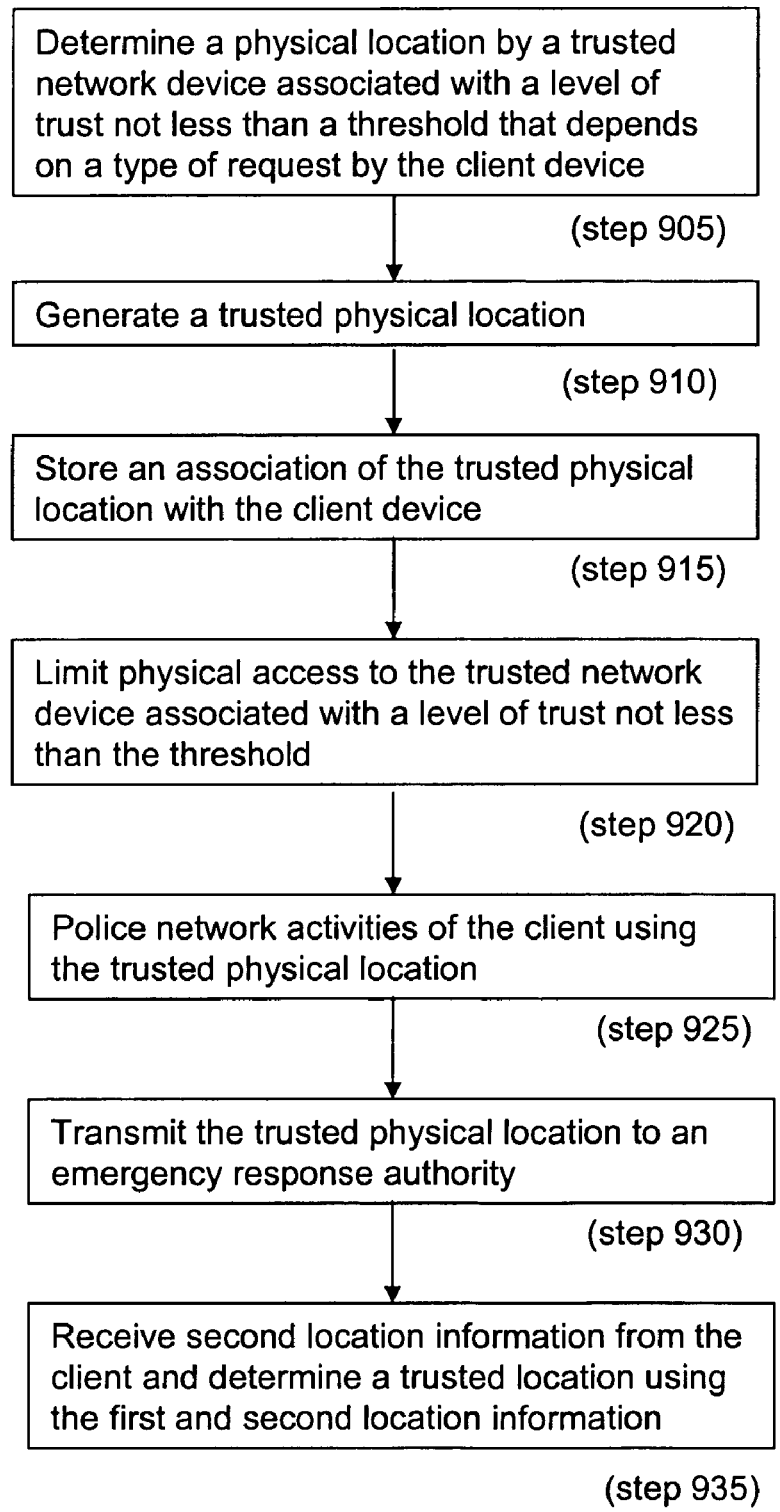
FIG. 9 is a block diagram of another illustrative process employing location information.

FIG 9 shows a process 900 for employing location information. A physical location is determined by a trusted network device associated with a level of trust not less than a threshold that depends on a type of request by the client device (step 905). A trusted physical location is generated (step 910). An association of the trusted physical location with the client device is stored (step 915). Physical access to the trusted network device associated with a level of trust not less than the threshold is limited (step 920). Network activities of the client are policed using the trusted physical location (step 925). The trusted physical location is transmitted to an emergency response authority (step 930). Second location information is received from the client and a trusted location is determined using the first and second location information (step 935).

5.5 Other Miscellaneous Variations

Other variations of the above examples can be implemented. The level of trust in the examples above is described as a discrete numerical value. One example variation is that system 100 can employ string types and fuzzy logic techniques to implement the level of trust. For example, the levels of trust can be very trustworthy, trustworthy, not too trustworthy, neutral, untrustworthy and very untrustworthy.

Another example variation is that the illustrated processes may include additional steps. Further, the order of the steps illustrated as part of processes is not limited to the order illustrated in their figures, as the steps may be performed in other orders, and one or more steps may be performed in series or in parallel to one or more other steps, or parts thereof. For example, user verification and location verification may be performed in parallel.

Additionally, the processes, steps thereof and various examples and variations of these processes and steps, individually or in combination, may be implemented as a computer program product tangibly as computer-readable signals on a computer-readable medium, for example, a non-volatile recording medium, an integrated circuit memory element, or a combination thereof. Such computer program product may include computer-readable signals tangibly embodied on the computer-readable medium, where such signals define instructions, for example, as part of one or more programs that, as a result of being executed by a computer, instruct the computer to perform one or more processes or acts described herein, and/or various examples, variations and combinations thereof. Such instructions may be written in any of a plurality of programming languages, for example, Java, Visual Basic, C, or C++, Fortran, Pascal, Eiffel, Basic, COBOL, and the like, or any of a variety of combinations thereof. The computer-readable medium on which such instructions are stored may reside on one or more of the components of system 100 described above and may be distributed across one or more such components.

A number of examples to help illustrate the invention have been described. Nevertheless, it will be understood that various modifications may be made without departing from the spirit and scope of the invention. Accordingly, other embodiments are within the scope of the following claims.

What is claimed is:

1. A method comprising:
   establishing a connection between a client device and a data network infrastructure;
   receiving a first network physical location identifier concerning the client device from one or more trusted network devices within the data network infrastructure;
   receiving a first device location identifier from the client device;
   processing the first network physical location identifier and the first device location identifier to define a first trusted physical location for the client device associated with the established connection;
   associating the first trusted physical location with the established connection;
   providing the first trusted physical location to one or more network entry devices or central switching devices within the data network infrastructure, wherein at least one of the one or more network entry devices or central switching devices provide a plurality of connections for client devices on dedicated or shared media and are capable of switching and routing data;
   switching or routing one or more data packets provided to or received from the client device, by at least one of the one or more network entry devices or central switching devices, based at least in part upon the first trusted physical location;
   upon receiving either a second network physical location identifier concerning the client device from one or more trusted network devices within the data network infrastructure, or a second device location identifier from the client device,
   defining a second trusted physical location for the client device associated with the established connection by processing at least two of: the first network physical location identifier, the first device location identifier, the second network physical location identifier, and the second device location identifier, wherein one of the at least two is the second network physical location identifier or the second device location identifier;
   associating the second trusted physical location with the established connection;
   providing the second trusted physical location to one or more network entry devices or central switching devices within the data network infrastructure, wherein at least one of the one or more network entry devices or central switching devices provide the plurality of connections for client devices on dedicated or shared media and are capable of switching and routing data; and
   switching or routing one or more data packets to or from the client device, by at least one of the one or more network entry devices or central switching devices, based at least in part upon the second trusted physical location.

2. The method of claim 1 further comprising determining whether the network entry device or central switching device within the data network infrastructure is a trusted network device according to a probability that the network entry device or central switching device can be modified to provide false physical location data.

3. The method of claim 1 further comprising limiting access to the data network infrastructure based, at least in part, upon the trusted physical location.

4. The method of claim 1 wherein the one or more trusted network devices are each associated with a level of trust not less than a threshold.

5. The method of claim 4 wherein the threshold depends on a type of request by the client device.

6. The method of claim 1 wherein the trusted physical location is associated with a level of trust.

7. The method of claim 6 further comprising determining the level of trust of the trusted physical location using levels of trust of the one or more trusted network devices.

8. The method of claim 7 wherein determining the level of trust comprises determining the level of trust based on a method of communication between the data network infrastructure and the client device.

9. The method of claim 1 further comprising policing network activities of the client device using the trusted physical location.

10. The method of claim 1 further comprising determining a response for an access request by the client device using the trusted physical location.

11. The method of claim 1 further comprising controlling network resources provided to the client device using the trusted physical location.

12. The method of claim 11 wherein controlling network resources includes restricting access to the network resources.

13. The method of claim 1 further comprising transmitting the trusted physical location to an emergency response authority.

14. The method of claim 1 further comprising providing information to the client device using the trusted physical location.

15. The method of claim 14 wherein providing information comprises selecting the information using the trusted physical location.

16. A system comprising:
   a client device;
   a data network infrastructure;
   wherein the system is configured to perform operations comprising:
   establishing a connection between the client device and the data network infrastructure;
   receiving a first device location identifier from the client device;

processing the first network physical location identifier and the first device location identifier to define a first trusted physical location for the client device associated with the established connection;

associating the first trusted physical location with the established connection;

providing the first trusted physical location to one or more network entry devices or central switching devices within the data network infrastructure, wherein at least one of the one or more network entry devices or central switching devices provide a plurality of connections for client devices on dedicated or shared media and are capable of switching and routing data; and switching or routing one or more data packets provided to or received from the client device, by at least one of the one or more network entry devices or central switching devices, based at least in part upon the first trusted physical location;

upon receiving either a second network physical location identifier concerning the client device from one or more trusted network devices within the data network infrastructure, or a second device location identifier from the client device, defining a second trusted physical location for the client device associated with the established connection by processing at least two of: the first network physical location identifier, the first device location identifier, the second network physical location identifier, and the second device location identifier, wherein one of the at least two is the second network physical location identifier or the second device location identifier;

associating the second trusted physical location with the established connection;

providing the second trusted physical location to one or more network entry devices or central switching devices within the data network infrastructure, wherein at least one of the one or more network entry devices or central switching devices provide the plurality of connections for client devices on dedicated or shared media and are capable of switching and routing data; and switching or routing one or more data packets provided to or received from the client device, by at least one of the one or more network entry devices or central switching devices, based at least in part upon the second trusted physical location.

17. The system of claim 16, wherein the system is further configured to perform operations comprising determining whether the network entry device or central switching device within the data network infrastructure is a trusted network device according to a probability that the network entry device or central switching device can be modified to provide false physical location data.

18. The system of claim 16, wherein the system is further configured to perform operations comprising limiting access to the data network infrastructure based, at least in part, upon the trusted physical location.

19. The system of claim 16, wherein the system is further configured to perform operations comprising policing network activities of the client device using the trusted physical location.

* * * * *